(12) United States Patent (10) Patent No.: US 7,564,817 B2
Abeta et al. (45) Date of Patent: Jul. 21, 2009

(54) MULTICAST COMMUNICATION METHOD, HOME AGENT, AND MOBILE NODE

(75) Inventors: Hidetoshi Abeta, Yokohama (JP); Hiraku Koganemaru, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 11/188,875

(22) Filed: Jul. 26, 2005

(65) Prior Publication Data

US 2006/0218262 A1 Sep. 28, 2006

(30) Foreign Application Priority Data

Mar. 24, 2005 (JP) .............................. 2005-086511

(51) Int. Cl.
*H04W 4/02* (2009.01)
*H04L 12/56* (2006.01)

(52) U.S. Cl. ........................ 370/331; 370/390; 370/432

(58) Field of Classification Search ................. 370/331; 709/223
See application file for complete search history.

(56) References Cited

U.S. PATENT DOCUMENTS

| | | | |
|---|---|---|---|
| 6,230,012 B1 * | 5/2001 | Willkie et al. ............ | 455/435.1 |
| 6,765,892 B1 | 7/2004 | Leung et al. | |
| 6,988,146 B1 * | 1/2006 | Magret et al. ............... | 709/238 |
| 7,346,053 B1 * | 3/2008 | Leung et al. ................ | 370/390 |
| 2003/0016655 A1 * | 1/2003 | Gwon ........................ | 370/352 |
| 2003/0104807 A1 | 6/2003 | Momona | |

FOREIGN PATENT DOCUMENTS

| | | |
|---|---|---|
| JP | 2003-174471 | 6/2003 |
| JP | 2004-260317 | 9/2004 |

OTHER PUBLICATIONS

G. Xylomenos, et al., "IP Multicasting for Wireless Mobile Hosts," *IEEE*, Military Communications Conference, Conference Proceedings, McLean, Virginia, Oct. 21, 1996, pp. 933-937, p. 936, left-hand column, line 8, p. 937, left-hand column, line 9.
W. Jia, et al., "Efficient Algorithm for Mobile Multicast Using Anycast Group," *IEE roc.—Commun.*, vol. 148, No. 1, Feb. 13, 2001, pp. 14-18, paragraphs 1.2 and 2.
RFC 3775, "Mobility Support IPv6," Jun. 2004.
T. G. Harrison, et al., "Mobile Multicast (MoM) Protocol: Multicast Support for Mobile Hosts," *MOBICOM '97*, Proceedings of the Third Annual ACM/IEEE International Conference on Mobile Computing and Networking, Sep. 26-30, 1997, Budapest Hungary.
RFC 2002, IP Mobility Support; dated Oct. 1996; pages (2).

* cited by examiner

*Primary Examiner*—Hong Cho
*Assistant Examiner*—Robert C Scheibel
(74) *Attorney, Agent, or Firm*—Hanify & King, P.C.

(57) ABSTRACT

A multicast communication method is disclosed that includes the steps of: (a) transmitting a position registration request including multicast join request information from a mobile node to a network; (b) receiving the position registration request, performing position registration, and setting session information data for performing a multicast communication in a home agent connected to the network; and (c) encapsulating a multicast packet and forwarding the multicast packet to an optimal forwarding destination on the network to which the mobile node to join the multicast communication is connected based on the session information data in the home agent that has received the multicast packet from the network.

11 Claims, 44 Drawing Sheets

FIG.7

| TRANSMITTER | TRANSMISSION DESTINATION | POSITION REGISTRATION INFORMATION PART | |
|---|---|---|---|
| | | POSITION INFORMATION | |
| MOBILE NODE CARE-OF ADDRESS | HOME AGENT | ACCESS ROUTER IP ADDRESS INFORMATION | MULTICAST SESSION INFORMATION (JOIN/LEAVE) |

| HOME ADDRESS | CARE-OF ADDRESS | POSITION REGISTRATION VALID TIME (sec) | ACCESS ROUTER IP ADDRESS | ANYCAST IP ADDRESS |
|---|---|---|---|---|
| 2000:10::aaaa | 2000:90::290:ccff:fe22:8c4d | 478 | 2000:90::290:ccff:fe22:1d31 | 2000:90::fdff:ffff:ffff:fffe |
| 2000:10::bbbb | 2000:90::290:ccff:fe22:28a5 | 326 | 2000:a0::290:ccff:fe22:1212 | 2000:a0::fdff:ffff:ffff:fffe |
| 2000:10::cccc | 2000:90::290:ccff:fe22:8c4d | 326 | 2000:a0::290:ccff:fe22:1212 | 2000:a0::fdff:ffff:ffff:fffe |

| MOBILE NODE | MULTICAST SESSION ADDRESS | TUNNELING DESTINATION POINT | TUNNEL ID |
|---|---|---|---|
| ::10::aaaa | FF2E::2 | 2000:a0::290:ccff:fe22:1d31 | tun0 |
| 200010::bbbb | FF2E::2 | 2000:b0::290:ccff:fe22:1212 | tun1 |
| 2000:10::bbbb | FF2E::3 | 2000:b0::290:ccff:fe22:1212 | tun1 |
| 2000:10::cccc | FF2E::3 | 2000:c0::290:ccff:fe22:574c | tun2 |
| 2000:10::cccc | FF2E::4 | 2000:c0::290:ccff:fe22:574c | tun2 |

FIG.13

| TRANSMITTER | TRANSMISSION DESTINATION | TRANSMITTER | TRANSMISSION DESTINATION | MULTICAST SESSION INFORMATION |
|---|---|---|---|---|
| MOBILE NODE CARE-OF ADDRESS | HOME AGENT | MOBILE NODE HOME ADDRESS | MULTICAST SESSION ADDRESS | MULTICAST JOIN REQUEST INFORMATION |

FIG.17

| TRANSMITTER | TRANSMISSION DESTINATION | TRANSMITTER | TRANSMISSION DESTINATION | MULTICAST SESSION INFORMATION |
|---|---|---|---|---|
| MOBILE NODE CARE-OF ADDRESS | HOME AGENT | MOBILE NODE HOME ADDRESS | MULTICAST SESSION ADDRESS | MULTICAST LEAVE REQUEST INFORMATION |

FIG.21

| FORWARDING DESTINATION ADDRESS | NUMBER OF HOPS FROM HA | GO-THROUGH ADDRESS INDEX |
|---|---|---|
| 2000:a0::290:ccff:fe22:1d31 | 3 | 1→2→3→6 |
| 2000:b0::290:ccff:fe22:1212 | 3 | 1→2→4→7 |
| 2000:c0::290:ccff:fe22:574c | 3 | 1→5→8 |

FIG.22

| ADDRESS | INDEX |
|---|---|
| 2000:20::290:ccff:fe22:43d2 | 1 |
| 2000:30::290:ccff:fe22:5f5c | 2 |
| 2000:60::290:ccff:fe22:3ed4 | 3 |
| 2000:70::290:ccff:fe22:332c | 4 |
| 2000:80::290:ccff:fe22:8762 | 5 |
| 2000:a0::290:ccff:fe22:1d31 | 6 |
| 2000:b0::290:ccff:fe22:1212 | 7 |
| 2000:c0::290:ccff:fe22:574c | 8 |

| TUNNEL ID | TUNNELING START POINT | TUNNELING DESTINATION POINT |
|---|---|---|
| tun0 | 2000:10::290:ccff:fe22:12d6 | 2000:a0::290:ccff:fe22:1d31 |
| tun1 | 2000:10::290:ccff:fe22:12d6 | 2000:b0::290:ccff:fe22:1212 |
| tun2 | 2000:10::290:ccff:fe22:12d6 | 2000:b0::290:ccff:fe22:1212 |
| tun3 | 2000:10::290:ccff:fe22:12d6 | 2000:c0::290:ccff:fe22:574c |
| tun4 | 2000:10::290:ccff:fe22:12d6 | 2000:c0::290:ccff:fe22:574c |

MULTICAST COMMUNICATION METHOD, HOME AGENT, AND MOBILE NODE

BACKGROUND OF THE INVENTION

1. Field of the Invention

The present invention relates generally to multicast communication methods, home agents, and mobile nodes, and more particularly to a multicast communication method that performs multicast communications in an IP mobile network, and a home agent and a mobile node for such a multicast communication method.

2. Description of the Related Art

A multicast communication method is a data forwarding technology for efficiently distributing the same packet to specific multiple points on an IP network.

FIG. 1 is a diagram for illustrating the multicast communication method. Referring to FIG. 1, users (multicast users) 10a and 10b who wish to receive a specific multicast service transmit a request to join a corresponding multicast group (join) to multicast routers 12a and 12b, respectively, on networks to which they belong, thereby requesting a corresponding multicast packet to be forwarded. Each of the multicast routers 12a and 12b, receiving the multicast group join request (join) from the corresponding user 10a or 10b, generates a distribution tree on a link in which the corresponding user 10a or 10b exists. The distribution tree is management information for distributing the corresponding multicast packet. Then, each of the multicast routers 12a and 12b transmits the multicast group join request to adjacent multicast routers 12c and 12d, using a specific multicast routing protocol.

When the multicast group join request is transmitted between adjacent multicast routers from the multicast routers 12a and 12b, to which the users 10a and 10b wishing to receive the multicast packet belong, to the multicast router 12d to which a source of the multicast packet belongs, so that all en route multicast packet distribution trees are generated, the corresponding multicast packet is distributed to the users 10a and 10b.

In multicast communication, compared with unicast communication, as the number of users receiving the same packet increases, the processing workload on routers and the load on transmission channels are expected to decrease, so that effective use of the radio band of a radio access network to which terminals belong can be expected. Accordingly, multicast communication is expected to be used more widely in the future, being applied to services distributing the same packet to multiple points, including one-to-many broadcast services such as TV broadcasts, movie distribution, music distribution, and lectures, and many-to-many interactive services such as conferences and games.

The IETF (Internet Engineering Task Force) advocates Mobile IP (Mobile IPv4: RFC 2002 and Mobile IPv6: RFC 3775) as mobile control methods that prevent IP communications from being disrupted even when a mobile node performing IP-based communications with another terminal moves to another domain in an IP network.

RFC 2002 and RFC 3775 propose the following two methods of distributing a multicast packet to mobile nodes.

The first one is remote subscription. FIG. 2 is a diagram for illustrating remote subscription. Referring to FIG. 2, the mobile node (multicast user) 10a to receive a multicast message transmits a multicast group join request to the multicast router 12b provided on a network to which the mobile node 10a moves. Then, the distribution trees of a corresponding multicast packet are generated in all the multicast routers 12b, 12c, and 12d between the multicast router 12b of the destination network and the multicast router 12d to which the packet source of the corresponding multicast group belongs. Thereby, the multicast packet is delivered from the source to the mobile node 10a.

The second one is bi-directional tunneling. FIG. 3 is a diagram for illustrating bi-directional tunneling. Referring to FIG. 3, tunnels 15a and 15b that are multicast-dependent virtual paths are generated between the mobile node 10a and the home agent 14. The home agent 14 functions equivalently to the multicast proxy server of the mobile node 10a so as to deliver a required multicast packet to the mobile node 10a through the tunnels 15a and 15b. For this, reference may be made to Japanese Laid-Open Patent Application No. 2004-260317 (Patent-related Document 1).

Further, as a system for efficiently distributing a multicast packet with controlled traffic in a network where multiple mobile nodes receiving the same multicast packet exist in a relatively narrow area, a method to which bi-directional tunneling is applied is proposed. For this, reference may be made to Harrison, T. G., C. L. Williamson, W. L. Mackrell, and R. B. Bunt; "Mobile Multicast (MoM) Protocol: Multicast Support for Mobile Hosts," MOBICOM '97, Proceedings of the Third Annual ACM/IEEE International Conference on Mobile Computing and Networking, Sep. 26-30, 1997, Budapest, Hungary (Non-Patent-related Document).

According to this method, the home agent of a mobile node receiving a multicast packet generates a tunnel for forwarding the multicast packet by unicast, and delivers the packet to an external agent provided on a network to which the mobile node moves. The multicast packet is decapsulated in the external agent, and is forwarded to the mobile node.

Further, there is a technique such that the home agent of multiple mobile nodes aggregates and encapsulates multicast packets into a single multicast packet based on information on a position registration request from each mobile node, and transmits the encapsulated multicast packet to an access router to which the multiple mobile nodes are connected. Thereby, a loss in multicast packet communications accompanying the movement of a mobile node is reduced, so that extra traffic on a network is reduced. For this, reference may be made to Japanese Laid-Open Patent Application No. 2003-174471 (Patent-related Document 2).

In the case of remote subscription, where a mobile node on an IP mobile network receives a multicast packet, it is necessary to generate a new multicast tree between the multicast routers in between a source of the multicast packet and the mobile node every time the mobile node moves to another domain. Accordingly, there is a problem in that the multicast packet is lost before or delayed until the multicast tree is generated. The larger the network becomes in scale, the greater the effect of this problem.

In the case of bi-directional tunneling, a multicast packet addressed to a mobile node is tunneled (delivered by unicast) from a home agent to the mobile node. Therefore, as shown in FIG. 4, if multiple users belonging to the same multicast group exist on a network as the users 10a and 10b and users 10c and 10d, there is a problem in that the effect of decreasing the workload on routers provided in the middle of channels and the load on transmission channels and access networks, which effect is primarily expected of multicast communication, is reduced. As the number of users belonging to the same multicast group increases, the effect of this problem becomes greater.

According to the conventional bi-directional tunneling method, as many unicast tunnels as mobile nodes receiving a multicast packet are required. On the other hand, according to the method of the Non-Patent-related Document, the same multicast packet can be distributed to multiple mobile nodes under the same external agent through a single unicast tunnel, so that traffic reduction can be expected. However, since the terminal of the unicast tunnel is the external agent, the multicast traffic can be reduced only for the mobile nodes belonging to the same subnet under the external agent. There is another problem in that this is not applicable to co-located-mode IP mobile networks that require no external agent and IPv6 mobile networks where no external agent exists.

According to the technology of Patent-related Document 2, it is only a packet addressed to a multicast address defined locally in the home domain of a mobile node that is delivered to the mobile node. A packet delivered to a global multicast address on a global network is not forwarded to the mobile node. Further, a home agent forwards a packet encapsulated with a global multicast address to a mobile node. Therefore, there is a problem in that the multicast packet does not reach the mobile node before a multicast tree from the home agent to the router of a domain to which the mobile node moves is generated. In FIG. 1 through FIG. 4, reference numerals 10e and 10f denote non-multicast users, reference numerals 12e and 12f denote routers, reference numerals 16a, 16b, and 16c denote access routers, reference numerals 17 denotes a multicast source, and reference numerals 18a, 18b, 18 c, and 18d denote tunnels.

SUMMARY OF THE INVENTION

Accordingly, it is a general object of the present invention to provide a multicast communication method in which the above-described disadvantages are eliminated.

A more specific object of the present invention is to provide a multicast communication method that can forward a global multicast packet distributed on an IP network to multiple mobile nodes belonging to the same multicast group, putting traffic together in an upper router, while reducing packet loss or delay.

Another more specific object of the present invention is to provide a home agent and a mobile node employed in such a multicast communication method.

One or more of the above objects of the present invention are achieved by a multicast communication method including the steps of: (a) transmitting a position registration request including multicast join request information from a mobile node to a network; (b) receiving the position registration request, performing position registration, and setting session information data for performing a multicast communication in a home agent connected to the network; and (c) encapsulating a multicast packet and forwarding the multicast packet to an optimal forwarding destination on the network to which the mobile node to join the multicast communication is connected based on the session information data in the home agent that has received the multicast packet from the network.

One or more of the above objects of the present invention are achieved by a home agent including: a position registration part configured to receive a position registration request including multicast join request information transmitted from a mobile node to a network, create position registration information data, and perform position registration; a session setup part configured to set session information data for performing a multicast communication from the position registration request including the multicast join request information and the position registration information data; and a forwarding part configured to encapsulate a multicast packet and forward the multicast packet to an optimal forwarding destination on the network to which the mobile node to join the multicast communication is connected based on the session information data.

One or more of the above objects of the present invention are achieved by a mobile node including a position registration request part configured to set one of multicast join request information and multicast leave request information in a position registration request, and transmit the position registration request to a network.

According to one aspect of the present invention, it is possible to forward a global multicast packet distributed on an IP network to multiple mobile nodes belonging to the same multicast group, aggregating traffic in an upper router, while reducing packet loss or delay. Accordingly, it is possible to reduce traffic load.

BRIEF DESCRIPTION OF THE DRAWINGS

Other objects, features and advantages of the present invention will become more apparent from the following detailed description when read in conjunction with the accompanying drawings, in which:

FIG. 7 is a diagram showing a format of a position registration request according to the present invention;

FIG. 11 is a diagram showing an embodiment of position registration information data according to the present invention;

FIG. 12 is a diagram showing an embodiment of session information data according to the present invention;

FIG. 13 is a diagram showing a format of a multicast join request message according to the present invention;

FIG. 17 is a diagram showing a format of a multicast leave request message according to the present invention;

FIG. 21 is a diagram showing network information data (tree information) according to the present invention;

FIG. 22 is a diagram showing network information data (address list information) according to the present invention;

FIG. 43 is a diagram showing an embodiment of tunnel device information data according to the present invention;

DETAILED DESCRIPTION OF THE PREFERRED EMBODIMENTS

A description is given below, with reference to the accompanying drawings, of embodiments of the present invention.

First, a description is given of the principles of the present invention.

In the present invention, at the time of position registration, a mobile node transmits to a home agent a position registration request (a request to register its position) to which the IP address information of an access router is added as a candidate forwarding destination to which a multicast packet is to be forwarded, thereby notifying the home agent of the position of the mobile node and its multicast forwarding destination.

The home agent, receiving the position registration request, creates position registration information data managing the position of the mobile node and its multicast forwarding destination.

When the mobile node wishes to join a multicast, the mobile nodes transmits to the home agent a multicast join request or a position registration request to which multicast join request information is added.

The home agent, receiving the multicast join request or the position registration request to which multicast join request information is added, extracts the destination access router from the position registration information data, and stores the extracted destination access router in session information data as a destination to which a multicast packet is to be forwarded. After setting up a multicast forwarding tunnel, the home agent starts to forward the multicast packet. The home agent has joined the multicast session previously.

The home agent includes a network monitoring function collecting and managing information on a router to which a multicast forwarding packet is to be tunneled. The home agent determines a router address serving as a crosspoint of multicast routing from session information and network information. Then, the home agent resets up a multicast forwarding tunnel to the corresponding router, and resumes forwarding the multicast packet.

This configuration makes it possible to further reduce network traffic in the case where the same multicast session is tunneled to multiple routers.

[Network Configuration]

Figure 1:
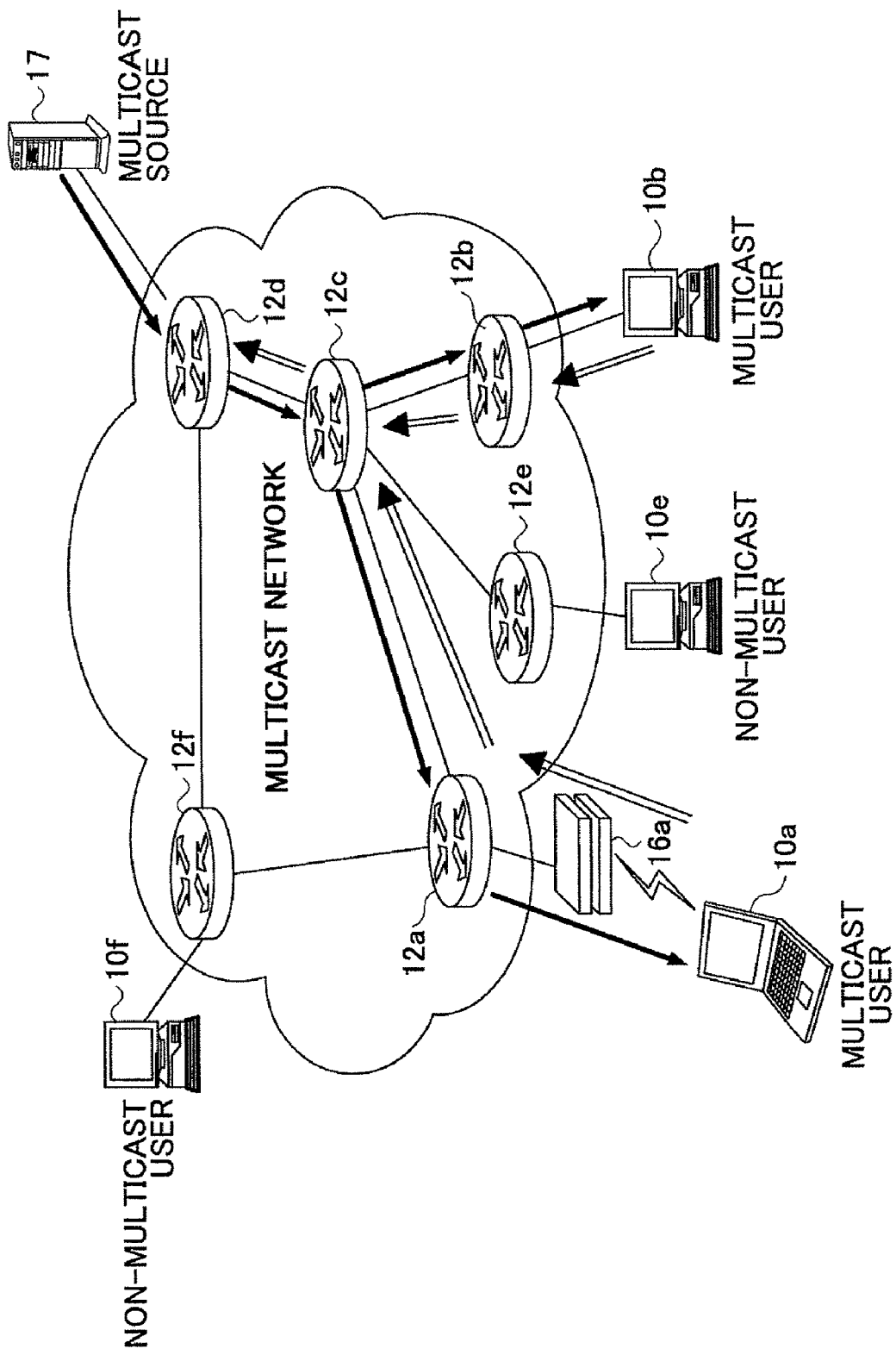
FIG. 1 is a diagram for illustrating a conventional multicast communication method.
Figure 2:
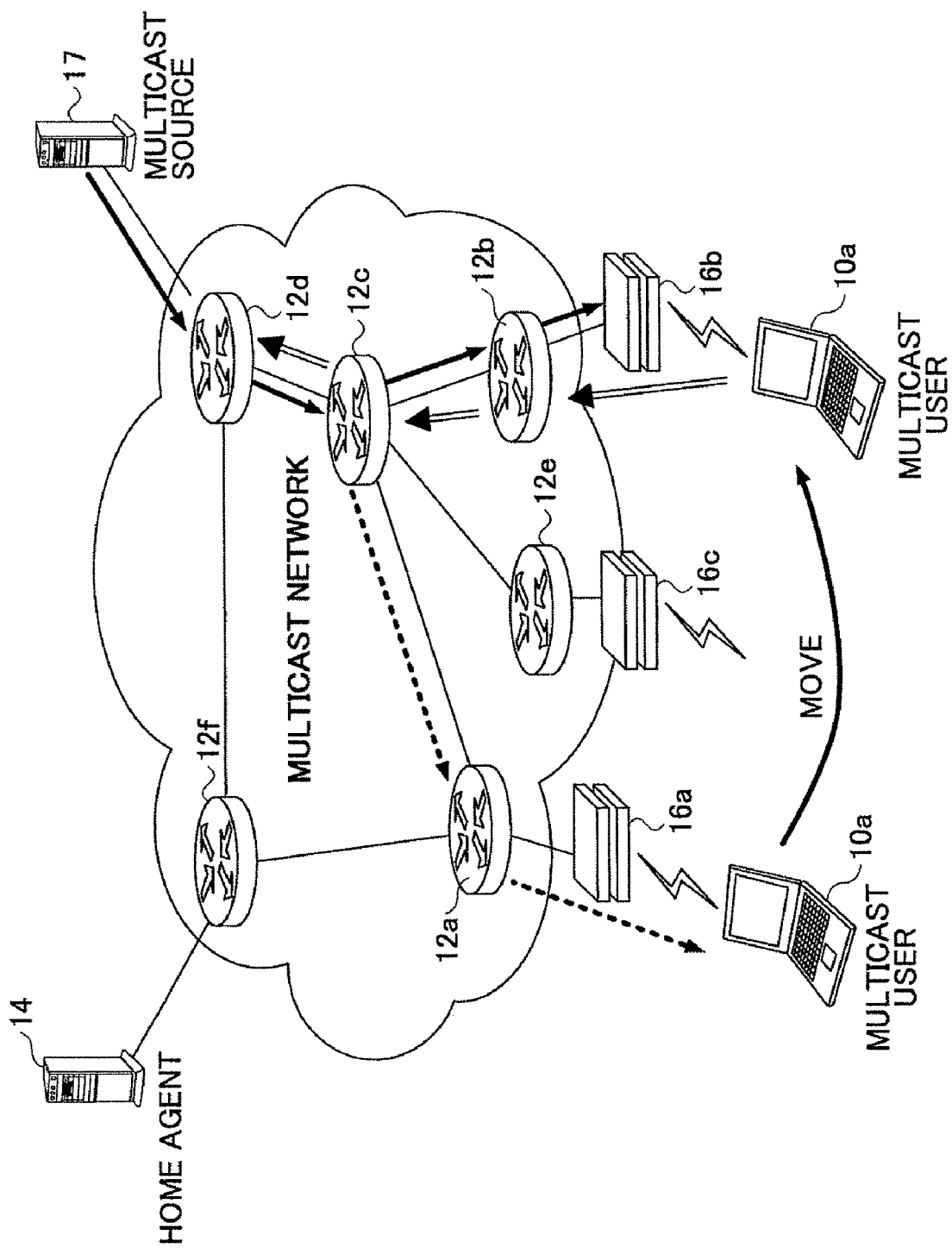
FIG. 2 is a diagram for illustrating conventional remote subscription.
Figure 3:
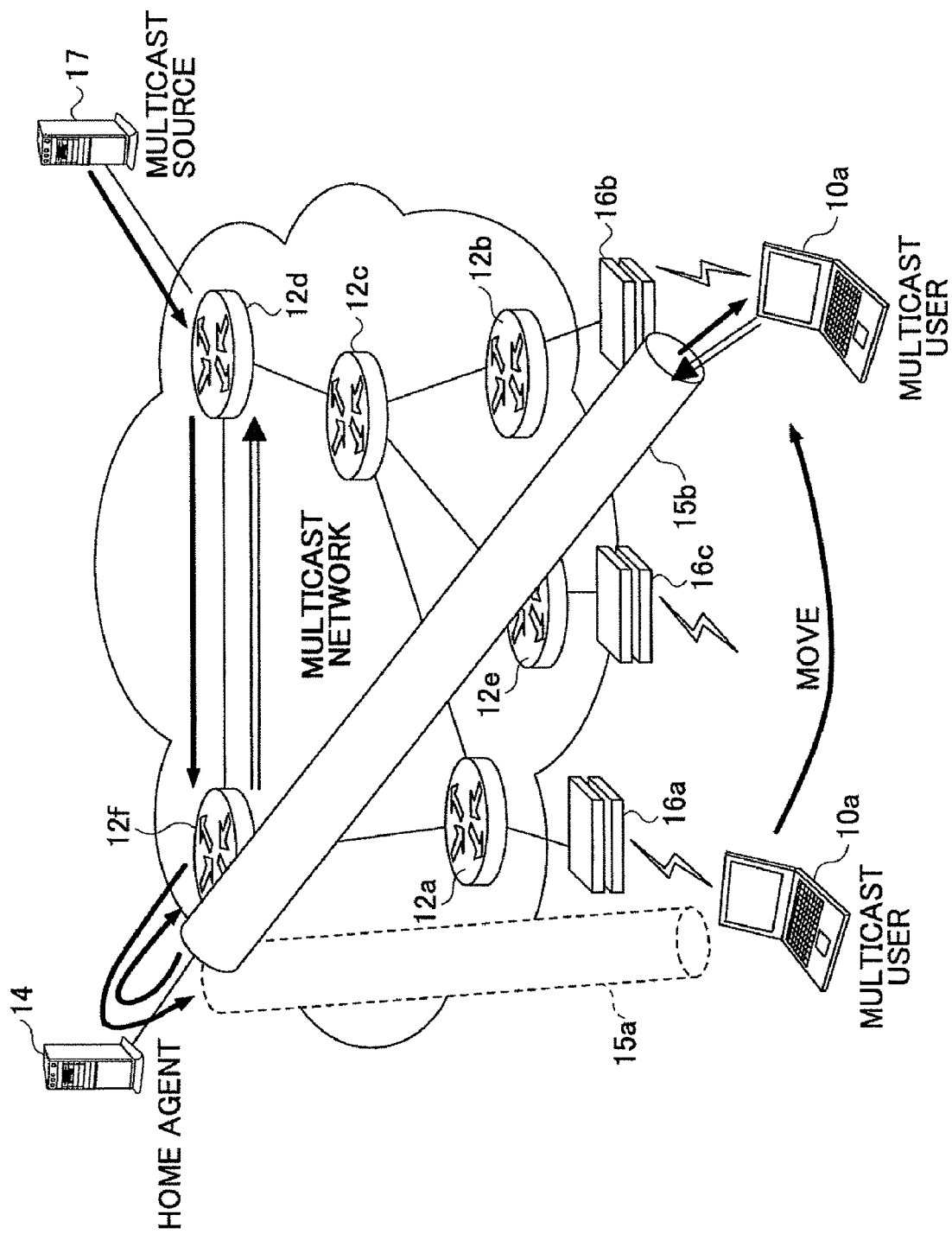
FIG. 3 is a diagram for illustrating conventional bi-directional tunneling.
Figure 4:
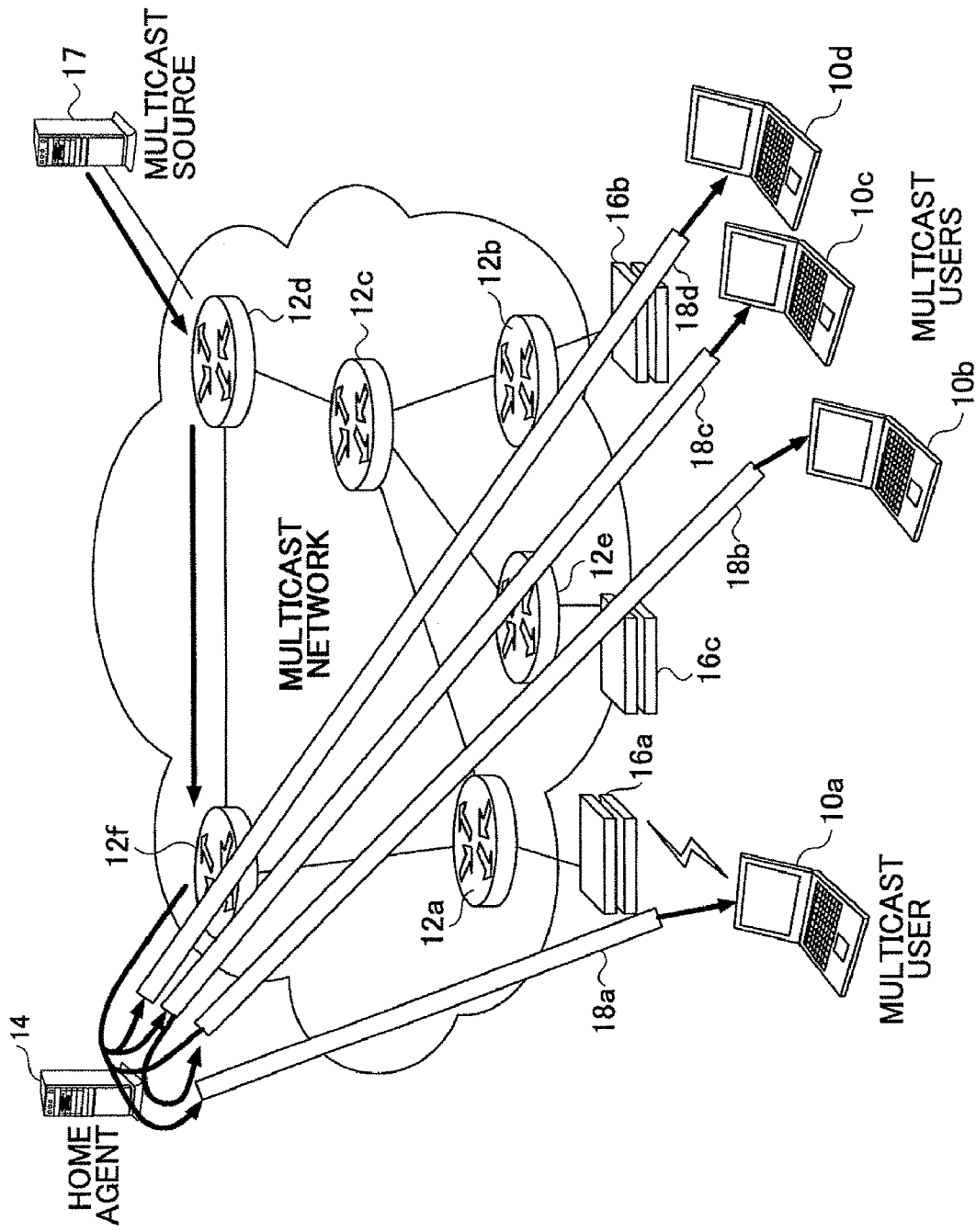
FIG. 4 is a diagram for illustrating a problem in conventional bi-directional tunneling.
Figure 5:
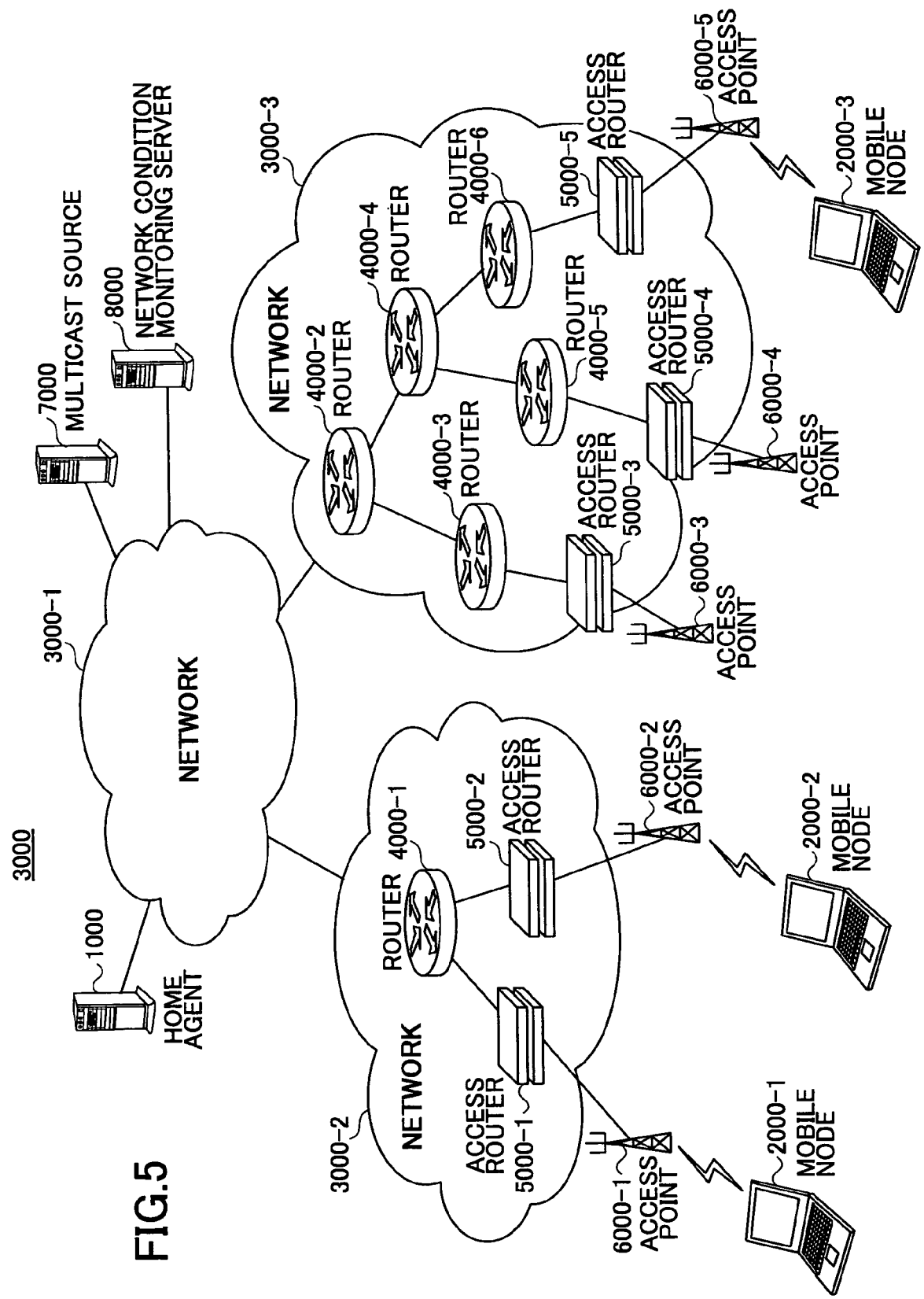
FIG. 5 is a diagram showing a configuration of a network system to which a home agent and a mobile node according to the present invention are applied.

FIG. 5 is a diagram showing a configuration of a network system to which a home agent and a mobile node according to the present invention are applied. FIG. 5 shows a core network 3000 for mobile nodes 2000-1 and 2000-2 according to the present invention making a request to join a multicast (a multicast join request) to a home agent 1000 and communicating with a multicast source 7000. The core network 3000 is configured by connecting networks 3000-2 and 3000-3 to a network 3000-1.

The home agent 1000, the multicast source 7000, and a network condition monitoring server 8000 are connected to the network 3000-1.

The network 3000-2 includes access routers 5000-1 and 5000-2 for connecting the mobile nodes 2000-1 and 2000-2, respectively, to the network 3000-1, and a router 4000-1 performing multicast routing.

The network 3000-3 includes an access router 5000-5 for connecting a mobile node 2000-3 to the network 3000-1, access routers 5000-3 and 5000-4, and routers 4000-2, 4000-3, 4000-4, 4000-5, and 4000-6 performing multicast routing. An access network to the network 3000-2 or 3000-3 is provided between each of the access routers 5000-1 through 5000-5 and the mobile nodes 2000-1 through 2000-3. Each access network includes a corresponding one of access points 6000-1 through 6000-5 for establishing a radio link (data link) to the mobile nodes 2000-1 through 2000-3.

Referring to FIG. 5, the access routers 5000-1, 5000-2, 5000-3, 5000-4, and 5000-5 include the access points 6000-1, 6000-2, 6000-3, 6000-4, and 6000-5, respectively.

Thereby, between each of the mobile nodes 2000-1 through 2000-3 and each of the networks 3000-2 and 3000-3, the access network to the access router 5000-1 via the access point 6000-1, the access network to the access router 5000-2 via the access point 6000-2, the access network to the access router 5000-3 via the access point 6000-3, the access network to the access router 5000-4 via the access point 6000-4, and the access network to the access router 5000-5 via the access point 6000-5 are configured.

[Home Agent Configuration]

Figure 6:
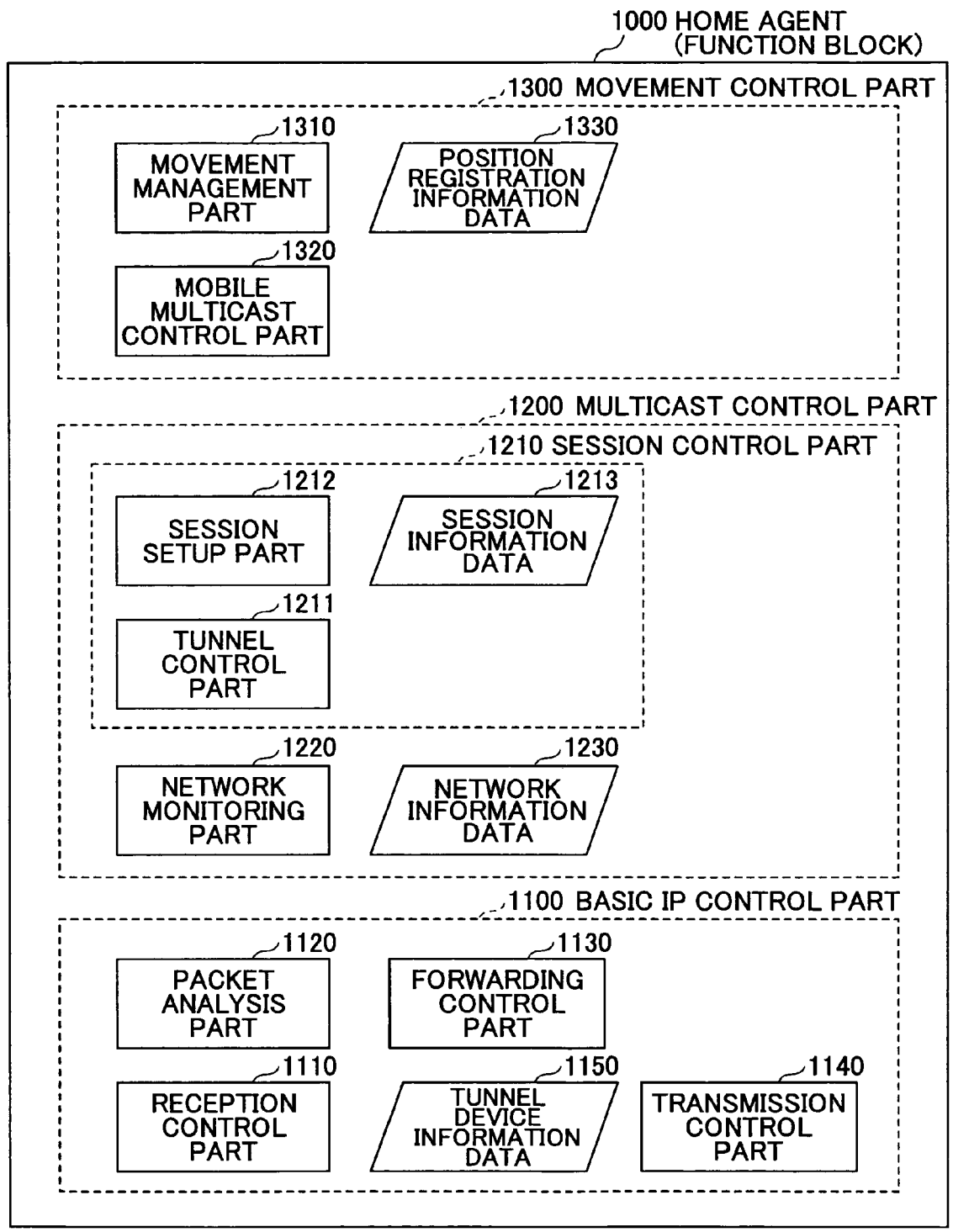
FIG. 6 is a block diagram showing a configuration (embodiment) of the home agent according to the present invention.

A description is given of the home agent 1000 according to the present invention. FIG. 6 is a block diagram showing a configuration (embodiment) of the home agent 1000.

Referring to FIG. 6, the home agent 1000 includes a reception control part 1110, a packet analysis part 1120, a forwarding control part 1130, a transmission control part 1140, tunnel device information data 1150, a tunnel control part 1211, a session setup part 1212, session information data 1213, a network monitoring part 1220, network information data 1230, a movement management part 1310, a mobile multicast control part 1320, and position registration information data 1330.

A basic IP control part 1100 includes the reception control part 1110, the packet analysis part 1120, the forwarding control part 1130, the transmission control part 1140, and the tunnel device information data 1150.

The reception control part 1110 controls packet reception. The packet analysis part 1120 analyzes a packet type, and transmits a corresponding message to the forwarding control part 1130, the network monitoring part 1220, the session setup part 1212, or the movement management part 1310.

Receiving a "tunnel setup instruction" from the tunnel control part 1211, the forwarding control part 1130 sets up a tunnel, and encapsulates a multicast packet. Further, the forwarding control part 1130 detects duplicate reception of a multicast data packet, and issues a "duplication notice" to the tunnel control part 1211.

The transmission control part 1140 controls packet transmission. The tunnel device information data 1150 is data indicating the encapsulation information of a tunnel device that is a transmission device in charge of encapsulation of an IP packet.

The multicast control part 1200 includes a session control part 1210, the network monitoring part 1220, and the network information data 1230. The session control part 1210 includes the tunnel control part 1211, the session setup part 1212, and the session information data 1213.

The tunnel control part 1211, receiving a "tunnel setup request" from the session setup part 1212, sets tunnel information in the session information data 1213, and issues a "tunnel setup instruction" to the forwarding control part 1130, thereby notifying the forwarding control part 1130 of the tunnel information. The tunnel control part 1211 also issues a "tunnel setup completion notice" to the session setup part 1212. Further, the tunnel control part 1211 obtains network information from the network monitoring part 1220 by periodically issuing a "network information obtaining request" thereto. The tunnel control part 1211 collates the network information with the session information data 1213, thereby resetting a tunnel point to which an encapsulated IP packet is to be addressed.

The session setup part 1212, receiving a "multicast join request" packet from the packet analysis part 1120, issues a "position information obtaining request" to the mobile multicast control part 1320. Further, receiving a "position information obtaining response" or a "session setup request" from the mobile multicast control part 1320, the session setup part 1212 records session information in the session information data 1213, and issues a "tunnel setup request" to the tunnel control part 1211.

Further, receiving a "tunnel setup completion notice" from the tunnel control part 1211, the session setup part 1212 generates a "multicast join request" packet, referring to the session information data 1213, and issues a "transmission request" to the transmission control part 1140. The session information data 1213 is the management data of multicast sessions.

The network monitoring part 1220 collects network information, and records the collected network information in the network information data 1230. Further, receiving a "network information obtaining request" from the tunnel control part 1211, the network monitoring part 1220 issues a "network information obtaining response" to the tunnel control part 1211, referring to the network information data 1230. The network information data 1230 is network information management data.

A movement control part 1300 includes the movement management part 1310, the mobile multicast control part 1320, and the position registration information data 1330. The movement management part 1310, receiving a "position registration request" packet from the packet analysis part 1120, records position information in the position registration information data 1330, and issues a "session information notice" to the mobile multicast control part 1320.

The mobile multicast control part 1320, receiving a "session information notice" from the movement management part 1310, sets multicast forwarding destination information in the position registration information data 1330, and issues a "session setup request" to the session setting part 1212. The position registration information data 1330 is mobile node management data.

[Processing of Home Agent]

Next, a description is given of processing by the home agent 1000. The home agent 1000 performs processing including (Processing 1) through (Processing 6) as follows.

(Processing 1) In the case of receiving from a mobile node a position registration request including access router IP address information and multicast join request information, the home agent 1000 sets up a multicast session, and starts to forward a multicast packet to a corresponding access router.

(Processing 2) In the case of receiving a multicast join request from a mobile node whose position registration has been completed, the home agent 1000 sets up a multicast session, and starts to forward a multicast packet to a corresponding access router.

(Processing 3) In the case of receiving a position registration request including multicast join request information, a multicast join request, a position registration request including multicast leave request information, and a multicast leave request with respect to a multicast session whose forwarding has been started, the home agent 1000 controls the forwarding destination of a multicast packet, referring to session information data that has been set.

(Processing 4) The home agent 1000 periodically monitors network information, and changes the forwarding destination of a multicast packet to an optimal router.

(Processing 5) The home agent 1000 makes a multicast join request to a forwarding destination router in order to prevent multicast packet duplication on a network.

(Processing 6) The home agent 1000 stops forwarding a multicast packet to a corresponding router when detecting duplication of the packet.

(Description of Processing 1)

When the home agent 1000 receives from a mobile node a position registration request including access router IP address information and multicast join request information, the home agent 1000 sets up a multicast session, sets a corresponding access router as a multicast forwarding destination address, and starts to forward a multicast packet to the corresponding access router.

FIG. 7 shows a format of the position registration request. Referring to FIG. 7, the care-of address of a transmitter mobile node and a transmission destination home agent are set, and position information, access router IP address information, and multicast session information (join/leave) are set in a position registration information part.

In the case of an IPv6 mobile network, the home agent 1000 specifies an IPv6 anycast address as a candidate forwarding destination of a multicast packet from a care-of address included in the position registration request of the mobile node, and stores the specified address. Further, the home agent 1000 makes a multicast join request to a forwarding destination router in order to prevent the multicast packet from being duplicated on the network.

Figure 8:
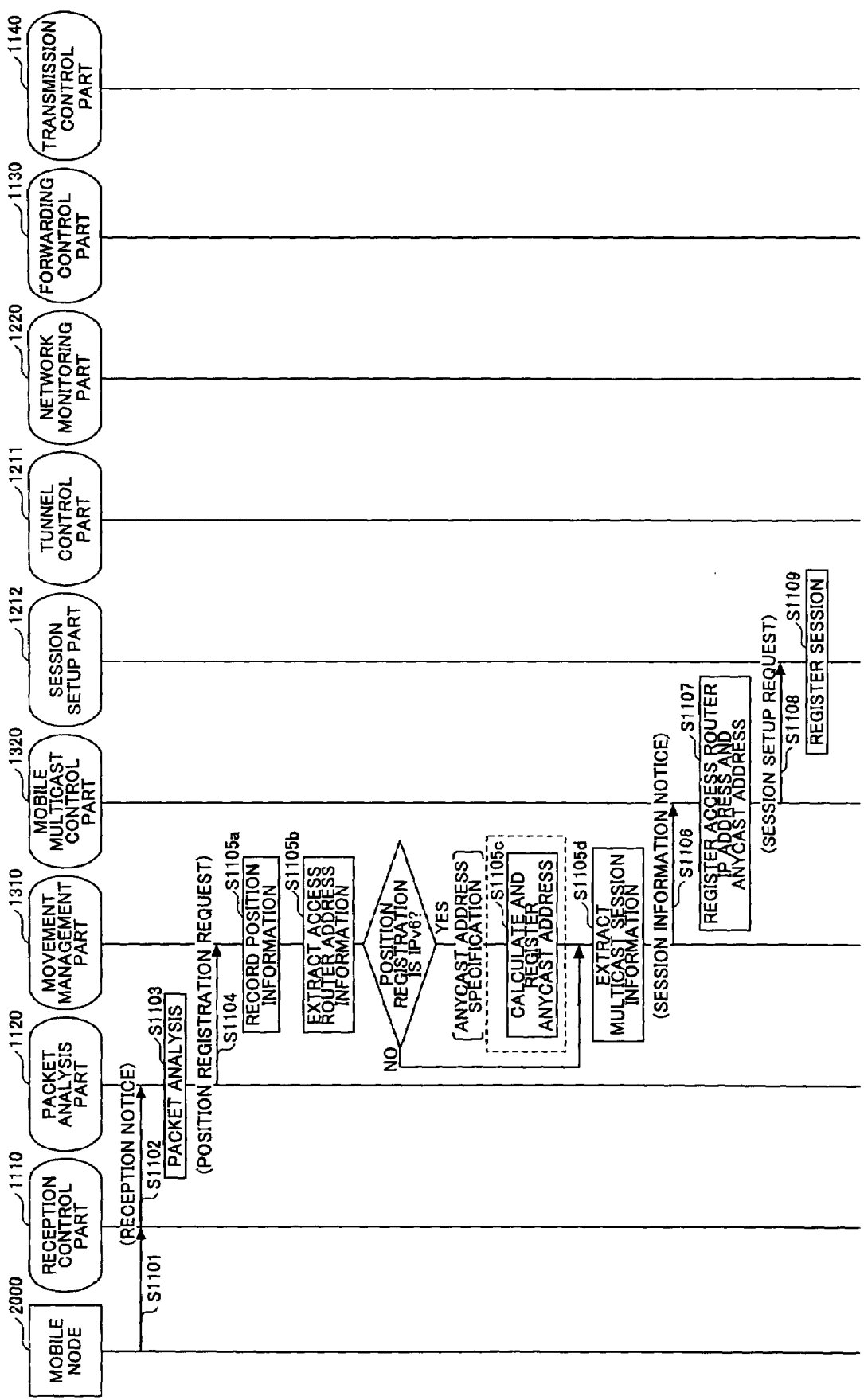
FIGS. 8 and 9 are sequence diagrams showing the processing of forwarding a multicast packet by the position registration request including multicast join request information according to the present invention.
Figure 9:
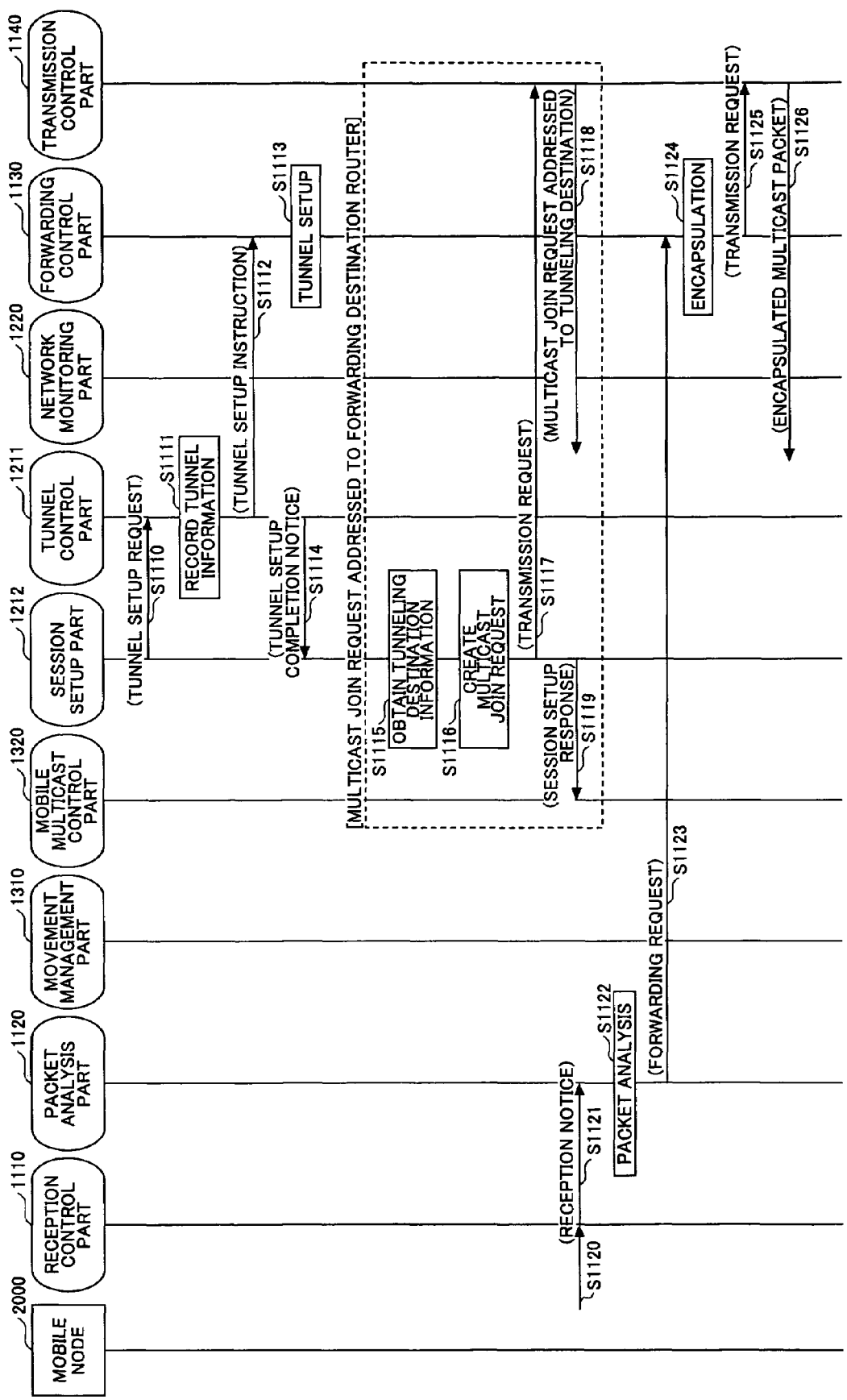
Figure 10:
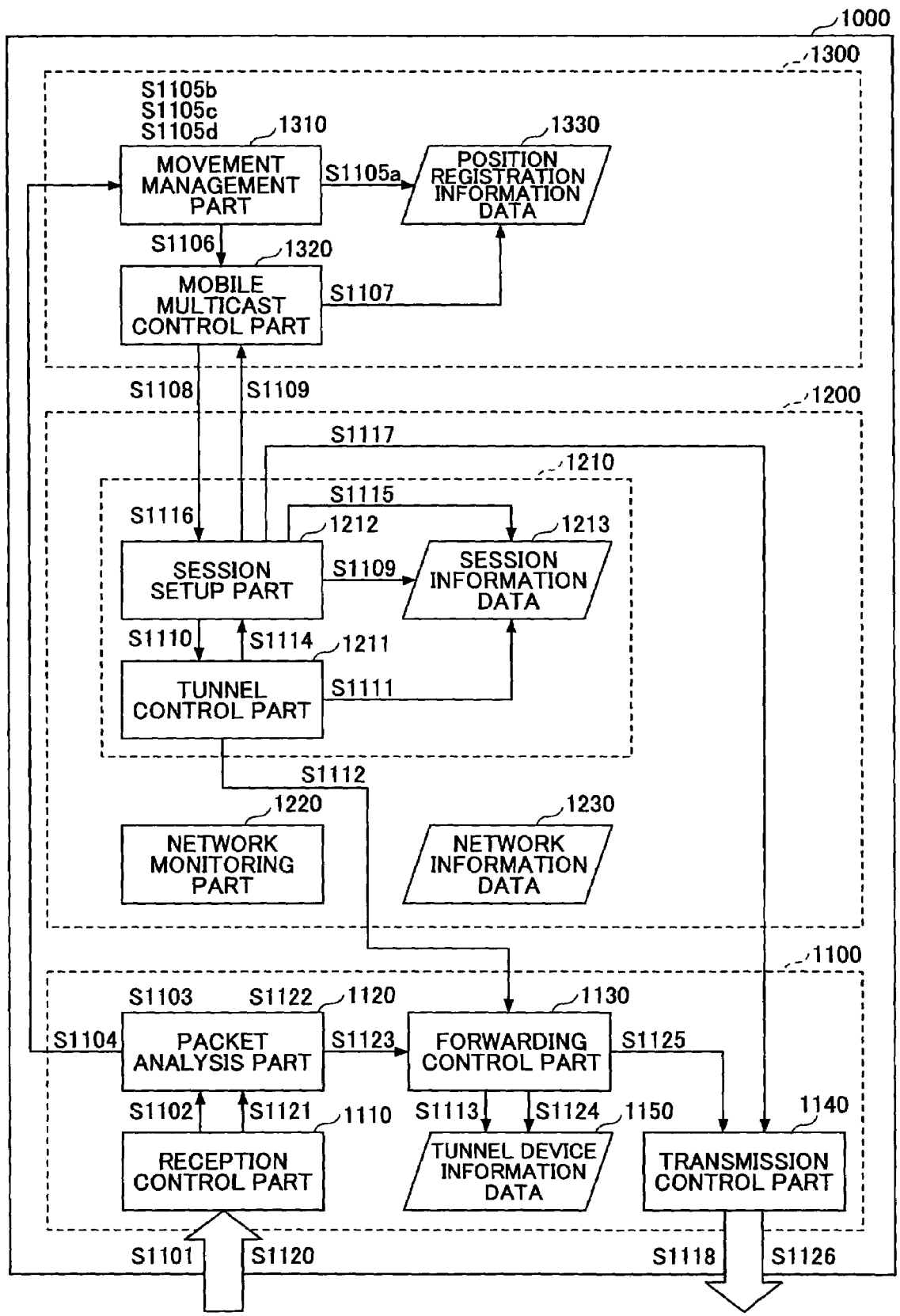
FIG. 10 is a functional correlation diagram of the home agent with respect to Processing 1 thereof according to the present invention.

FIGS. 8 and 9 are sequence diagrams showing the processing of the home agent 1000 starting to forward a multicast packet to an access router specified by a position registration request; specifying an IPv6 anycast address as a candidate forwarding destination of the multicast packet from a care-of address included in position registration information; and making a multicast join request to the forwarding destination router in order to prevent the multicast packet from being duplicated on the network, in the case of receiving the position registration request including access router IP address information and multicast join request information from a mobile node. FIG. 10 is a functional correlation diagram of the home agent 1000 with respect to Processing 1.

First, a description is given of processing from receiving a position registration request including multicast join request information from the mobile node 2000 to completion of the setup of multicast forwarding control. Here, the mobile node 2000 may represent any of the mobile nodes 2000-1 through 2000-3 shown in FIG. 5.

Referring to FIGS. 8 and 10, in step S1101 of FIG. 8, the reception control part 1110 of the home agent 1000 receives a packet from the mobile node 2000. Then, in step S1102, the reception control part 1110 issues a "reception notice" to the packet analysis part 1120, requesting analysis of the packet. Receiving the "reception notice," in step S1103, the packet analysis part 1120 analyzes the type of the packet. If it is determined as a result of the analysis that the packet is a position registration request, in step S1104, the packet analysis part 1120 issues a "position registration request" to the movement management part 1310.

Receiving the "position registration request," in step S1105*a*, the movement management part 1310 analyzes the message, and records the position information of the mobile node 2000 in the position registration information data 1330. Further, in step S1105*b*, the movement management part 1310 extracts the IP address of an access router from the access router address information of the message.

FIG. 11 shows an embodiment of the position registration information data 1330. A home address, a care-of address, a position registration valid time, an access router IP address, and an anycast IP address are set for each mobile node in the position registration information data 1330.

After step S1105*b*, it is determined whether the position registration is IPv6. If YES, step S1105*c* is performed. If NO, step S1105*c* is skipped, and step S1105*d* is performed.

In step S1105*c*, the movement management part 1310 calculates the anycast address of the access router from the care-of address of the mobile node 2000, and in step S1105*d*, extracts a multicast address that the mobile node 2000 requests to join from multicast session information. Then, in step S1106, the movement management part 1310 issues to the mobile multicast control part 1320 a "session information notice" including the access router IP address serving as a multicast forwarding destination, the access router anycast address, and the multicast session information.

Receiving the "session information notice," in step S1107, the mobile multicast control part 1320 records information on the access router IP address and the access router anycast address in the position registration information data 1330. Then, in step S1108, the mobile multicast control part 1320 issues to the session setup part 1212 a "session setup request" including the multicast forwarding destination address and the multicast session information. Receiving the "session setup request," in step S1109, the session setup part 1212 registers a session with the session information data 1213 based on the multicast session information included in the message.

FIG. 12 shows an embodiment of the session information data 1213. The home address of a mobile node, the multicast session address of each multicast session, a tunneling destination point, and a tunnel ID are set in the session information data 1213.

The session information data 1213 is created based on a multicast session address that a mobile node wishes to join in a multicast join request message from the mobile node, or multicast session information in a position registration request message from a mobile node. The creation is triggered when one of the above-described two messages is received. For instance, if two mobile nodes give notice of respective multicast session addresses that the mobile nodes wish to join in respective multicast join requests, two entries are made even if the multicast session addresses are the same.

Referring to FIGS. 9 and 10, in step S1110 of FIG. 9, the session setup part 1212 issues a "tunnel setup request" including the multicast forwarding destination address to the tunnel control part 1211. Receiving the "tunnel setup request," in step S1111, the tunnel control part 1211 registers the multicast forwarding destination address included in the message with the session information data 1213. Then, in step S1112, the tunnel control part 1211 issues a "tunnel setup instruction" to the forwarding control part 1130, specifying the multicast forwarding destination address.

Further, in step S1114, the tunnel control part 1211 issues a "tunnel setup completion notice" reporting completion of a tunnel setup to the session setup part 1212. Receiving the "tunnel setup instruction," in step S1113, the forwarding control part 1130 sets up a tunnel device for a multicast packet to be forwarded.

Receiving the "tunnel setup completion notice," in step S1115, the session setup part 1212 obtains the forwarding destination address from the tunneling destination point of the session information data 1213. Then, in step S1116, the session setup part 1212 edits a multicast join request message addressed to the forwarding destination address, and in step S1117, issues a "transmission request" to the transmission control part 1140. If the transmission is performed normally, in step S1119, the session setup part 1212 issues a "session setup response" to the mobile multicast control part 1320. Receiving the "transmission request," in step S1118, the transmission control part 1140 transmits the packet specified in the "transmission request."

FIG. 13 shows a format of the multicast join request message. Referring to FIG. 13, a mobile node care-of address that is a transmitter, a home agent that is a transmission destination, a mobile node home address that is a transmitter, and a multicast session address that is a transmission destination are set, and multicast join request information is set as multicast session information.

Next, a description is given of processing in the case of the home agent 1000 receiving a multicast data packet set in the session information data 1213.

In step S1120, the reception control part 1110 receives a packet, and in step S1121, issues a "reception notice" to the packet analysis part 1120, requesting analysis of the packet. Receiving the "reception notice," in step S1122, the packet analysis part 1120 analyzes the type of the packet. If it is determined as a result of the analysis that the packet is multicast data, in step S1123, the packet analysis part 1120 issues a "forwarding request" to the forwarding control part 1130. Receiving the "forwarding request," in step S1124, the forwarding control part 1130 encapsulates the multicast packet with the forwarding destination address in accordance with the set tunnel setup. Then, in step S1125, the forwarding control part 1130 issues a "transmission request" to the transmission control part 1140. Receiving the "transmission request," in step S1126, the transmission control part 1140 transmits the packet specified in the "transmission request."

(Description of Processing 2)

In the case of receiving a multicast join request from a mobile node that has completed position registration, the home agent 1000 sets up a multicast session, and starts to forward a multicast packet to a corresponding access router.

Figure 14:
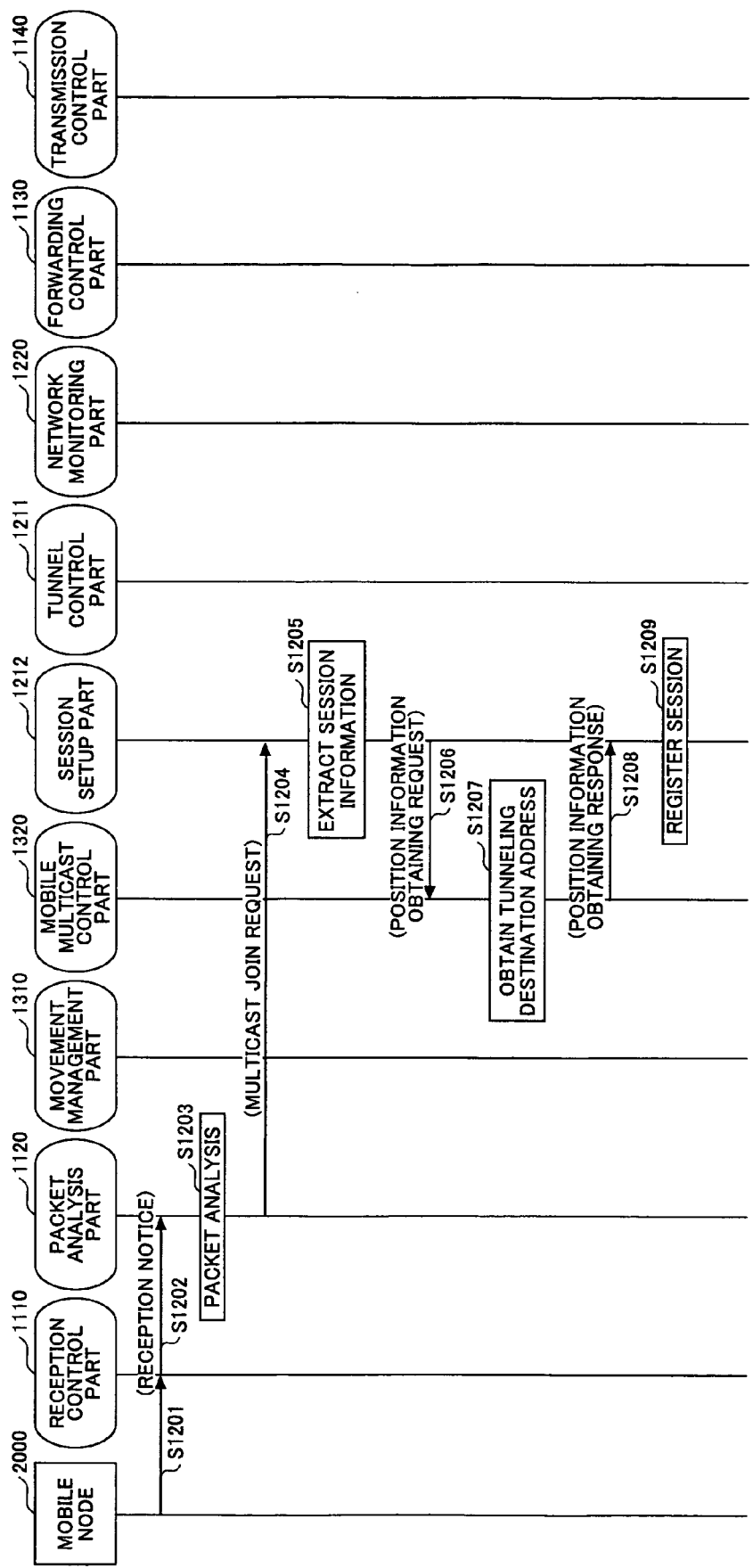
FIGS. 14 and 15 are sequence diagrams showing processing in the case of receiving a multicast join request from the mobile node according to the present invention.
Figure 15:
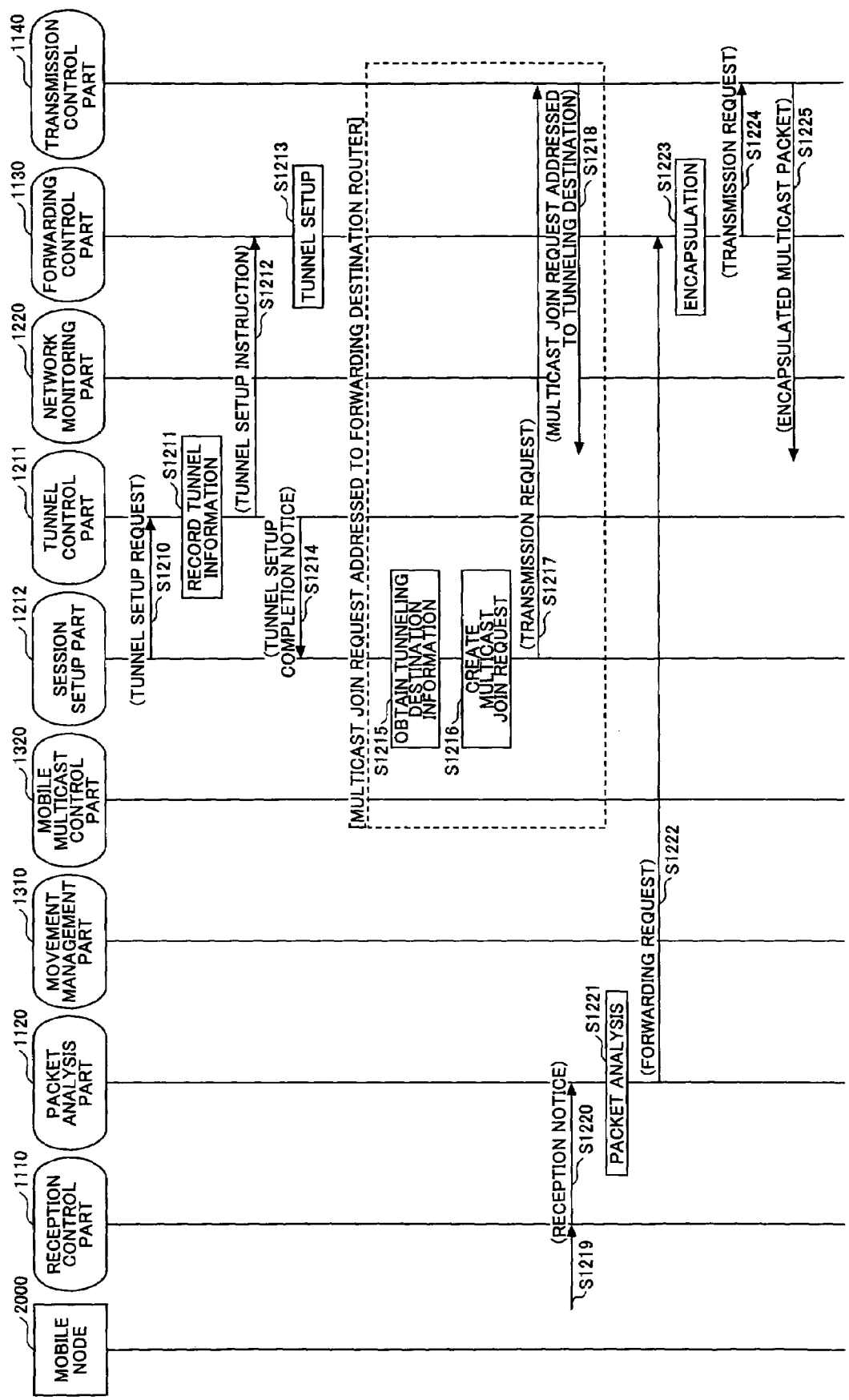
Figure 16:
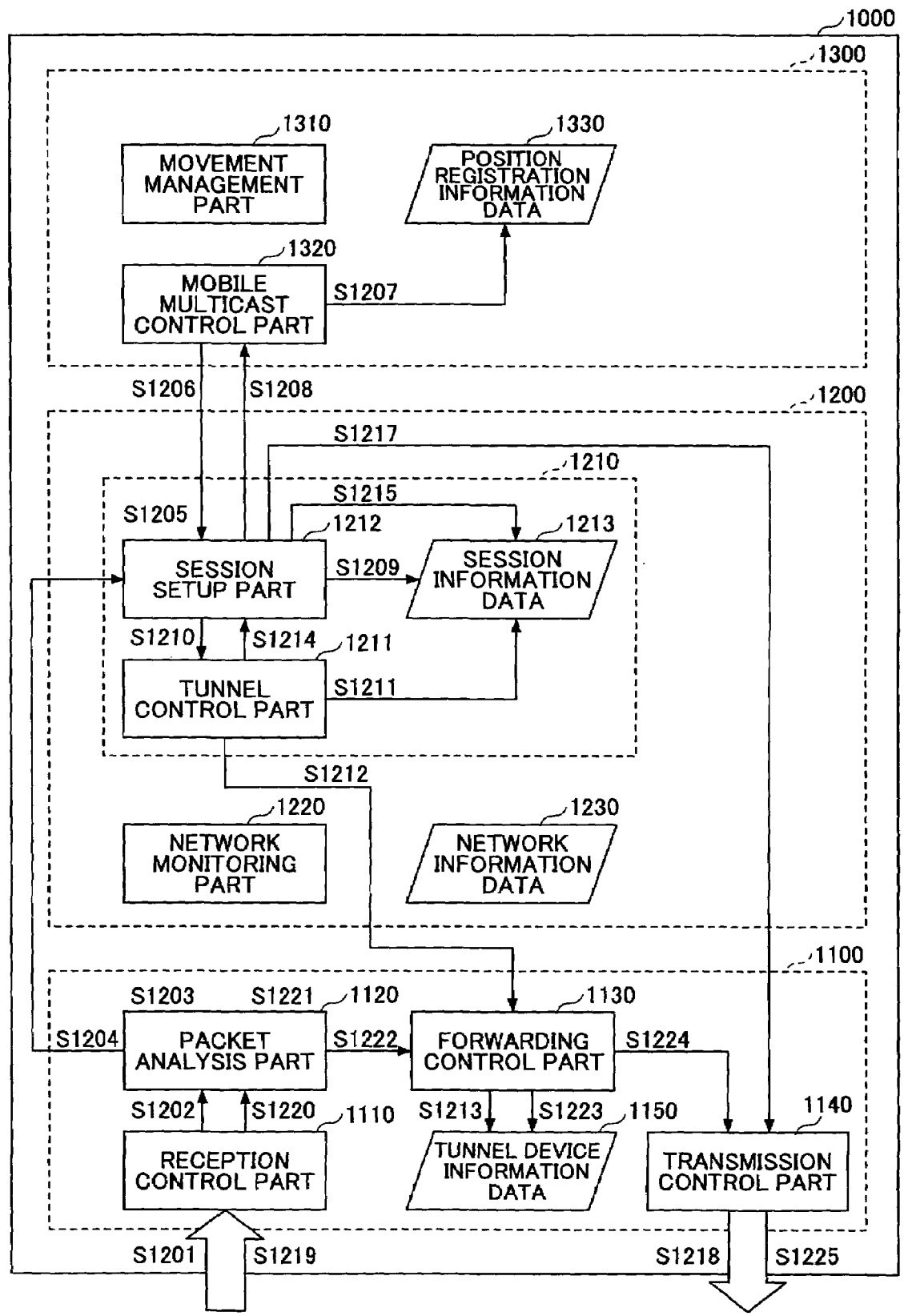
FIG. 16 is a functional correlation diagram of the home agent with respect to Processing 2 thereof according to the present invention.

FIGS. 14 and 15 are sequence diagrams showing processing in the case of receiving a multicast join request from a mobile node. FIG. 16 is a functional correlation diagram of the home agent 1000 with respect to Processing 2.

First, a description is given of processing from reception of a multicast join request from the mobile node 2000 to completion of a multicast forwarding control setup.

Referring to FIGS. 14 and 16, in step S1201 of FIG. 14, the reception control part 1110 of the home agent 1000 receives a packet. Then, in step S1202, the reception control part 1110 issues a "reception notice" to the packet analysis part 1120, requesting analysis of the packet. Receiving the "reception notice," in step S1203, the packet analysis part 1120 analyzes the type of the packet. If it is determined as a result of the analysis that the packet is a multicast join request, in step S1204, the packet analysis part 1120 issues a "multicast join request" to the session setup part 1212.

Receiving the "multicast join request," in step S1205, the session setup part 1212 analyzes the message, and in step S1206, issues a "position information obtaining request" including mobile node information (home address) to the mobile multicast control part 1320.

Receiving the "position information obtaining request," in step S1207, the mobile multicast control part 1320 obtains a multicast forwarding destination address registered as the multicast forwarding destination address of the mobile node 2000 from the position registration information data 1330 using the home address of the mobile node 2000 included in the message as a key. Then, in step S1208, the mobile multicast control part 1320 issues a "position information obtaining response" including the multicast forwarding destination address to the session setup part 1212. Receiving the "position information obtaining response," in step S1209, the session setup part 1212 registers a session with the session information data 1213.

Referring to FIGS. 15 and 16, in step S1210 of FIG. 15, the session setup part 1212 issues a "tunnel setup request" including the multicast forwarding destination address to the tunnel control part 1211.

Receiving the "tunnel setup request," in step S1211, the tunnel control part 1211 registers the multicast forwarding destination address included in the message with the session information data 1213. Then, in step S1212, the tunnel control part 1211 issues a "tunnel setup instruction" to the forwarding control part 1130, specifying the multicast forwarding destination address.

Further, in step S1214, the tunnel control part 1211 issues a "tunnel setup completion notice" reporting completion of a tunnel setup to the session setup part 1212. Receiving the "tunnel setup instruction," in step S1213, the forwarding control part 1130 sets up a tunnel device for a multicast packet to be forwarded.

Receiving the "tunnel setup completion notice," in step S1215, the session setup part 1212 obtains the forwarding destination address from the session information data 1213. Then, in step S1216, the session setup part 1212 edits a multicast join request message addressed to the forwarding destination address, and in step S1217, issues a "transmission request" to the transmission control part 1140. Receiving the "transmission request," in step S1218, the transmission control part 1140 transmits the packet specified in the "transmission request."

Next, a description is given of processing in the case of the home agent 1000 receiving a multicast data packet set in the session information data 1213.

In step S1210, the reception control part 1110 receives a packet, and in step S1220, issues a "reception notice" to the packet analysis part 1120, requesting analysis of the packet. Receiving the "reception notice," in step S1221, the packet analysis part 1120 analyzes the type of the packet. If it is determined as a result of the analysis that the packet is multicast data, in step S1222, the packet analysis part 1120 issues a "forwarding request" to the forwarding control part 1130.

Receiving the "forwarding request," in step S1223, the forwarding control part 1130 encapsulates the multicast packet with the forwarding destination address in accordance with the set tunnel setup. Then, in step S1224, the forwarding control part 1130 issues a "transmission request" to the transmission control part 1140. Receiving the "transmission request," in step S1225, the transmission control part 1140 transmits the packet specified in the "transmission request."

(Description of Processing 3)

In the case of receiving a position registration request including multicast join request information from a new mobile node, receiving a multicast join request from a new mobile node, receiving a position registration request including new multicast leave request information, and receiving a new multicast leave request, the home agent 1000, referring to a set multicast packet forwarding situation, controls the forwarding destination of a multicast packet in accordance with the forwarding situation.

FIG. 17 shows a format of the multicast leave request message. Referring to FIG. 17, a mobile node care-of address that is a transmitter, a home agent that is a transmission destination, a mobile node home address that is a transmitter, and a multicast session address that is a transmission destination are set, and multicast leave request information is set as multicast session information.

Figure 18:
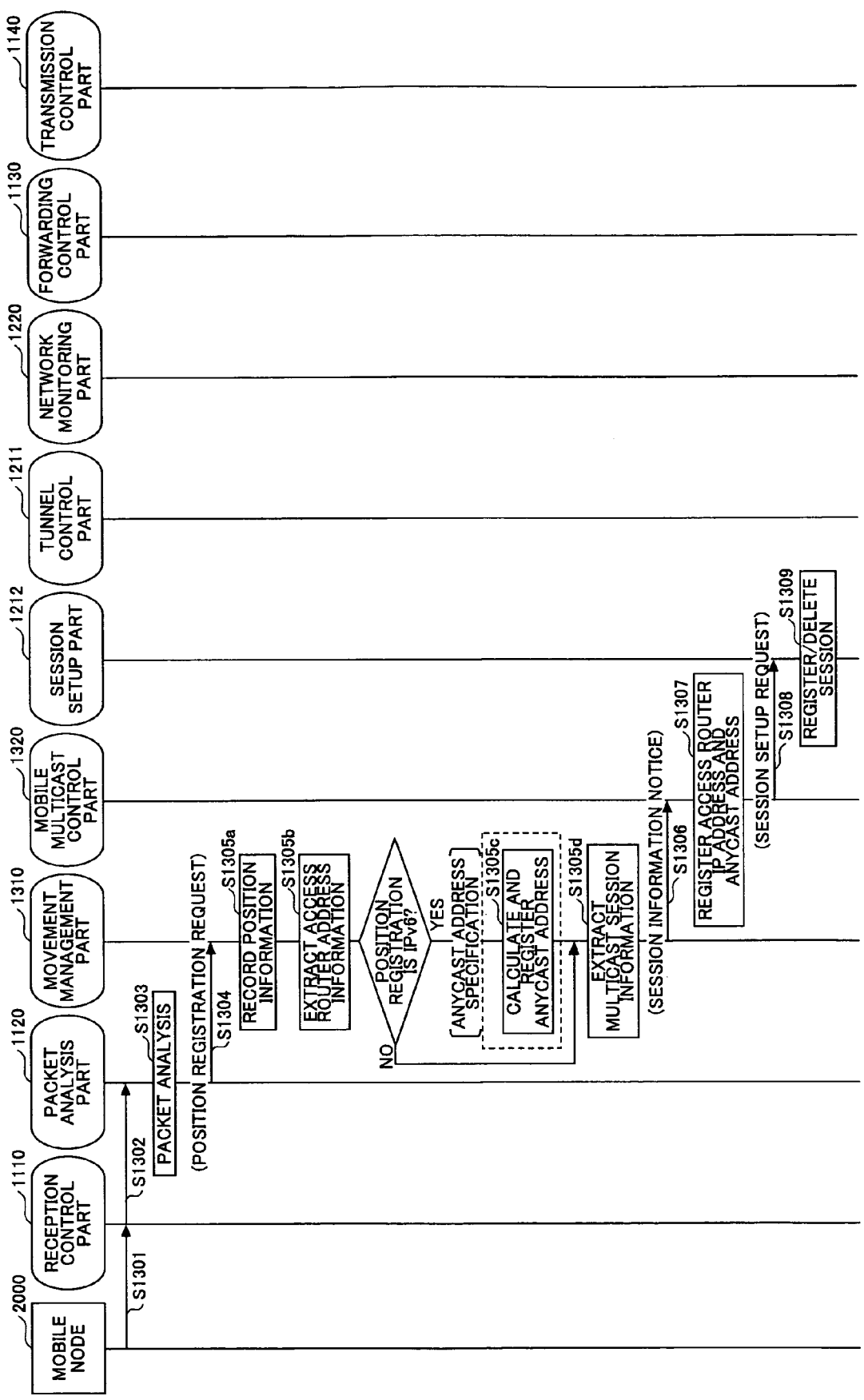
FIGS. 18 and 19 are sequence diagrams showing the processing of controlling a multicast packet forwarding destination by the position registration request including multicast join/leave request information according to the present invention.
Figure 19:
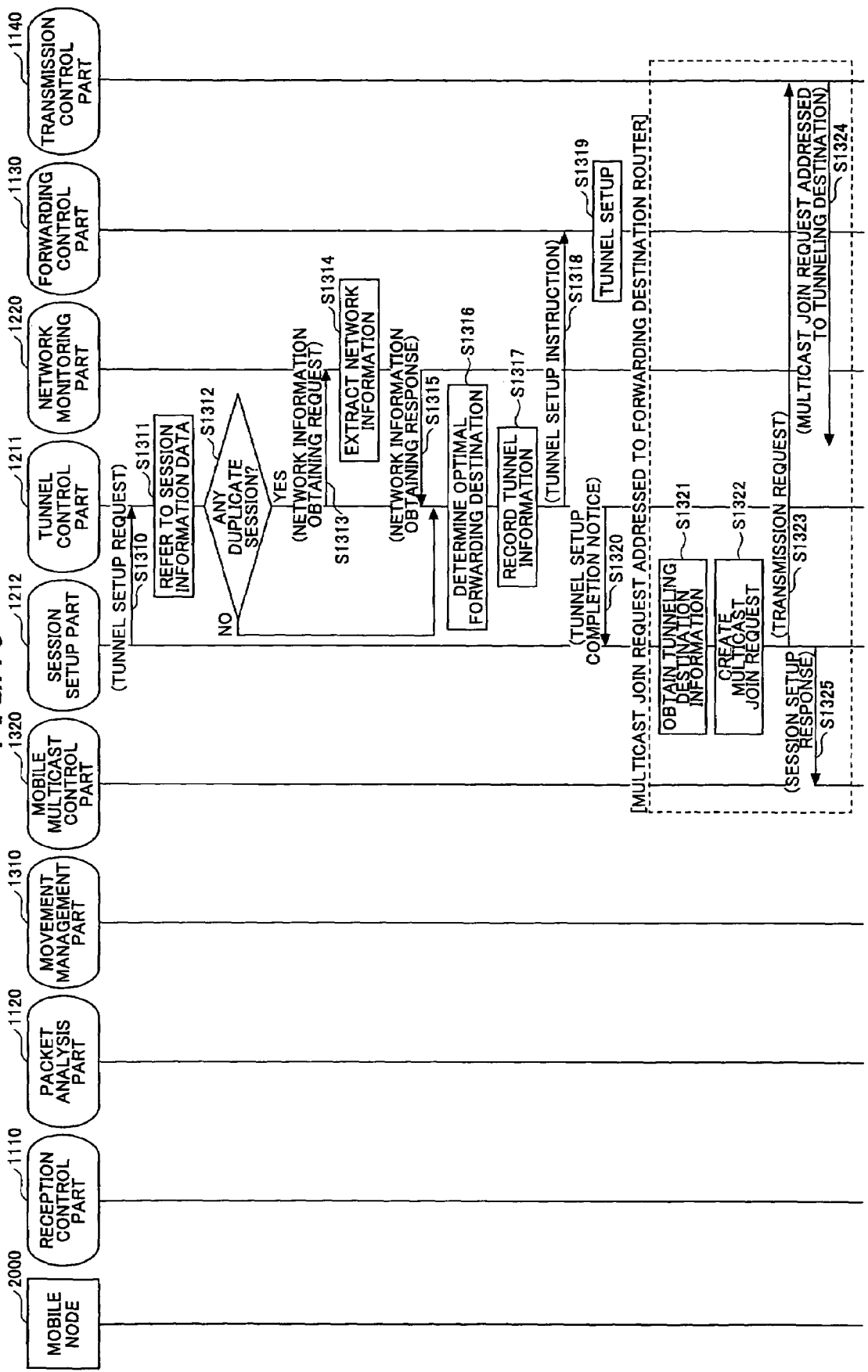
Figure 20:
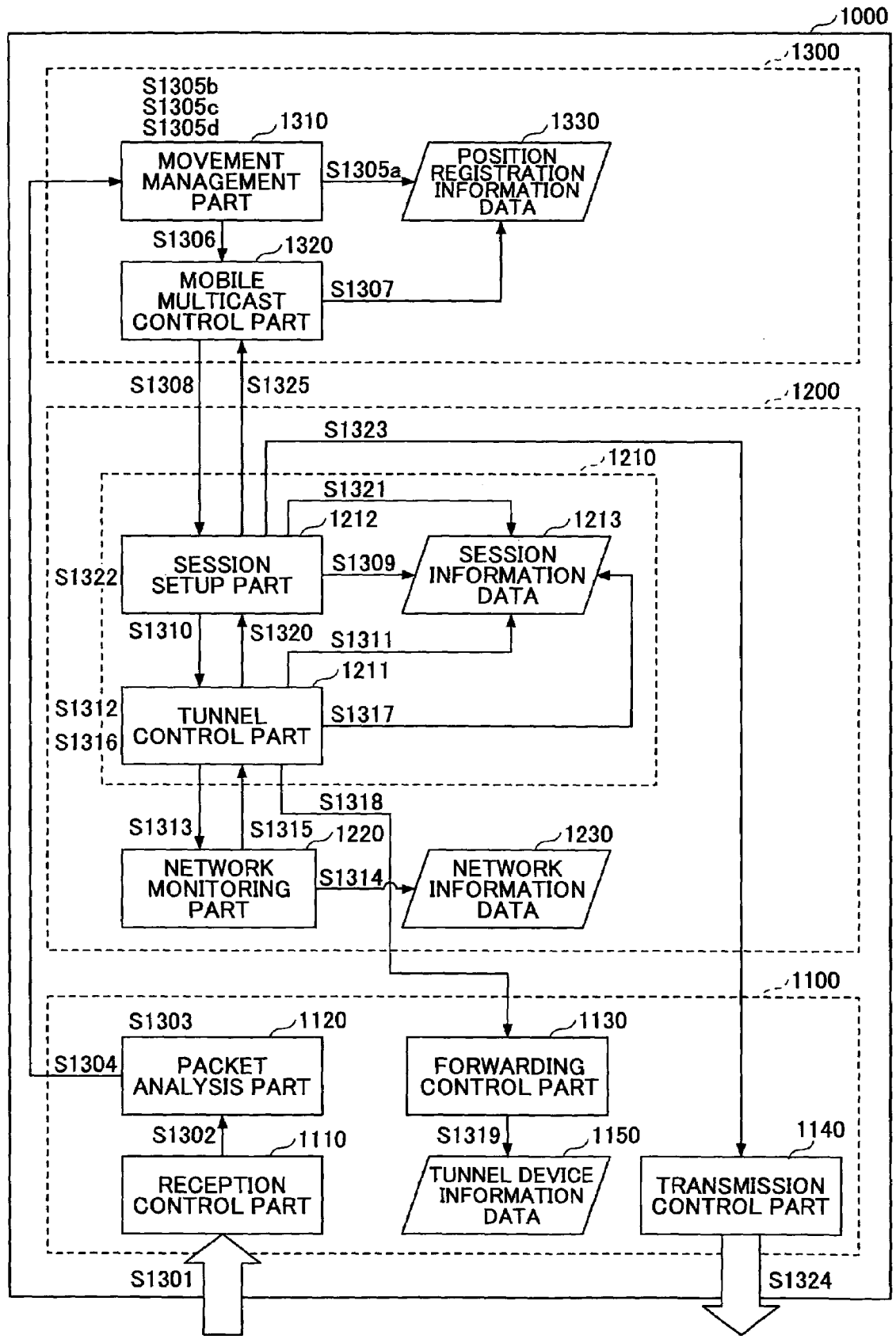
FIG. 20 is a functional correlation diagram of the home agent with respect to Processing 3 thereof according to the present invention.

FIGS. 18 and 19 are sequence diagrams showing the processing of controlling the forwarding destination of a multicast packet in accordance with a set multicast packet forwarding situation referring thereto in the case of newly receiving a position registration request including multicast join request information or a position registration request including multicast leave request information from a mobile node. FIG. 20 is a functional correlation diagram of the home agent 1000 with respect to Processing 3.

First, a description is given of processing up to completion of a multicast forwarding control setup in the case of receiving a position registration request including multicast join request information or multicast leave request information from the mobile node 2000, which is a new mobile node.

Referring to FIGS. 18 and 20, in step S1301 of FIG. 18, the reception control part 1110 of the home agent 1000 receives a packet. Then, in step S1302, the reception control part 1110 issues a "reception notice" to the packet analysis part 1120, requesting analysis of the packet. Receiving the "reception notice," in step S1303, the packet analysis part 1120 analyzes the type of the packet. If it is determined as a result of the analysis that the packet is a position registration request, in step S1304, the packet analysis part 1120 issues a "position registration request" to the movement management part 1310.

Receiving the "position registration request," in step S1305a, the movement management part 1310 analyzes the message, and records the position information of the mobile node 2000 in the position registration information data 1330. Further, in step S1305b, the movement management part 1310 extracts the IP address of an access router from the access router address information of the message. After step S1305b, it is determined whether the position registration is IPv6. If YES, step S1305c is performed. If NO, step S1305c is skipped, and step S1305d is performed. In step S1305c, the movement management part 1310 calculates the anycast address of the access router from the care-of address of the mobile node 2000, and in step S1305d, extracts a multicast address that the mobile node 2000 requests to join or leave from multicast session information. Then, in step S1306, the movement management part 1310 issues to the mobile multicast control part 1320 a "session information notice" including the access router IP address serving as a multicast forwarding destination, the access router anycast address, and the multicast session information.

Receiving the "session information notice," in step S1307, the mobile multicast control part 1320 records information on the access router IP address and the access router anycast address in the position registration information data 1330. Then, in step S1308, the mobile multicast control part 1320 issues to the session setup part 1212 a "session setup request" including the multicast forwarding destination address and the multicast session information.

Receiving the "session setup request," in step S1309, the session setup part 1212 registers a session with or deletes a session from the session information data 1213 based on the multicast session information included in the message.

Referring to FIGS. 19 and 20, in step S1310 of FIG. 19, the session setup part 1212 issues a "tunnel setup request" including the multicast forwarding destination address to the tunnel control part 1211.

Receiving the "tunnel setup request," in step S1311, the tunnel control part 1211 refers to the session information data 1213 using the multicast forwarding destination address included in the message as a key, and in step S1312, determines the presence or absence of a registered session (or a duplicate session). If a corresponding session is found as a result of the determination, in step S1313, the tunnel control part 1211 issues a "network information obtaining request" including the forwarding destination address of the corresponding session to the network monitoring part 1220.

Receiving the "network information obtaining request," in step S1314, the network monitoring part 1220 obtains corresponding network information from the network information data 1230 using the forwarding destination address as a key. Then, in step S1315, the network monitoring part 1220 issues a "network information obtaining response" to the tunnel control part 1211.

Figure 23:
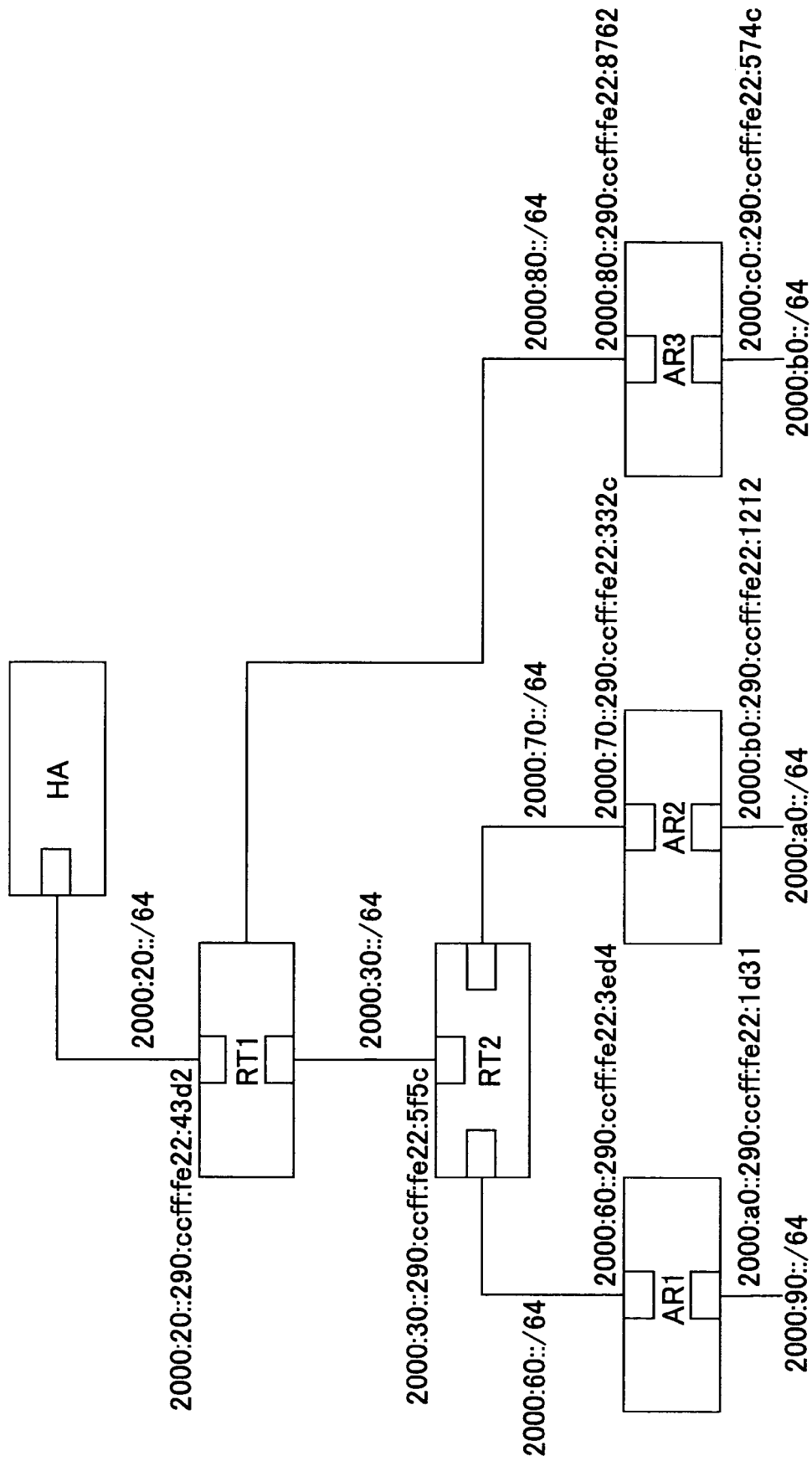
FIG. 23 is a diagram showing network information data (topology information) according to the present invention.

FIGS. 21 through 23 show a structure of an embodiment of the network information data 1230. FIG. 21 shows network information data (tree information). Referring to FIG. 21, the number of hops from a home agent (HA) and an index of addresses to go through (a go-through address index) are set for each forwarding destination address. The go-through address index, which is expressed by an arrangement of indexes shown in FIG. 22, indicates router addresses to go through to the forwarding destination address.

FIG. 22 shows network information data (address list information). Referring to FIG. 22, an index is set for each router address.

FIG. 23 shows network information data (topology information). Referring to FIG. 23, the topology information from a home agent (HA) to destination addresses via routers is set.

Receiving the "network information obtaining response," in step S1316, the tunnel control part 1211 determines an optimal forwarding destination address from the topology information of the forwarding destination address included in the message, and in step S1317, registers the forwarding destination address with the session information data 1213. Then, in step S1318, the tunnel control part 1211 issues a "tunnel setup instruction" to the forwarding control part 1130, specifying the multicast forwarding destination address. Further, in step S1320, the tunnel control part 1211 issues a "tunnel setup completion notice" reporting completion of a tunnel setup to the session setup part 1212.

Receiving the "tunnel setup instruction," in step S1319, the forwarding control part 1130 sets up a tunnel device for a multicast packet to be forwarded. Receiving the "tunnel setup completion notice," in step S1321, the session setup part 1212 obtains the forwarding destination address from the session information data 1213. Then, in step S1322, the session setup part 1212 edits a multicast join request message addressed to the forwarding destination address.

Further, in step S1323, the session setup part 1212 issues a "transmission request" to the transmission control part 1140. If the transmission is performed normally, in step S1325, the session setup part 1212 issues a "session setup response" to the mobile multicast control part 1320. Receiving the "transmission request," in step S1324, the transmission control part 1140 transmits the packet specified in the "transmission request."

Figure 24:
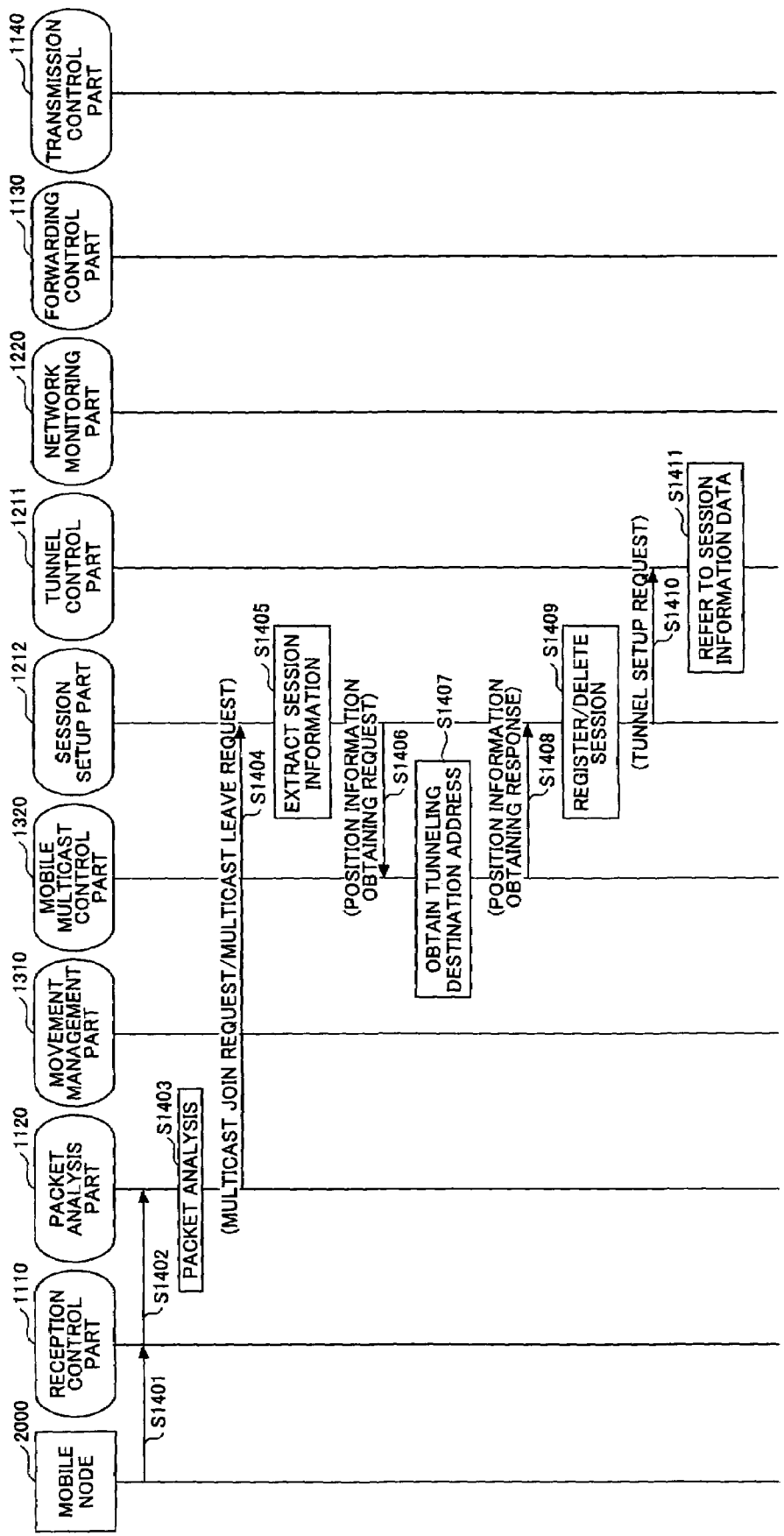
FIGS. 24 and 25 are sequence diagrams showing the processing of controlling the multicast packet forwarding destination by a multicast join/leave request according to the present invention.
Figure 25:
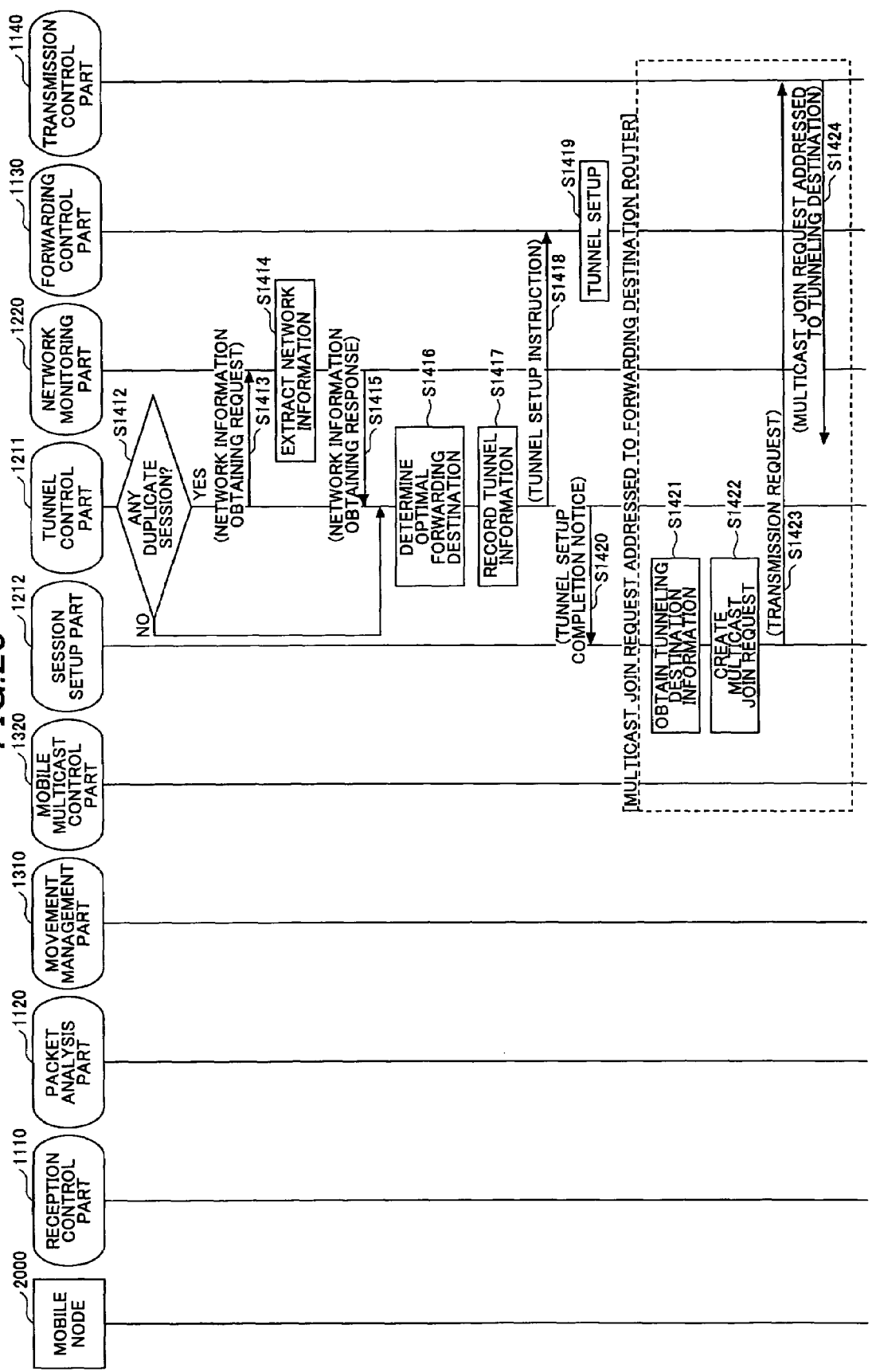
Figure 26:
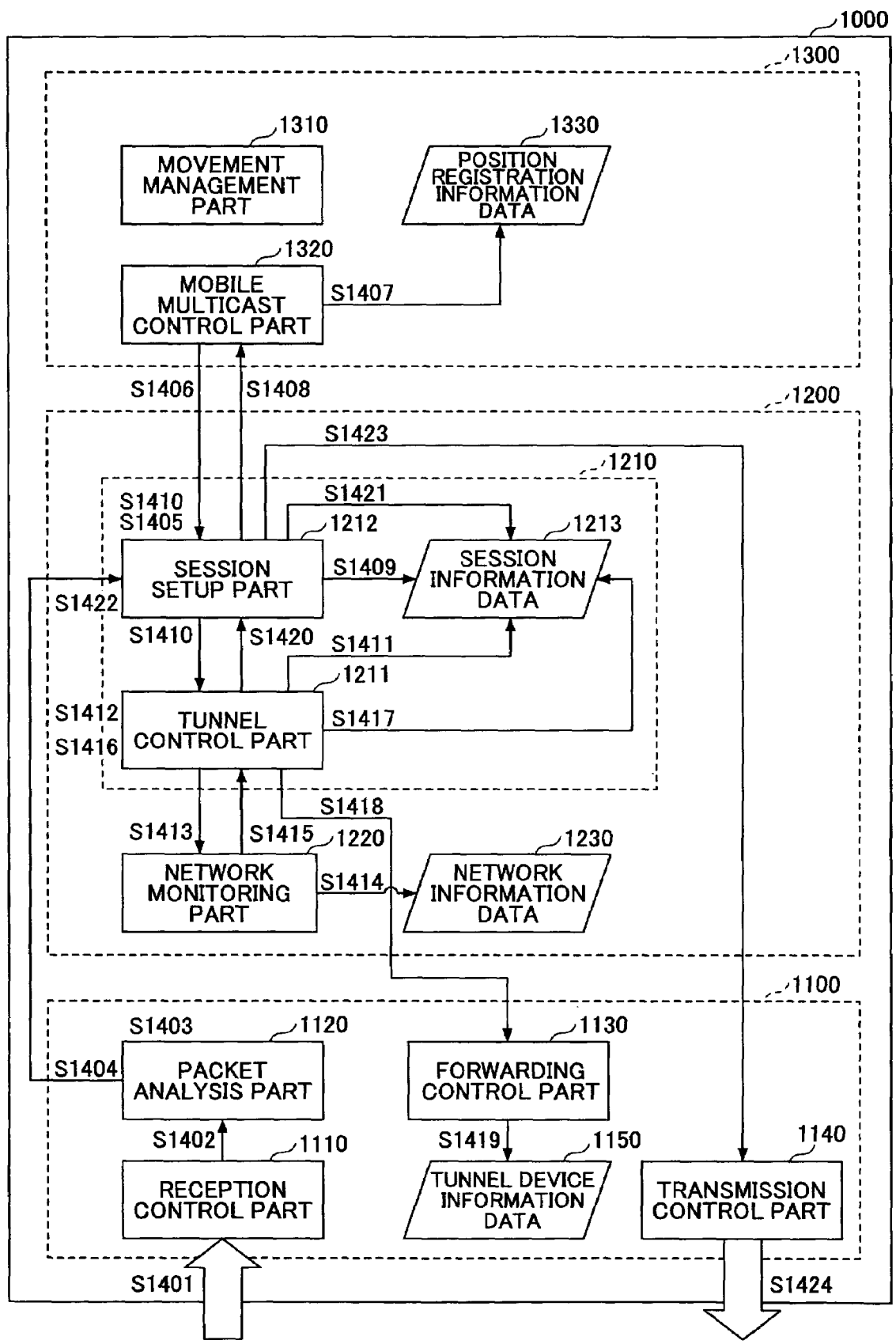
FIG. 26 is a functional correlation diagram of the home agent with respect to Processing 3 thereof according to the present invention.

FIGS. 24 and 25 are sequence diagrams showing the processing of controlling the forwarding destination of a multicast packet in accordance with a set multicast packet forwarding situation referring thereto in the case of newly receiving a multicast join request or a multicast leave request (a request to leave multicast) from a mobile node. FIG. 26 is a functional correlation diagram of the home agent 1000 with respect to Processing 3.

A description is given of processing from reception of a multicast join request or a multicast leave request from the mobile node 2000 to completion of a multicast forwarding control setup.

Referring to FIGS. 24 and 26, in step S1401 of FIG. 24, the reception control part 1110 of the home agent 1000 receives a packet. Then, in step S1402, the reception control part 1110 issues a "reception notice" to the packet analysis part 1120, requesting analysis of the packet. Receiving the "reception notice," in step S1403, the packet analysis part 1120 analyzes the type of the packet. If it is determined as a result of the analysis that the packet is a multicast join request or a multicast leave request, in step S1404, the packet analysis part 1120 issues a "multicast join request" or a "multicast leave request" to the session setup part 1212.

Receiving the "multicast join request" or "multicast leave request," in step S1405, the session setup part 1212 analyzes the message, and in step S1406, issues a "position information obtaining request" including mobile node information (home address) to the mobile multicast control part 1320.

Receiving the "position information obtaining request," in step S1407, the mobile multicast control part 1320 obtains a multicast forwarding destination address registered as the multicast forwarding destination of the mobile node 2000 from the position registration information data 1330 using the home address of the mobile node 2000 included in the message as a key. Then, in step S1408, the mobile multicast control part 1320 issues a "position registration obtaining response" including the multicast forwarding address to the session setup part 1212.

Receiving the "position registration obtaining response," in step S1409, the session setup part 1212 registers a session with or deletes a session from the session information data 1213, and in step S1410, issues a "tunnel setup request" including the multicast forwarding address to the tunnel control part 1211.

Receiving the "tunnel setup request," in step S1411, the tunnel control part 1211 refers to the session information data 1213 using the multicast forwarding address included in the message as a key.

Referring to FIGS. 25 and 26, in step S1412 of FIG. 25, the tunnel control part 1211 determines the presence or absence of a registered session (or a duplicate session). If a corresponding session is found as a result of the determination, in step S1413, the tunnel control part 1211 issues a "network information obtaining request" including the forwarding destination address of the corresponding session to the network monitoring part 1220.

Receiving the "network information obtaining request," in step S1414, the network monitoring part 1220 obtains corresponding network information from the network information data 1230 using the forwarding destination address included in the message as a key, and in step S1415, issues a "network information obtaining response" to the tunnel control part 1211.

Receiving the "network information obtaining response," in step S1416, the tunnel control part 1211 determines an optimal forwarding destination address from the topology information of the forwarding destination address included in the message. Then, in step S1417, the tunnel control part 1211 registers the forwarding destination address with the session information data 1213, and in step S1418, issues a "tunnel setup instruction" to the forwarding control part 1130, specifying the multicast forwarding destination address.

Further, in step S1420, the tunnel control part 1211 issues a "tunnel setup completion notice" reporting completion of a tunnel setup to the session setup part 1212. Receiving the "tunnel setup instruction," in step S1419, the forwarding control part 1130 sets up a tunnel device for a multicast packet to be forwarded.

Receiving the "tunnel setup completion notice," in step S1421, the session setup part 1212 obtains the forwarding destination address from the session information data 1213. Then, in step S1422, the session setup part 1212 edits a multicast join request message addressed to the forwarding destination address, and in step S1423, issues a "transmission request" to the transmission control part 1140. Receiving the "transmission request," in step S1424, the transmission control part 1140 transmits the packet specified in the "transmission request."

(Description of Processing 4 and Processing 5)

The home agent 1000 periodically monitors network information, and changes the forwarding destination of a multicast packet to an optimal router.

Figure 27:
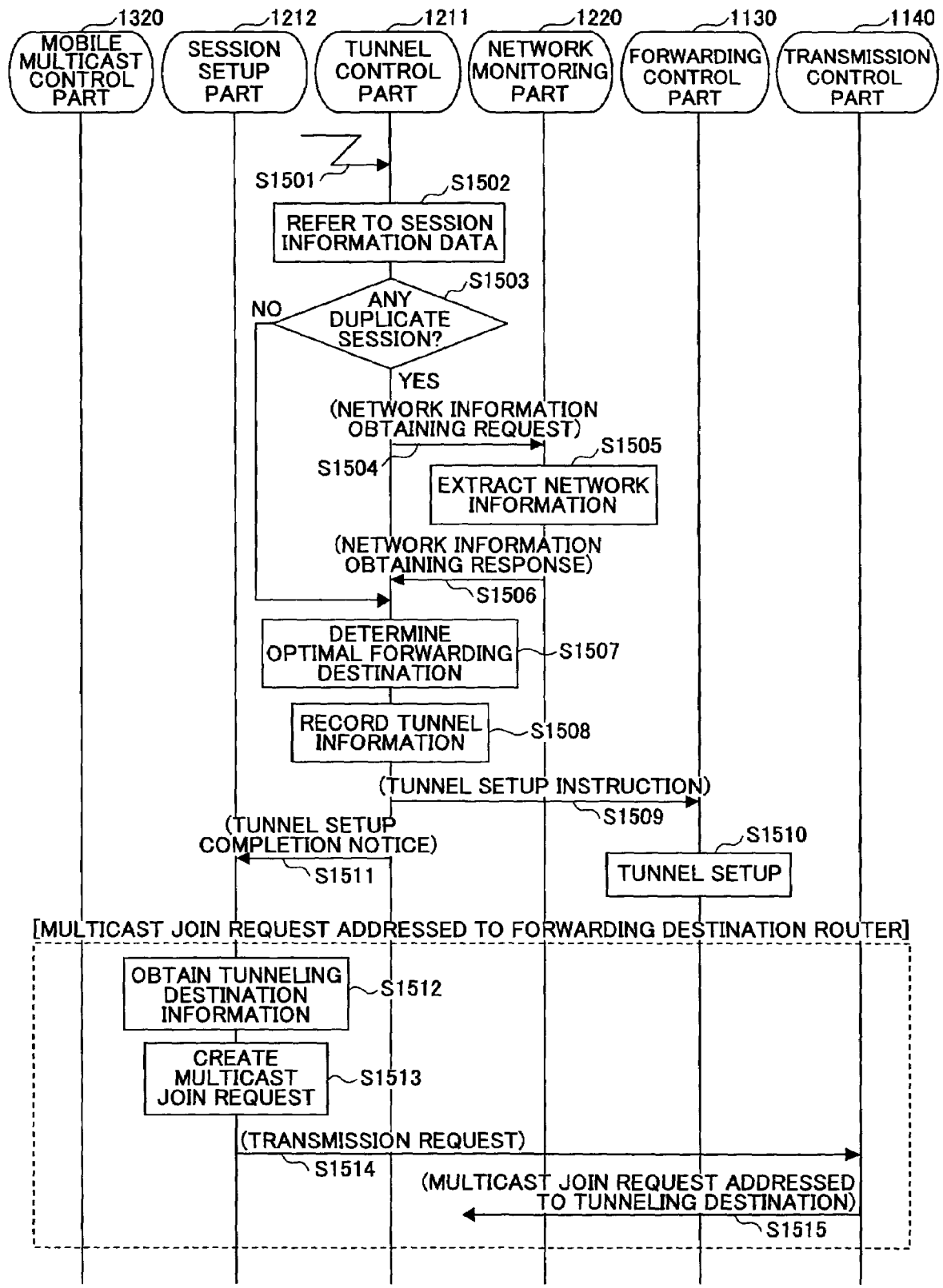
FIG. 27 is a sequence diagram showing the processing of changing the multicast packet forwarding destination to an optimal router according to the present invention.
Figure 28:
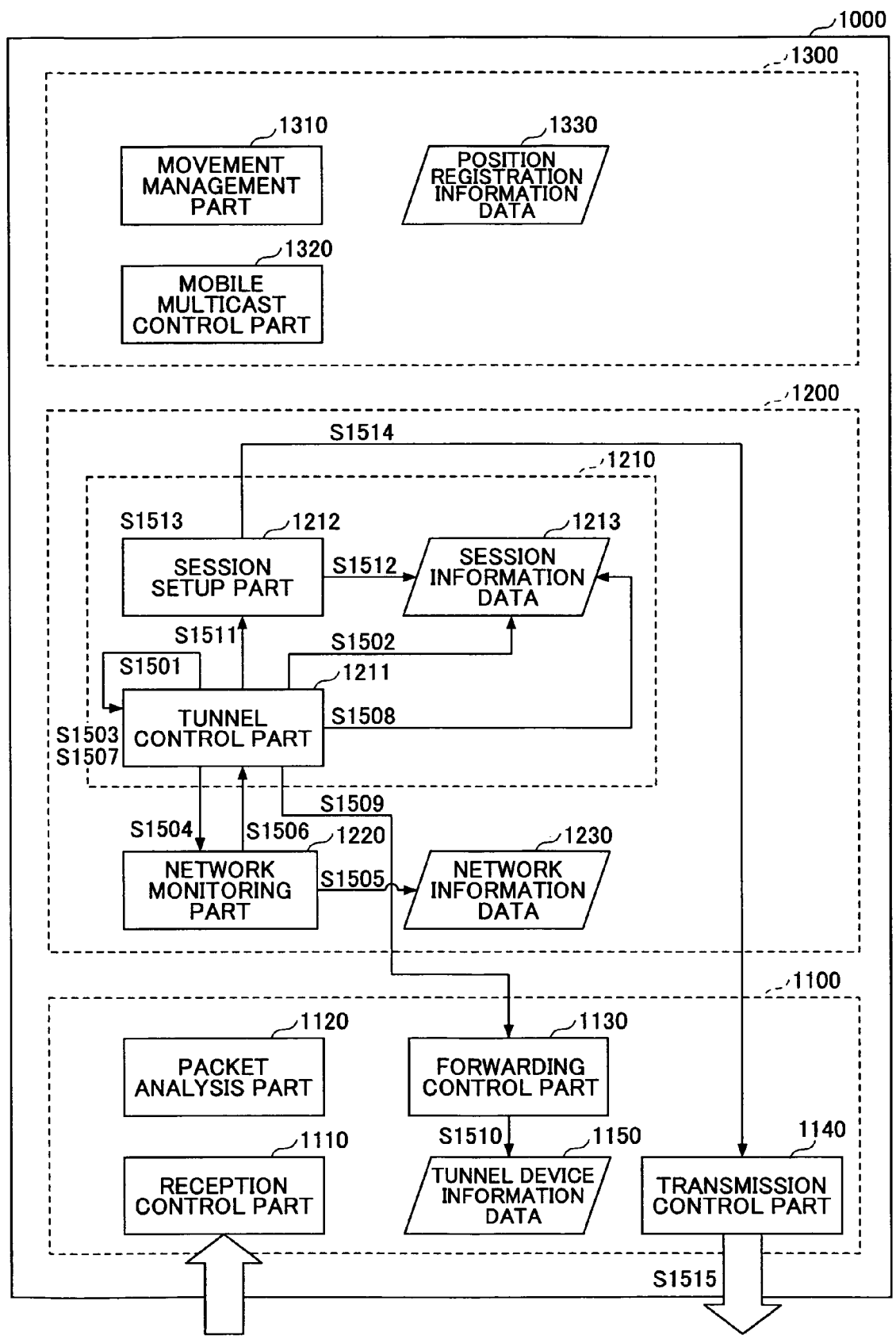
FIG. 28 is a functional correlation diagram of the home agent with respect to Processing 4 thereof according to the present invention.

FIG. 27 is a sequence diagram showing the processing of periodically monitoring network information and changing the forwarding destination of a multicast packet to an optimal router. FIG. 28 is a functional correlation diagram of the home agent 1000 with respect to Processing 4.

Referring to FIGS. 27 and 28, the tunnel control part 1211 has an internal timer, and when the internal timer expires in step S1501 of FIG. 27, in step S1502, the tunnel control part 1211 periodically refers to the session information data 1213 for its multicast session information, and in step S1503, determines the presence or absence of a duplicate multicast session. The duplicate multicast session refers to a state where there are multiple identical multicast session addresses in the session information data 1213.

If a corresponding multicast session is found as a result of the determination (YES in step S1503), in step S1504, the tunnel control part 1211 issues a "network information obtaining request" including the forwarding destination address of the corresponding multicast session to the network monitoring part 1220.

Receiving the "network information obtaining request," in step S1505, the network monitoring part 1220 obtains corresponding network information from the network information data 1230 using the forwarding destination address included in the message as a key, and in step S1506, issues a "network information obtaining response" to the tunnel control part 1211.

Receiving the "network information obtaining response," in step S1507, the tunnel control part 1211 determines an optimal forwarding destination address from the topology information of the forwarding destination address included in the message, and in step S1508, registers the forwarding destination address with the session information data 1213. Further, in step S1509, the tunnel control part 1211 issues a "tunnel setup instruction" to the forwarding control part 1130, specifying the multicast forwarding destination address. Further, in step S1511, the tunnel control part 1211 issues a "tunnel setup completion notice" reporting completion of a tunnel setup to the session setup part 1212.

Receiving the "tunnel setup instruction," in step S1510, the forwarding control part 1130 sets up a tunnel device for a multicast packet to be forwarded. Receiving the "tunnel setup completion notice," in step S1512, the session setup part 1212 obtains the forwarding destination address from the session information data 1213. Then, in step S1513, the session setup part 1212 edits a multicast join request message addressed to the forwarding destination address, and in step S1514, issues a "transmission request" to the transmission control part 1140. Receiving the "transmission request," in step S1515, the transmission control part 1140 transmits the packet specified in the "transmission request."

(Description of Processing 6)

The home agent 1000 stops forwarding a multicast packet to a corresponding router when detecting packet duplication.

Figure 29:
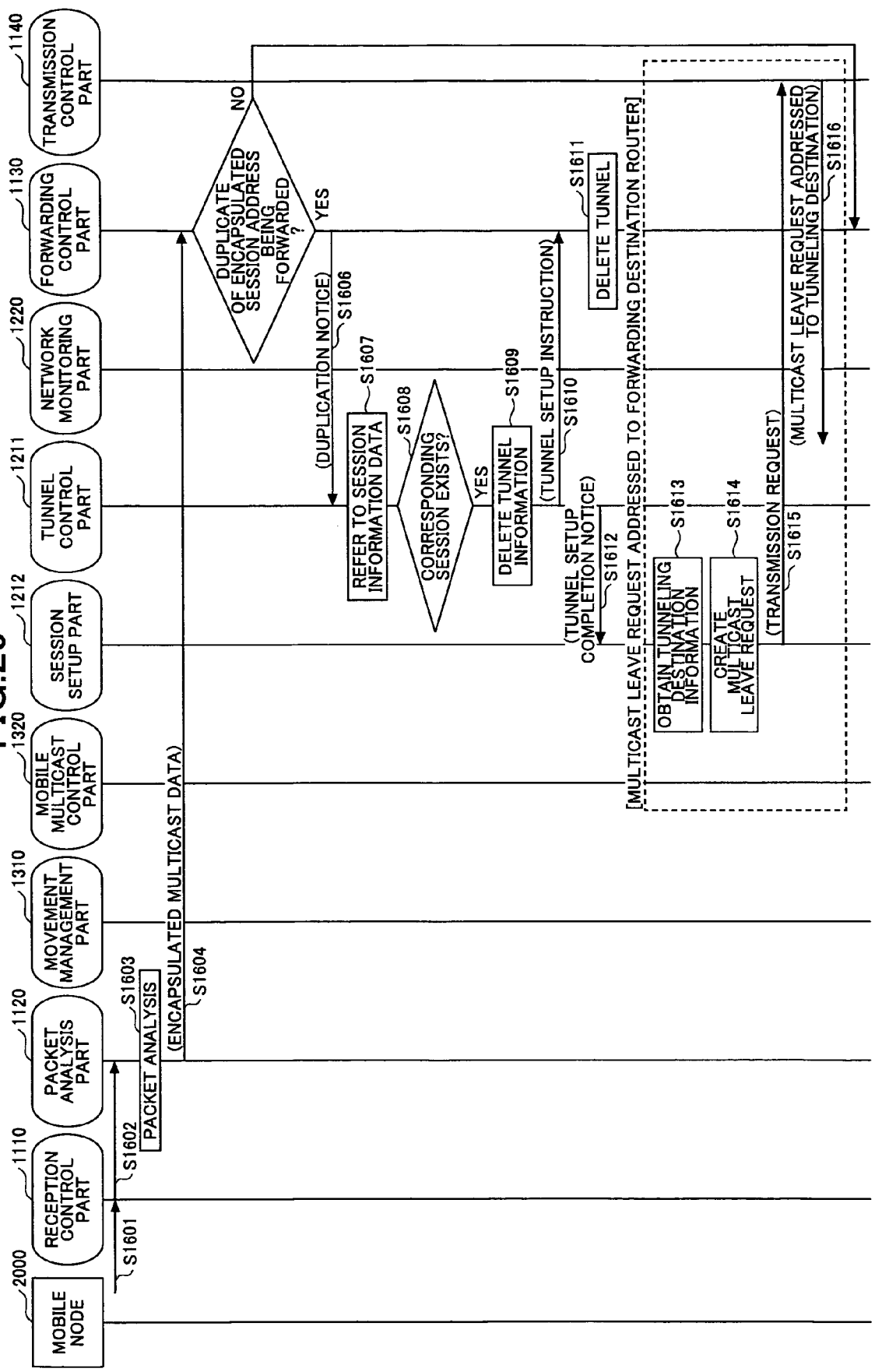
FIG. 29 is a sequence diagram showing the processing of stopping forwarding a multicast packet to a corresponding router by detection of packet duplication according to the present invention.
Figure 30:
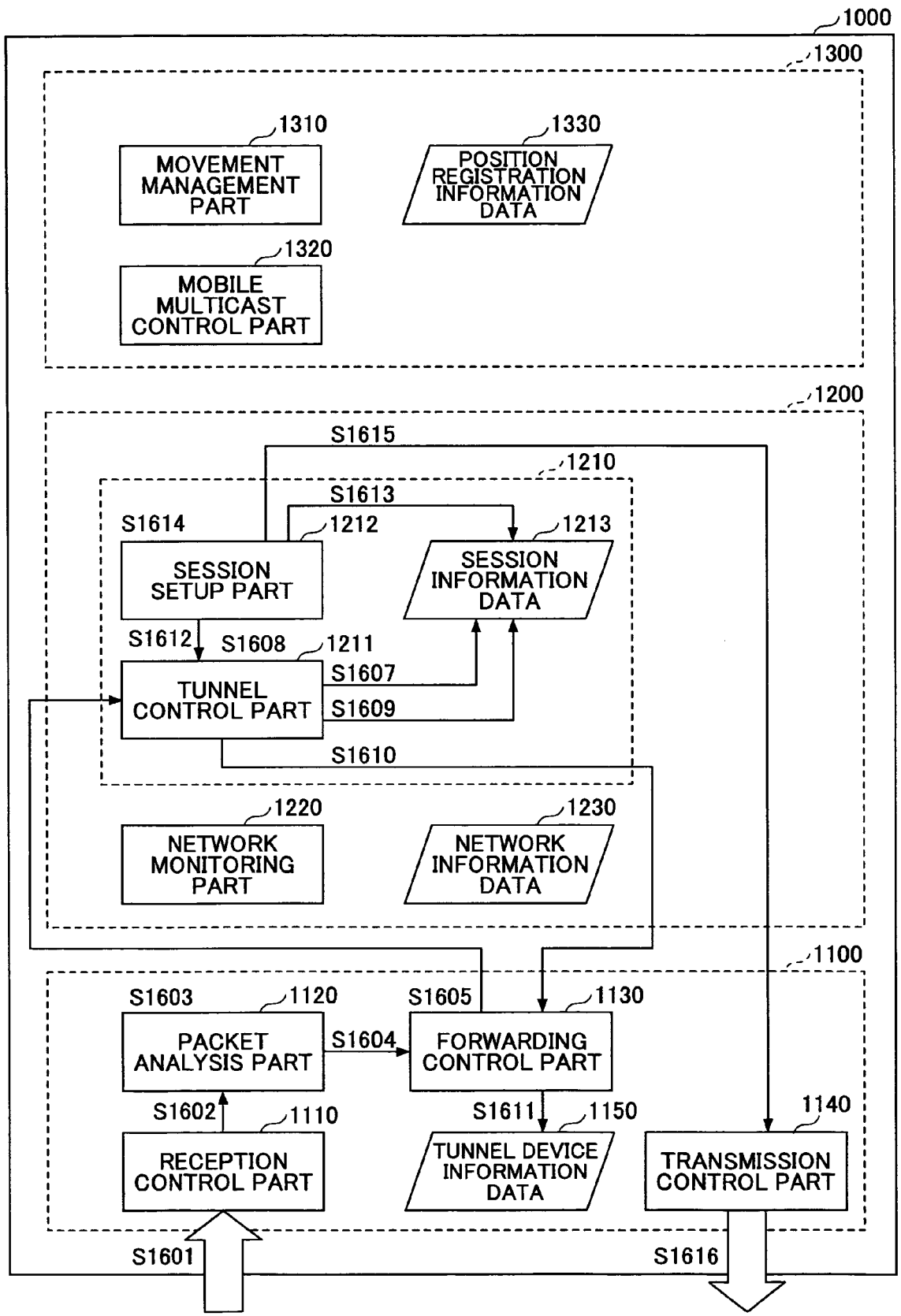
FIG. 30 is a functional correlation diagram of the home agent with respect to Processing 6 thereof according to the present invention.

FIG. 29 is a sequence diagram showing the processing of stopping forwarding a multicast packet to a corresponding router in the case of detecting packet duplication. FIG. 30 is a functional correlation diagram of the home agent 1000 with respect to Processing 6.

Referring to FIGS. 29 and 30, in step S1601 of FIG. 29, the reception control part 1110 of the home agent 1000 receives a packet. Then, in step S1602, the reception control part 1110 issues a "reception notice" to the packet analysis part 1120, requesting analysis of the packet. Receiving the "reception notice," in step S1603, the packet analysis part 1120 analyzes the type of the packet. If it is determined as a result of the analysis that the packet is multicast data, in step S1604, the packet analysis part 1120 issues a "forwarding request" to the forwarding control part 1130.

Receiving the "forwarding request," in step S1605, the forwarding control part 1130 determines whether the multicast packet of which it is notified in the "forwarding request" is a duplicate of an encapsulated multicast session address that the forwarding control part 1130 is forwarding. If the forwarding control part 1130 detects duplication, in step S1606, the forwarding control part 1130 issues a "duplication notice" to the tunnel control part 1211.

Receiving the "duplication notice," in step S1607, the tunnel control part 1211 refers to the session information data 1213 using the multicast session address included in the message as a key, and in step S1608, determines whether there is a corresponding session. If there is a corresponding session (YES in step S1608), in step S1609, the tunnel control part 1211 deletes the forwarding destination address of the corresponding session.

Then, in step S1610, the tunnel control part 1211 issues a "tunnel setup instruction" to the forwarding control part 1130 without specifying a multicast forwarding destination address. Further, in step S1612, the tunnel control part 1211 issues a "tunnel setup completion notice" reporting completion of a tunnel setup to the session setup part 1212.

Receiving the "tunnel setup instruction," in step S1611, the forwarding control part 1130 sets up a tunnel device (deletes a tunnel) for the multicast packet to be forwarded. Receiving the "tunnel setup completion notice," in step S1613, the session setup part 1212 obtains the forwarding destination address from the session information data 1213. Then, in step S1614, the session setup part 1212 edits a multicast leave request message addressed to the forwarding destination address, and in step S1615, issues a "transmission request" to the transmission control part 1140. Receiving the "transmission request," in step S1616, the transmission control part 1140 transmits the packet specified in the "transmission request."

[Mobile Node Configuration]

Figure 31:
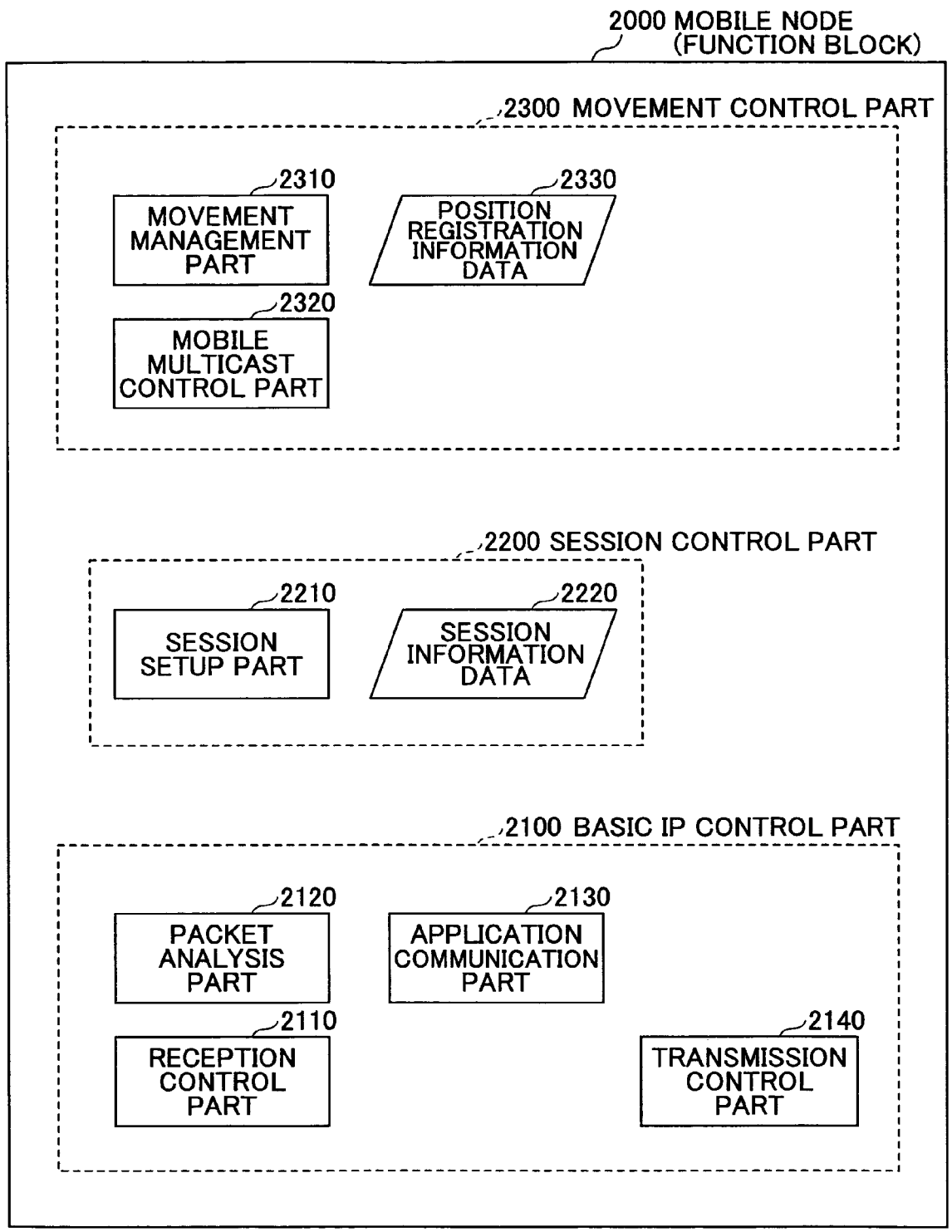
FIG. 31 is a block diagram showing an embodiment of the mobile node according to the present invention.

A description is given of a mobile node according to the present invention. FIG. 31 is a block diagram showing an embodiment of the mobile node 2000 of the present invention.

Referring to FIG. 31, the mobile node 2000 includes a reception control part 2110, a packet analysis part 2120, an application communication part 2130, a transmission control part 2140, a session setup part 2210, session information data 2220, a movement control part 2310, a mobile multicast control part 2320, and position registration information data 2330.

A basic IP control part 2100 includes the reception control part 2110, the packet analysis part 2120, the application communication part 2130, and the transmission control part 2140.

The reception control part 2110 controls packet reception. The packet analysis part 2120 analyzes a packet type, and notifies the application communication part 2130, the session setup part 2210, or the movement management part 2310 of the analysis result.

The application communication part 2130 receives data packets from the packet analysis part 2120, and distributes the data packets to corresponding appropriate applications. Further, the application communication part 2130 issues a "session start request" to the session setup part 2210. The transmission control part 2140 controls packet transmission.

A session control part 2200 includes the session setup part 2210 and the session information data 2220. Receiving a "session inquiry request" from the mobile multicast control part 2320, the session setup part 2210 queries the session information data 2220, and issues a "session inquiry response" to the mobile multicast control part 2320.

A multicast session address is set for each multicast group in the session information data 2220.

The session setup part 2210, receiving a "session start request" from the application communication part 2130, registers a session with the session information data 2230.

Further, receiving a "multicast session inquiry request" packet from the packet analysis part 2120, the session setup part 2210 edits a "multicast join request" packet referring to the session information data 2220, and issues a "transmission request" to the transmission control part 2140.

A movement control part 2300 includes the movement management part 2310, the mobile multicast control part 2320, and the position registration information data 2330. The movement management part 310, receiving a "network information notice" from the packet analysis part 2120, issues a "position registration information creation request" to the mobile multicast control part 2320. Receiving a "position registration information creation response" from the mobile multicast control part 2320, the movement management part 2310 creates position registration information, and registers the position registration information with the position registration information data 2330. Further, the movement management part 2310 issues a "transmission request" to the transmission control part 2140.

A home address, a care-of address, a home agent address, a position registration valid time, and an access router IP address are set in the position registration information data 2330.

The mobile multicast control part 2320, receiving a "position registration information creation request" from the movement management part 2310, issues a "session inquiry request" to the session setup part 2210. Receiving a "session inquiry response" from the session setup part 2210, the mobile multicast control part 2320 transmits a "position registration information creation response" to the movement management part 2310. The position registration information data 2330 is a database of movement management.

[Processing of Mobile Node]

Next, a description is given of processing by the mobile node 2000. The mobile node 2000 performs Processing 1 through Processing 5 as follows.

(Processing 1) At the time of requesting position registration, the mobile node 2000 transmits a position registration request in which the IP address information of an access router and multicast join request information are set.

(Processing 2) At the time of the start of a multicast session, the mobile node 2000 transmits a position registration request in which multicast join request information is set.

(Processing 3) At the time of the end of a multicast session, the mobile node 2000 transmits a position registration request in which multicast leave request information is set.

(Processing 4) At the time of the start of a multicast session, the mobile node 2000 transmits a multicast join request.

(Processing 5) At the time of the end of a multicast session, the mobile node 2000 transmits a multicast leave request.

(Description of Processing 1)

At the time of requesting position registration, the mobile node 2000 transmits a position registration request in which the IP address information of an access router and multicast join request information are set.

Figure 32:
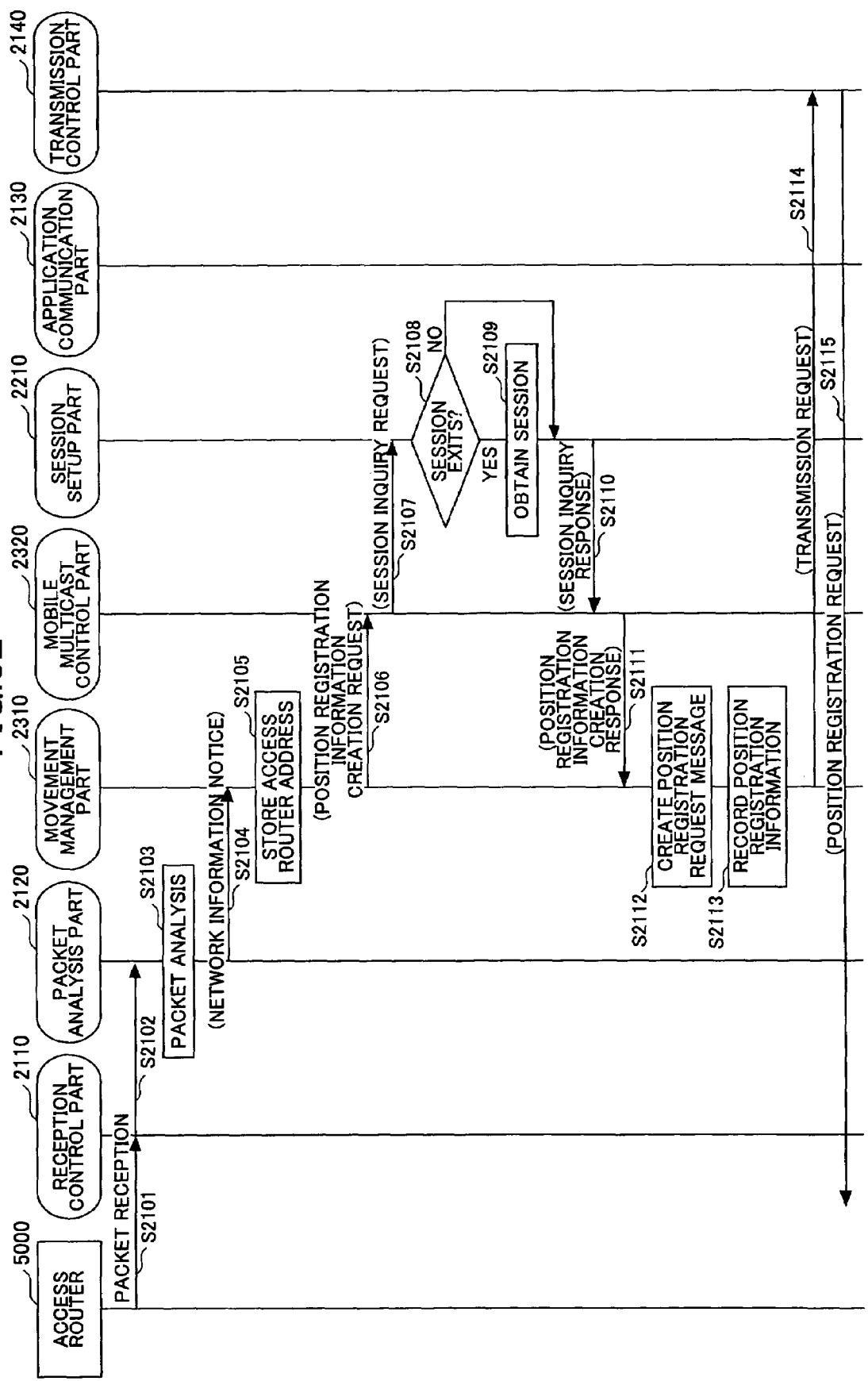
FIG. 32 is a sequence diagram showing the processing of transmitting position registration information according to the present invention.
Figure 33:
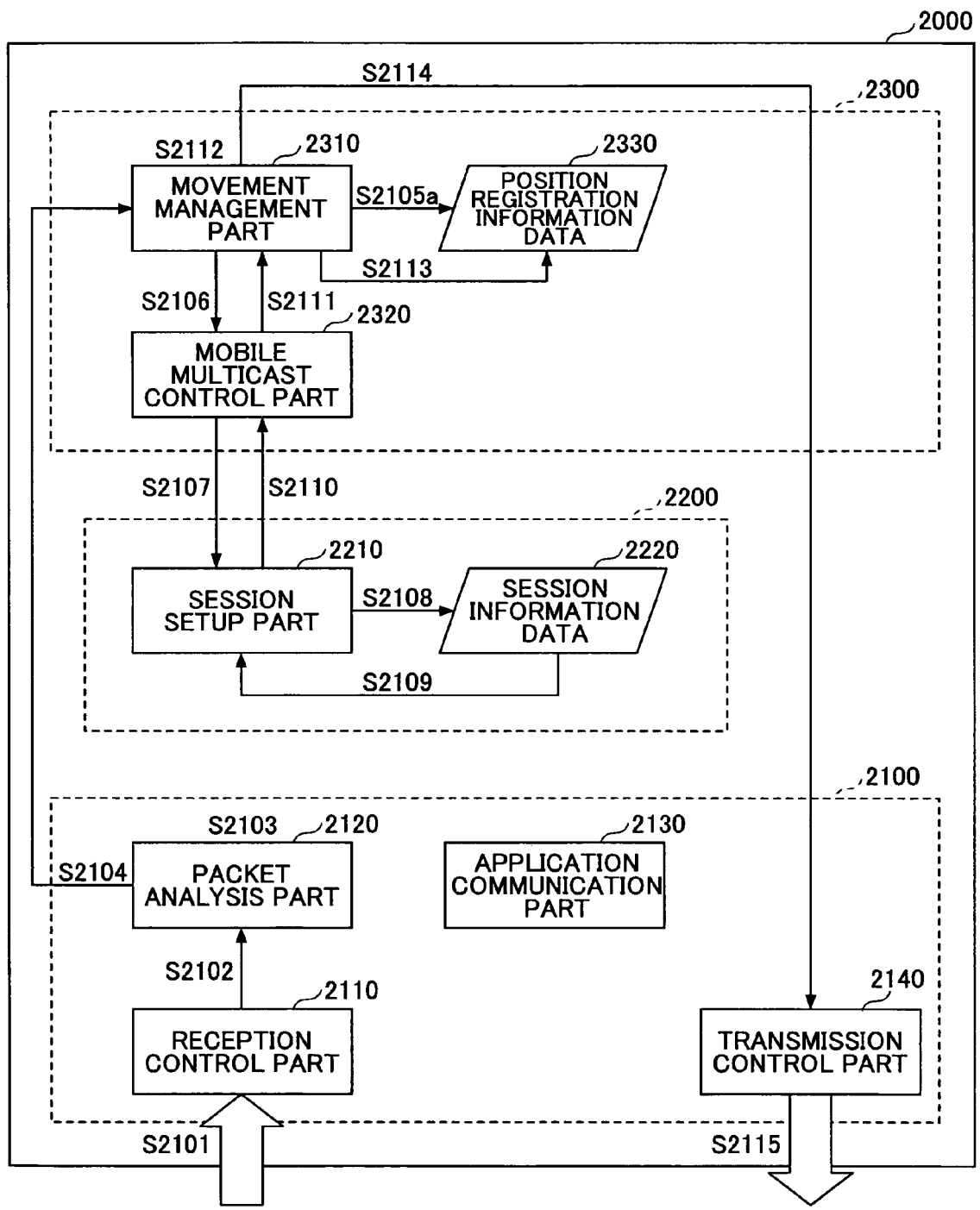
FIG. 33 is a functional correlation diagram of the mobile node with respect to Processing 1 thereof according to the present invention.

FIG. 32 is a sequence diagram showing the processing of transmitting a position registration request in which the IP address information of an access router and multicast join request information are set at the time of requesting position registration. FIG. 33 is a functional correlation diagram of the mobile node 2000 with respect to Processing 1.

Referring to FIGS. 32 and 33, in step S2101 of FIG. 32, the reception control part 2110 of the mobile node 2000 receives a packet from the access router 5000. The access router 5000 may represent any of the access routers 5000-1 through 5000-5 shown in FIG. 5. Then, in step S2102, the reception control part 2110 issues a "reception notice" to the packet analysis part 2120, requesting analysis of the packet. Receiving the "reception notice," in step S2103, the packet analysis part 2120 analyzes the type of the packet. If it is determined as a result of the analysis that the packet is a network information notice, in step S2104, the packet analysis part 2120 issues a "network information notice" to the movement management part 2310.

Receiving the "network information notice," in step S2105, the movement management part 2310 stores the IP address of an access router from the message, and in step S2106, issues a "position registration information creation request" to the mobile multicast control part 2320. Receiving the "position registration information creation request," in step S2107, the mobile multicast control part 2320 issues a "session inquiry request" to the session setup part 2210.

Receiving the "session inquiry request," in step S2108, the session setup part 2210 refers to the session information data 2220, and determines the presence or absence of a session. If a multicast session is found as a result of the determination, in step S2109, the session setup part 2210 obtains session information, and in step S2110, issues a "session inquiry response" including the session information to the mobile multicast control part 2320.

Receiving the "session inquiry response," in step S2111, the mobile multicast control part 2320 issues a "position registration information creation response" including the session information obtained in the "session inquiry response" to the movement management part 2310.

Receiving the "position registration information creation response," in step S2112, the movement management part 2310 creates a "position registration request" message using the retained access router IP address and the session information obtained from the message. Then, in step S2113, the movement management part 2310 records position registration information in the position registration information data 2330. Further, in step S2114, the movement management part 2310 issues a "transmission request" to the transmission control part 2140 in order to transmit the created "position registration request" message.

Receiving the "transmission request," in step S2115, the transmission control part 2140 transmits the packet specified in the "transmission request."

(Description of Processing 2)

At the time of the start of a multicast session, the mobile node 2000 transmits a position registration request in which multicast join request information is set.

Figure 34:
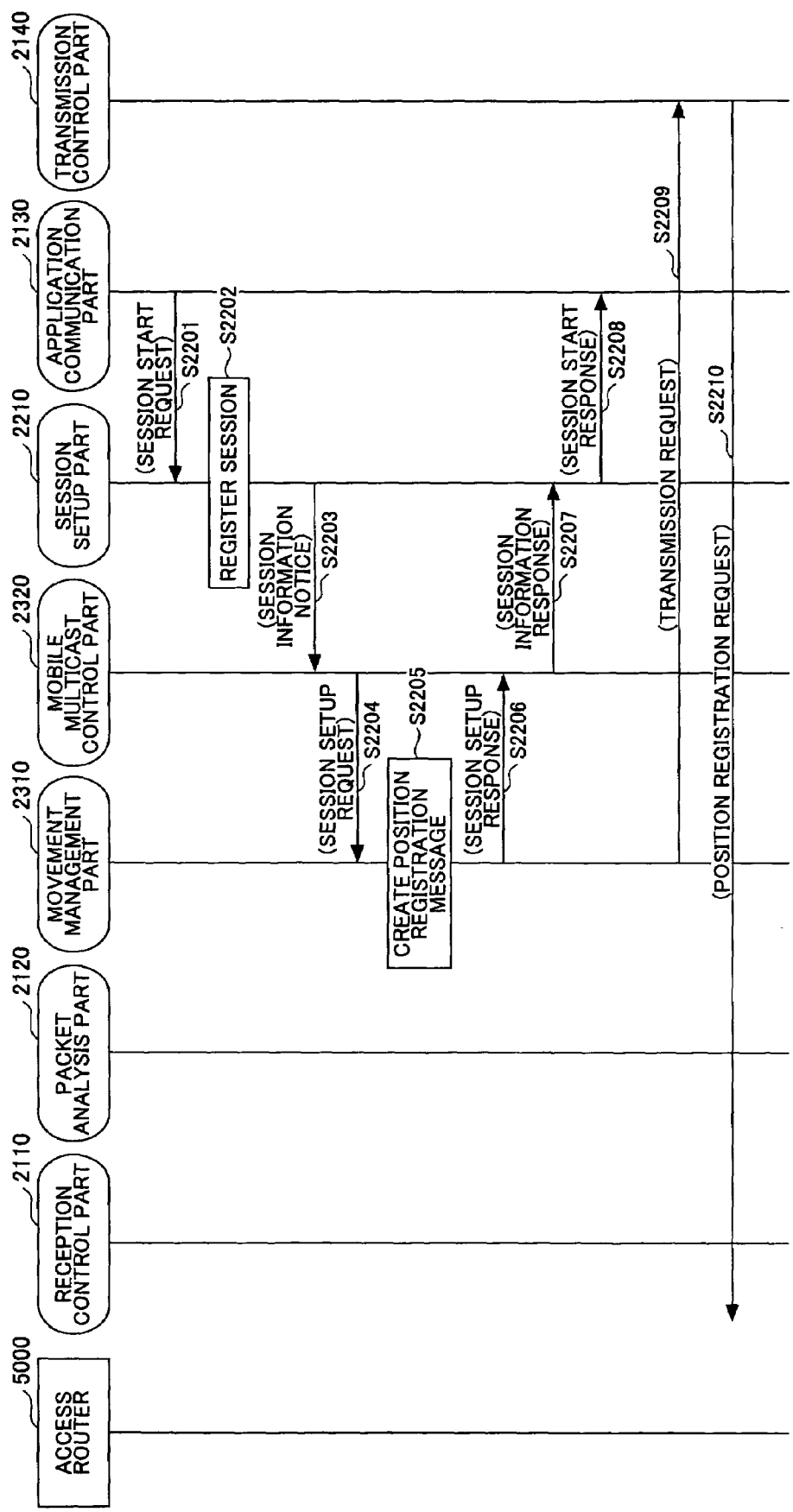
FIG. 34 is a sequence diagram showing the processing of transmitting the position registration request in which the multicast join request information is set according to the present invention.
Figure 35:
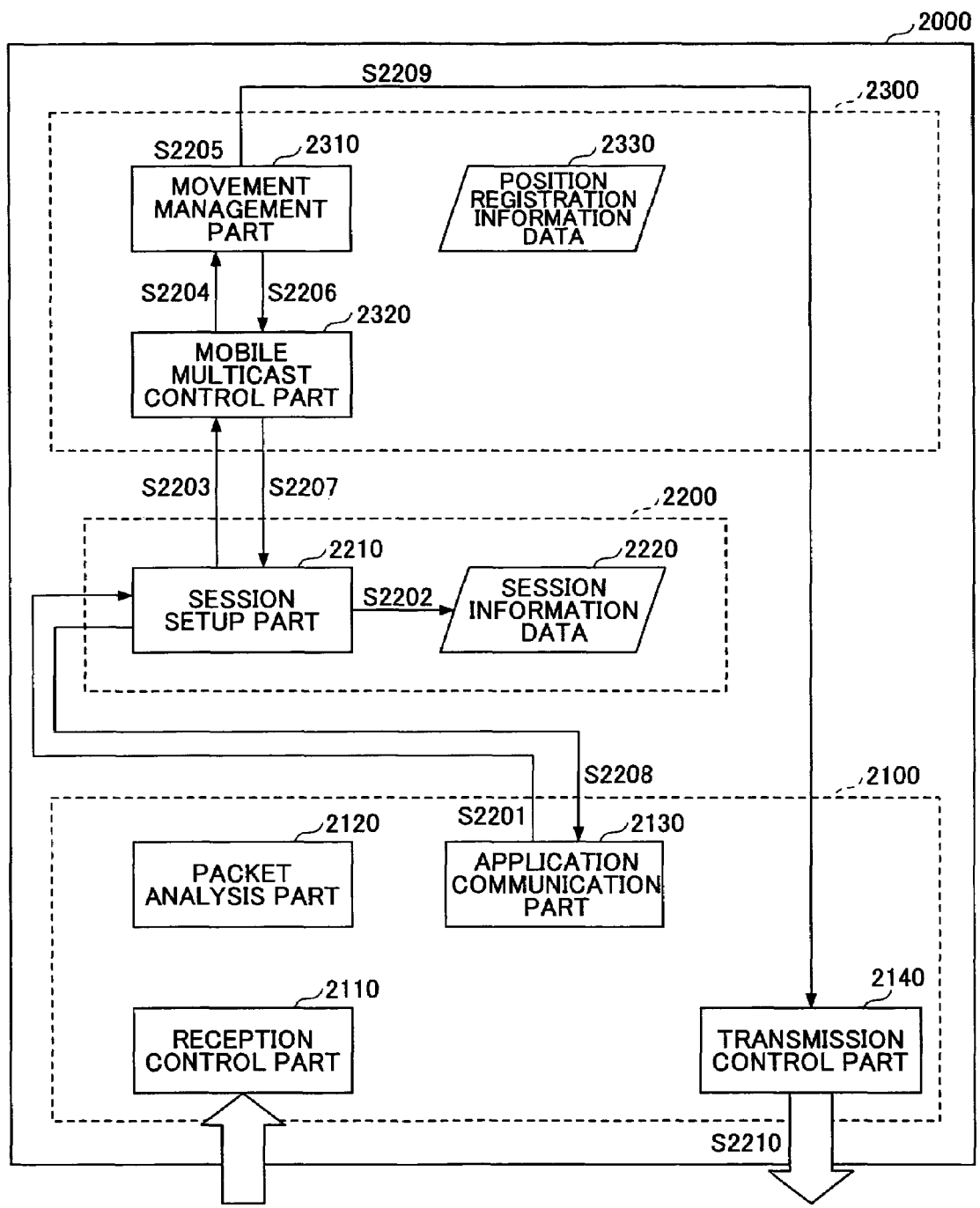
FIG. 35 is a functional correlation diagram of the mobile node with respect to Processing 2 thereof according to the present invention.

FIG. 34 is a sequence diagram showing the processing of transmitting a position registration request in which multicast join request information is set at the time of the start of a multicast session. FIG. 35 is a functional correlation diagram of the mobile node 2000 with respect to Processing 2.

Referring to FIGS. 34 and 35, when the start of a multicast session is detected in the mobile node 2000, in step S2201 of FIG. 34, the application communication part 2130 of the mobile node 2000 issues a "session start request" for the multicast session to the session setup part 2210.

Receiving the "session start request," in step S2202, the session setup part 2210 registers the session with the session information data 2220, and in step S2203, issues a "session information notice" including the session information to the mobile multicast control part 2320.

Receiving the "session information notice," in step S2204, the mobile multicast control part 2320 issues a "session setup request" including the session information to the movement management part 2310.

Receiving the "session setup request," in step S2205, the movement management part 2310 edits a "position registration request" message using access router address information retained in the position registration information data 2330 and the session information of which it is notified in the message, and in step S2209, issues to the transmission control part 2140 a "transmission request" to transmit the "position registration request" message.

Receiving the "transmission request," in step S2210, the transmission control part 2140 transmits the packet specified in the "transmission request."

Further, in step S2206, the movement management part 2310 issues a "session setup response" reporting completion of the setup of the session information to the mobile multicast control part 2320.

Receiving the "session setup response," in step S2207, the mobile multicast control part 2320 issues a "session information response" to the session setup part 2210. Receiving the "session information response," in step S2208, the session setup part 2210 transmits a "session start response" to the application communication part 2130.

(Description of Processing 3)

At the time of the end of a multicast session, the mobile node 2000 transmits a position registration request in which multicast leave request information is set.

Figure 36:
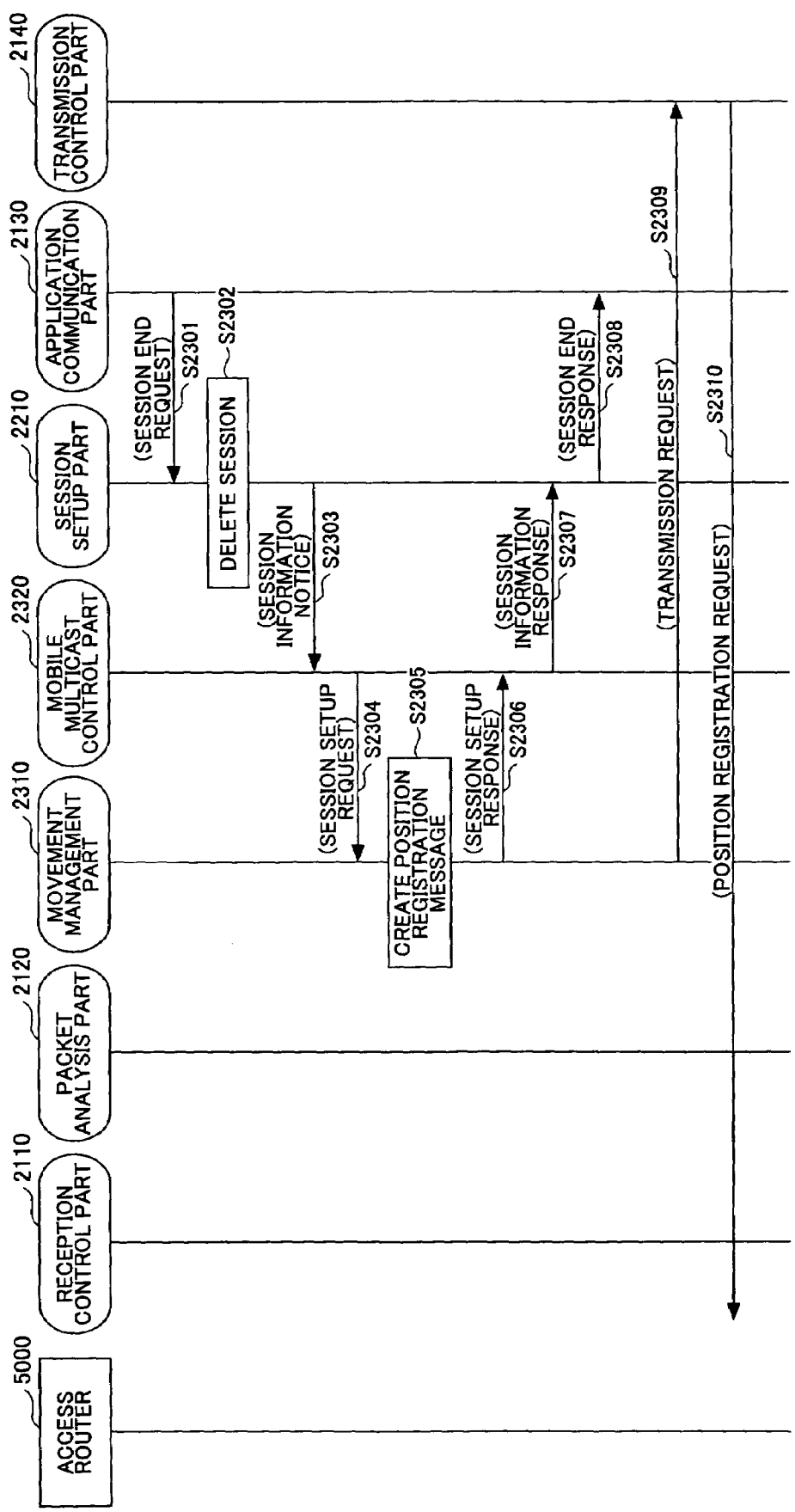
FIG. 36 is a sequence diagram showing the processing of transmitting the position registration request in which multicast leave request information is set according to the present invention.
Figure 37:
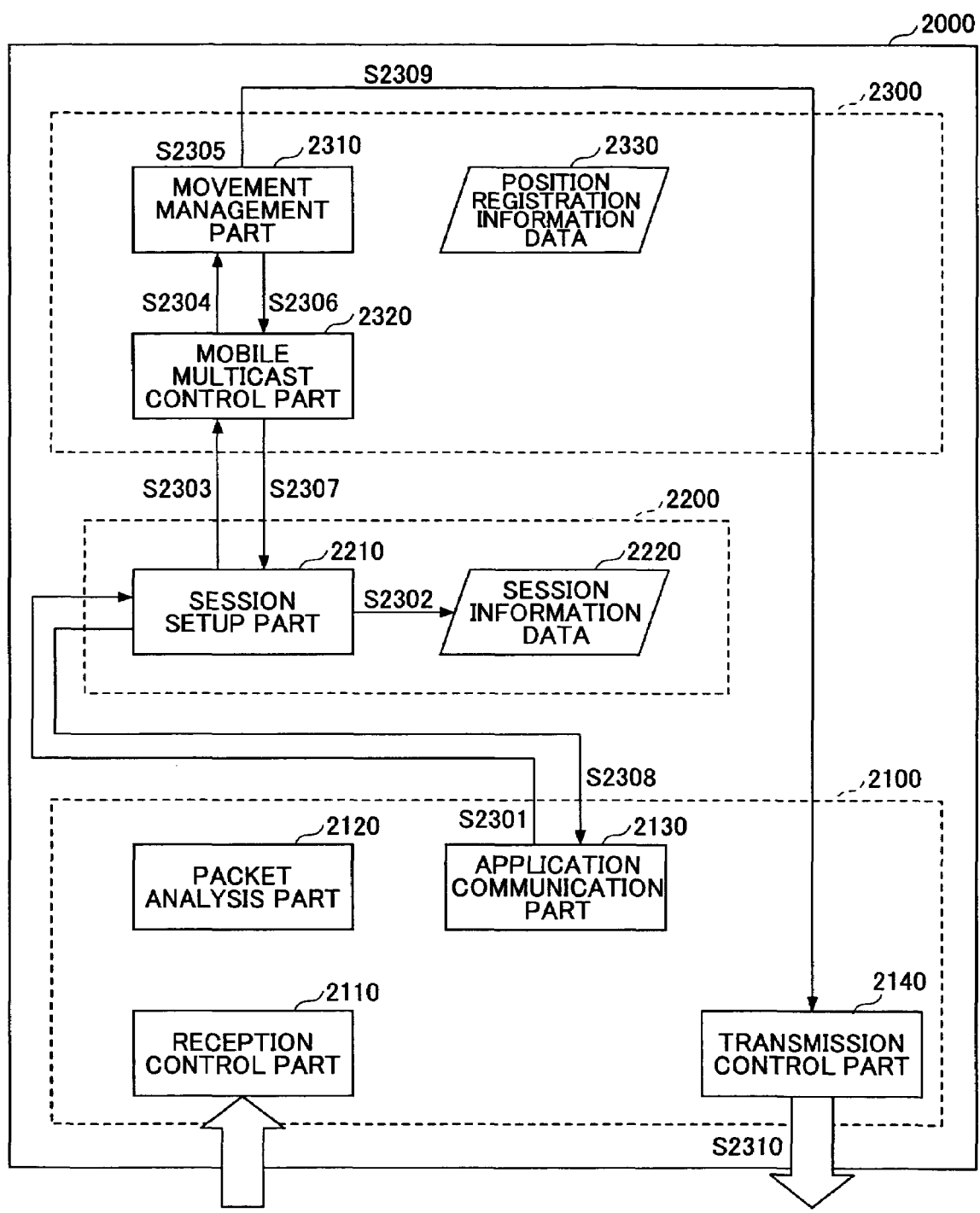
FIG. 37 is a functional correlation diagram of the mobile node with respect to Processing 3 thereof according to the present invention.

FIG. 36 is a sequence diagram showing the processing of transmitting a position registration request in which multicast leave request information is set at the time of the end of a multicast session. FIG. 37 is a functional correlation diagram of the mobile node 2000 with respect to Processing 3.

Referring to FIGS. 36 and 37, when the end of a multicast session is detected in the mobile node 2000, in step S2301 of FIG. 36, the application communication part 2130 of the mobile node 2000 issues a "session end request" to end the multicast session to the session setup part 2210.

Receiving the "session end request," in step S2302, the session setup part 2210 deletes the session from the session information data 2220, and in step S2303, issues a "session information notice" including the session information to the mobile multicast control part 2320.

Receiving the "session information notice," in step S2304, the mobile multicast control part 2320 issues a "session setup request" including the session information to the movement management part 2310.

Receiving the "session setup request," in step S2305, the movement management part 2310 edits a "position registration request" message using access router address information retained in the position registration information data 2330 and the session information of which it is notified in the message, and in step S2309, issues to the transmission control part 2140 a "transmission request" to transmit the "position registration request" message.

Receiving the "transmission request," in step S2310, the transmission control part 2140 transmits the packet specified in the "transmission request."

Further, in step S2306, the movement management part 2310 issues a "session setup response" reporting completion of the setup of the session information to the mobile multicast control part 2320.

Receiving the "session setup response," in step S2307, the mobile multicast control part 2320 issues a "session information response" to the session setup part 2210. Receiving the "session information response," in step S2308, the session setup part 2210 transmits a "session end response" to the application communication part 2130.

(Description of Processing 4)

At the time of the start of a multicast session, the mobile node 2000 transmits a multicast join request.

Figure 38:
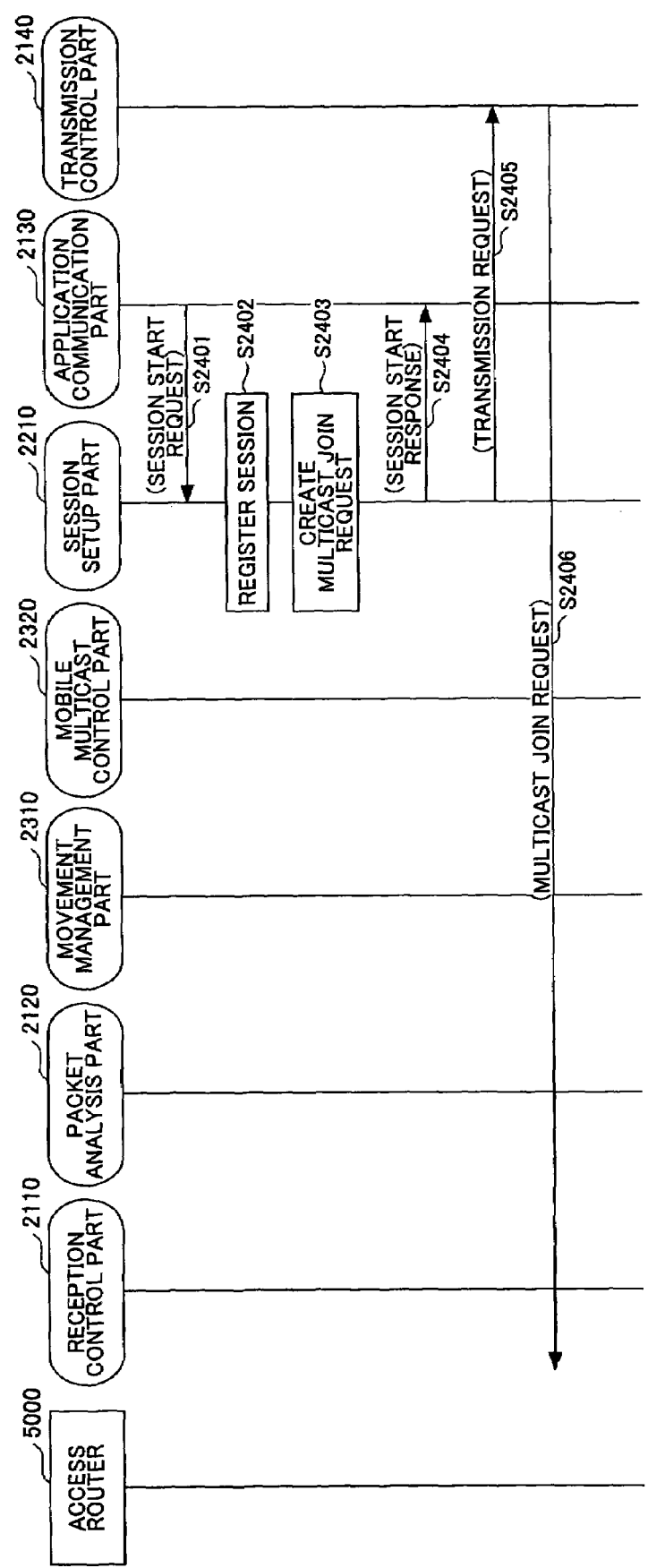
FIG. 38 is a sequence diagram showing the processing of transmitting the multicast join request according to the present invention.
Figure 39:
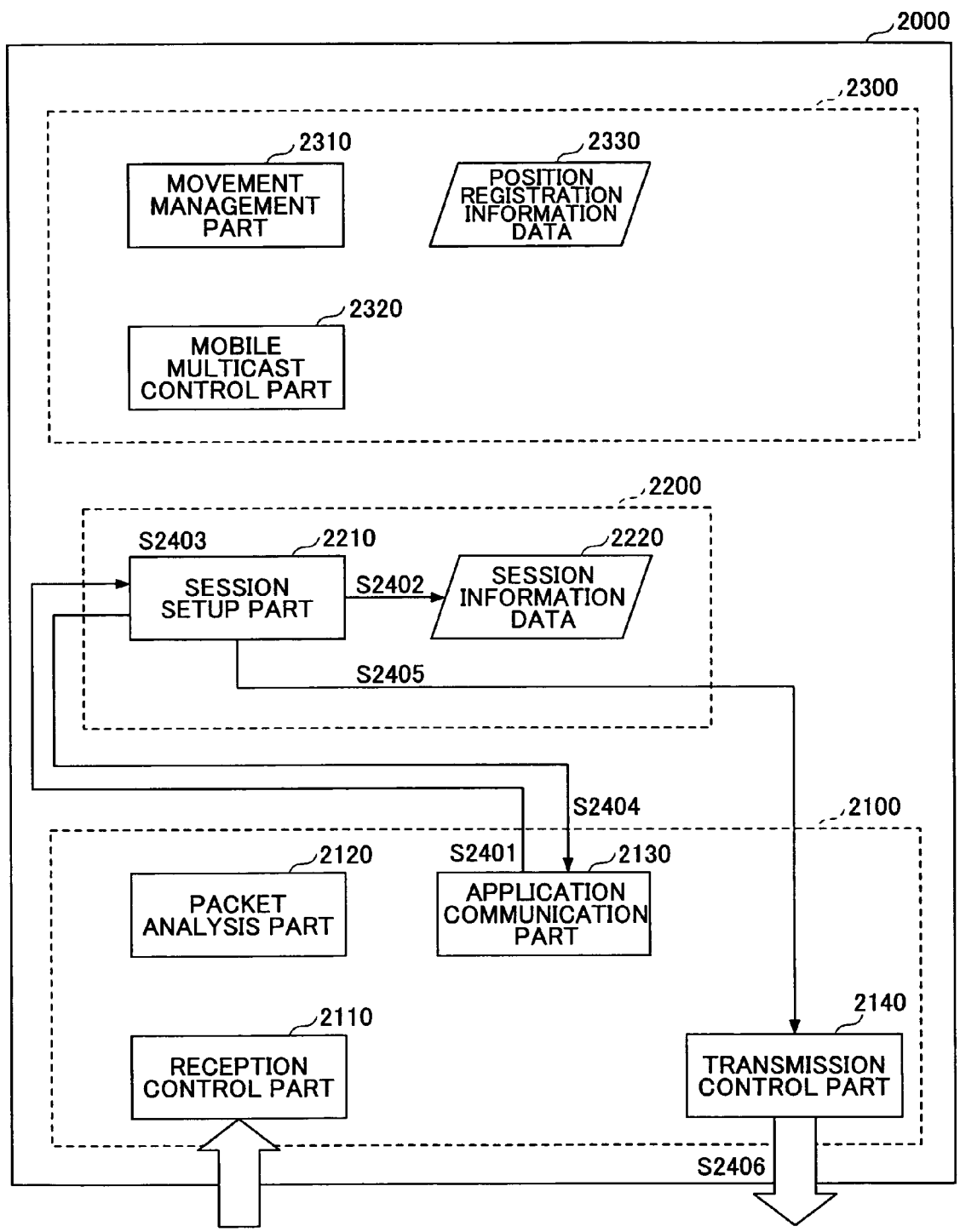
FIG. 39 is a functional correlation diagram of the mobile node with respect to Processing 4 thereof according to the present invention.

FIG. 38 is a sequence diagram showing the processing of transmitting a multicast join request at the time of the start of a multicast session. FIG. 39 is a functional correlation diagram of the mobile node 2000 with respect to Processing 4.

Referring to FIGS. 38 and 39, when the start of a multicast session is detected in the mobile node 2000, in step S2401 of FIG. 38, the application communication part 2130 of the mobile node 2000 issues a "session start request" for the multicast session to the session setup part 2210.

Receiving the "session start request," in step S2402, the session setup part 2210 registers the session with the session information data 2220. Then, in step S2403, the session setup part 2210 edits a "multicast join request" message, and in step S2405, issues to the transmission control part 2140 a "transmission request" to transmit the "multicast join request" message.

Receiving the "transmission request," in step S2406, the transmission control part 2140 transmits the packet specified in the "transmission request." Further, in step S2404, the session setup part 2210 issues a "session start response" to the application communication part 2130.

(Description of Processing 5)

At the time of the end of a multicast session, the mobile node 2000 transmits a multicast leave request.

Figure 40:
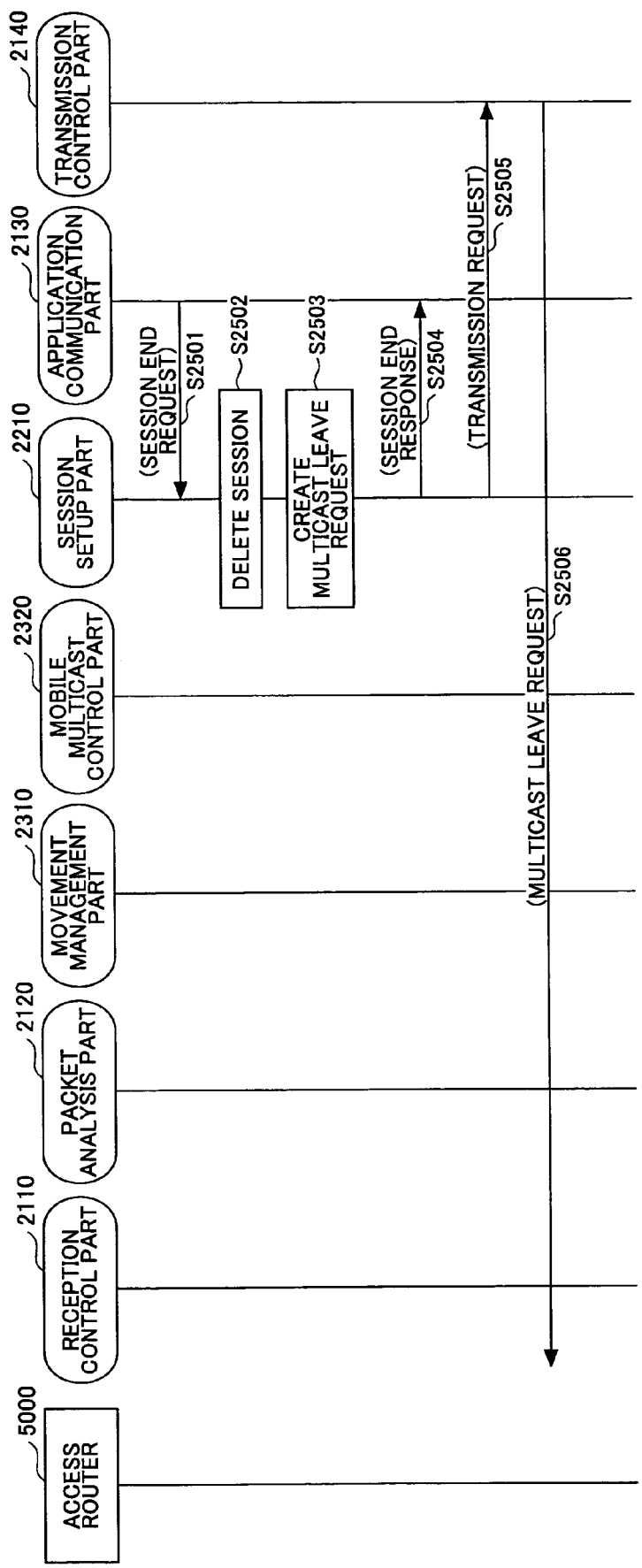
FIG. 40 is a sequence diagram showing the processing of transmitting the multicast leave request according to the present invention.
Figure 41:
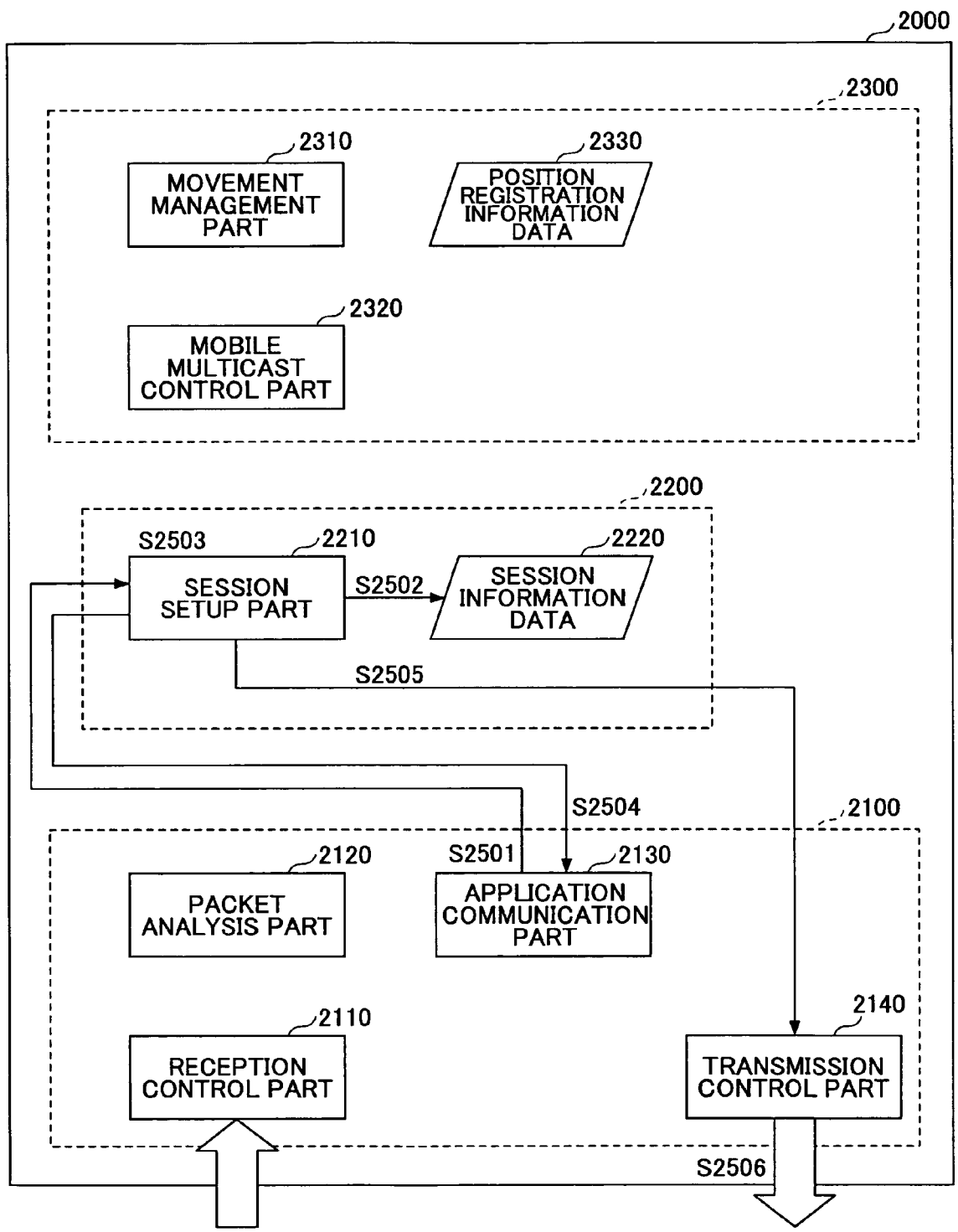
FIG. 41 is a functional correlation diagram of the mobile node with respect to Processing 5 thereof according to the present invention.

FIG. 40 is a sequence diagram showing the processing of transmitting a multicast leave request at the time of the end of a multicast session. FIG. 41 is a functional correlation diagram of the mobile node 2000 with respect to Processing 5.

Referring to FIGS. 40 and 41, when the end of a multicast session is detected in the mobile node 2000, in step S2501 of FIG. 40, the application communication part 2130 of the mobile node 2000 issues a "session end request" for the multicast session to the session setup part 2210.

Receiving the "session end request," in step S2502, the session setup part 2210 deletes the session from the session information data 2220. Then, in step S2503, the session setup part 2210 edits a "multicast leave request" message, and in step S2505, issues to the transmission control part 2140 a "transmission request" to transmit the "multicast leave request" message.

Receiving the "transmission request," in step S2506, the transmission control part 2140 transmits the packet specified in the "transmission request." Further, in step S2504, the session setup part 2210 issues a "session end response" to the application communication part 2130.

Next, a description is given of operations in the network system shown in FIG. 5.

[Position Registration Request]

(Creation of Position Registration Message)

Figure 42:
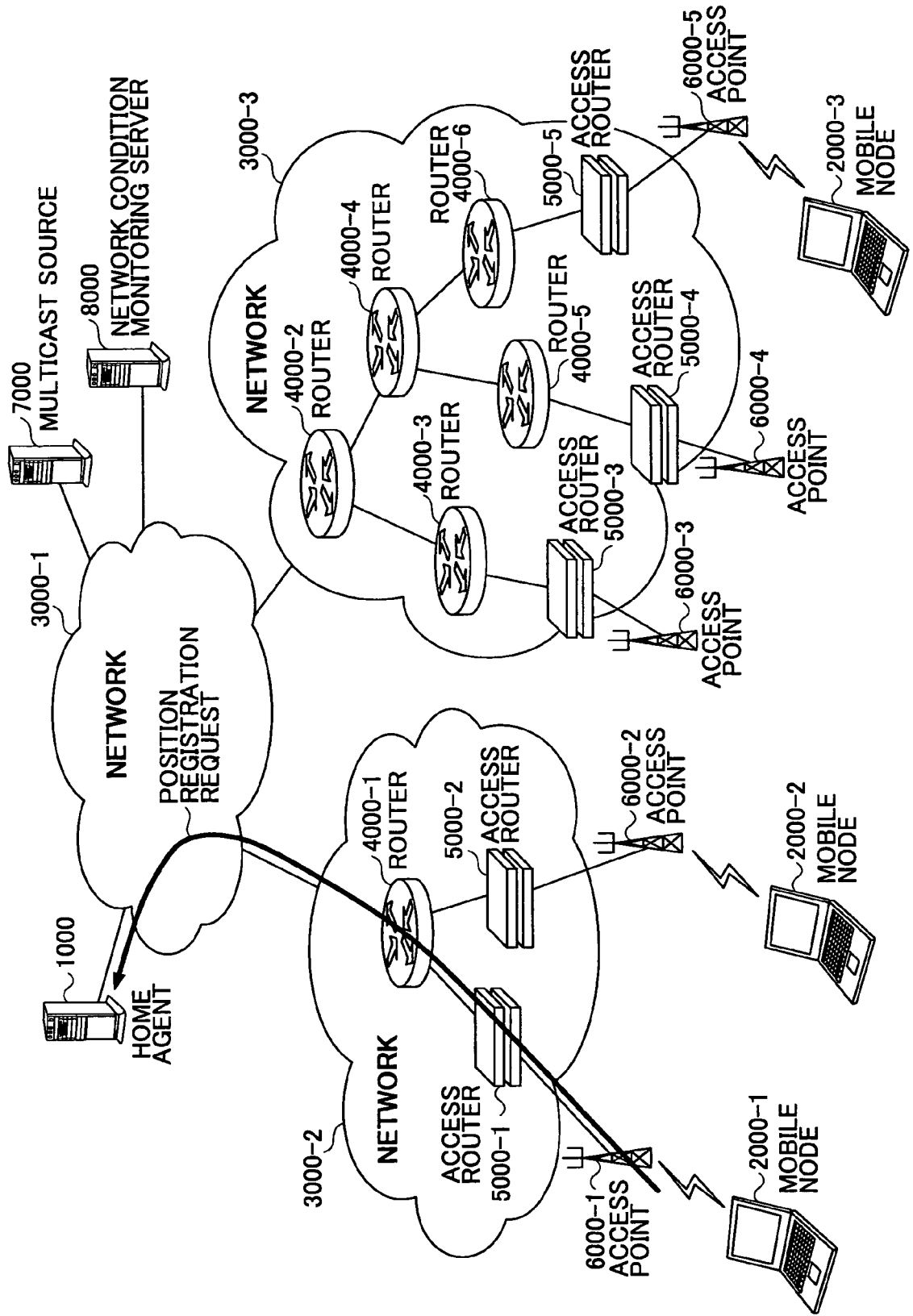
FIG. 42 is a diagram of the network system for illustrating the position registration request according to the present invention.

FIG. 42 is a diagram of the network system for illustrating the position registration request. FIG. 42 shows the situation where the mobile node 2000-1 receives a network information notice message (router advertisement) from the access router 5000-1 located above the access point 6000-1, and transmits a position registration request to the home agent 1000.

Referring to FIG. 42, the mobile node 2000-1 discretionarily establishes connection to the access point 6000-1 via a radio link (data link), and receives a network information notice message from the access router 5000-1 located above the access point 6000-1.

After receiving the access router IP address from the network information notice message, the mobile node 2000-1 generates an address in its own core network (a care-of address) using the message, and edits the position information registration request message shown in FIG. 7.

Then, through the access router 5000-1, which is the source of the network information notice message, the mobile node 2000-1 transmits a position information registration request to its own home agent 1000 connected to the network 3000-1.

(Processing of Access Router IP Address of Position Registration Message)

Receiving the position registration request message, the home agent 1000 determines that this position registration request message is a position registration request including a multicast join request, from access router IP address information and multicast session information included in the position information registration message shown in FIG. 7. Then, the home agent 1000 extracts the access router IP address from the access router IP address information of the message as a candidate multicast data packet forwarding destination, and stores the access router IP address in the access router IP address area of the position registration information data 1330 shown in FIG. 11.

Further, in the case of an IPv6 network, the home agent 1000 generates the anycast IP address of the access router 5000-1 from the care-of address of the position registration request message, and stores the generated anycast IP address in the anycast IP address area of the position registration information data 1330 shown in FIG. 11. If the access router IP address information is not set in the position registration request message, the home agent 1000 performs only the processing of the anycast IP address.

(Processing of Multicast Session Information of Position Registration Message)

Further, the home agent 1000 determines from the multicast session information of the position registration request message that the mobile node 2000-1 is requesting to join a multicast, and registers a multicast session address shown in the multicast session information area with the session information data 1213 shown in FIG. 12 as a multicast session address.

If the multicast session information is not set in the position registration request message, the home agent 1000 determines that there is no multicast session that the mobile node 2000-1 wishes to join, and does not set up a multicast session.

(Setup of Multicast Packet Forwarding Destination)

After registration of the multicast session address, if the access router IP address of the mobile node 2000-1 is included in the position registration information data 1330 shown in FIG. 11, the home agent 1000 registers the access router IP address as a tunneling destination point of the session information data 1213 shown in FIG. 12 as a multicast forwarding destination.

Further, if the access router IP address of the mobile node 2000-1 is not included in the position registration information data 1330 shown in FIG. 11, the home agent 1000 registers the anycast IP address of the mobile node 2000-1 in the position registration information data 1330 shown in FIG. 11 as a tunneling destination point of the session information data 1213 shown in FIG. 12 as a multicast forwarding destination.

Further, the tunnel control part 1211 issues a tunnel setup instruction including tunnel information shown in FIG. 43 to the forwarding control part 1130, thereby giving an instruction to set up a tunnel. Thereby, the setup of multicast packet encapsulation in the forwarding control part 1130 is completed.

FIG. 43 shows an embodiment of the tunnel device information data 1150. A tunneling start point (in this case, a home agent) and a tunneling destination point (a router or access router address) are set for each tunnel ID in the tunnel device information data 1150.

(Forwarding of Multicast Packet)

The home agent 1000, receiving a multicast packet from the multicast source 7000, obtains a tunneling start address and a tunneling destination address using the tunnel device information shown in FIG. 43 based on the transmission destination address of the multicast packet (the multicast session address of the multicast packet) in the forwarding control part 1130. Then, the forwarding control part 1130 encapsulates the multicast packet, and the multicast packet is forwarded via the transmission control part 1140.

[Multicast Join Request]

(Generation of Multicast Join Request)

Figure 44:
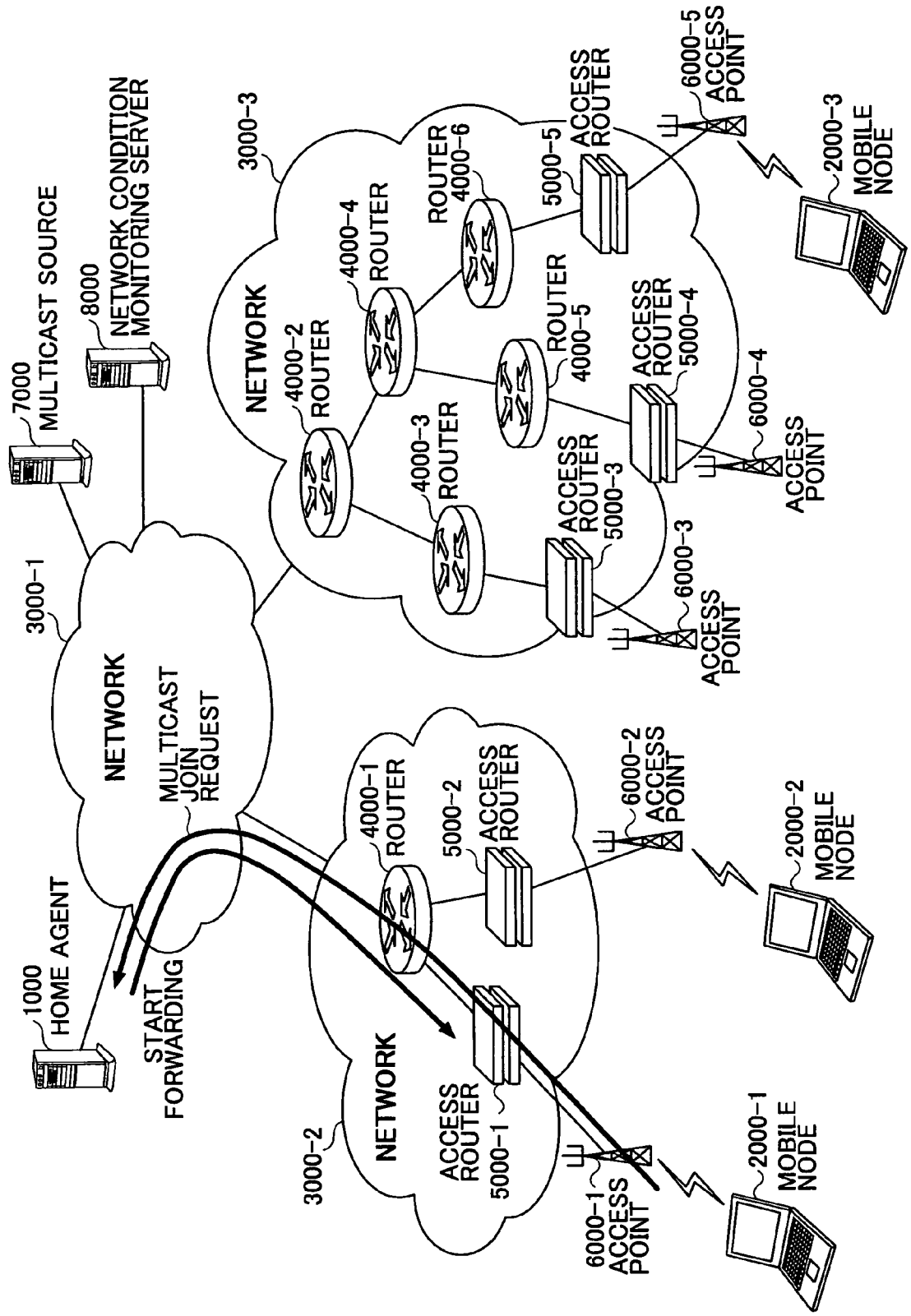
FIG. 44 is a diagram of the network system for illustrating the multicast join request according to the present invention.

FIG. 44 is a diagram of the network system for illustrating the multicast join request. FIG. 44 shows the situation where the mobile node 2000-1 transmits a multicast join request message to the home agent 1000 via the access router 5000-1 located above the access point 6000-1.

Referring to FIG. 44, when the mobile node 2000-1 receives a multicast start request from its own application layer, the mobile node 2000-1 edits the multicast join request message shown in FIG. 13, and transmits the multicast join request message to its own home agent 1000 located on the network 3000-1 via the access router 5000-1 to which the mobile node 2000-1 is connected.

(Multicast Join Request Reception)

The home agent 1000, receiving the multicast join request message, determines the multicast session that the mobile node 2000-1 is requesting to join from a multicast session address (a transmission destination address) and multicast session information in the message. Then, the home agent 1000 registers the multicast session address shown in the multicast session information area of the message with the session information data 1213 shown in FIG. 12 as a multicast session address.

(Forwarding of Multicast Packet)

The home agent 1000, receiving a multicast packet, obtains a tunneling start address and a tunneling destination address using the tunnel device information shown in FIG. 43 based on the transmission destination address of the multicast packet (the multicast session address of the multicast packet) in the forwarding control part 1130. Then, the forwarding control part 1130 encapsulates the multicast packet, and the multicast packet is forwarded via the transmission control part 1140.

[Multicast Leave Request]

(Generation of Multicast Leave Request)

Figure 45:
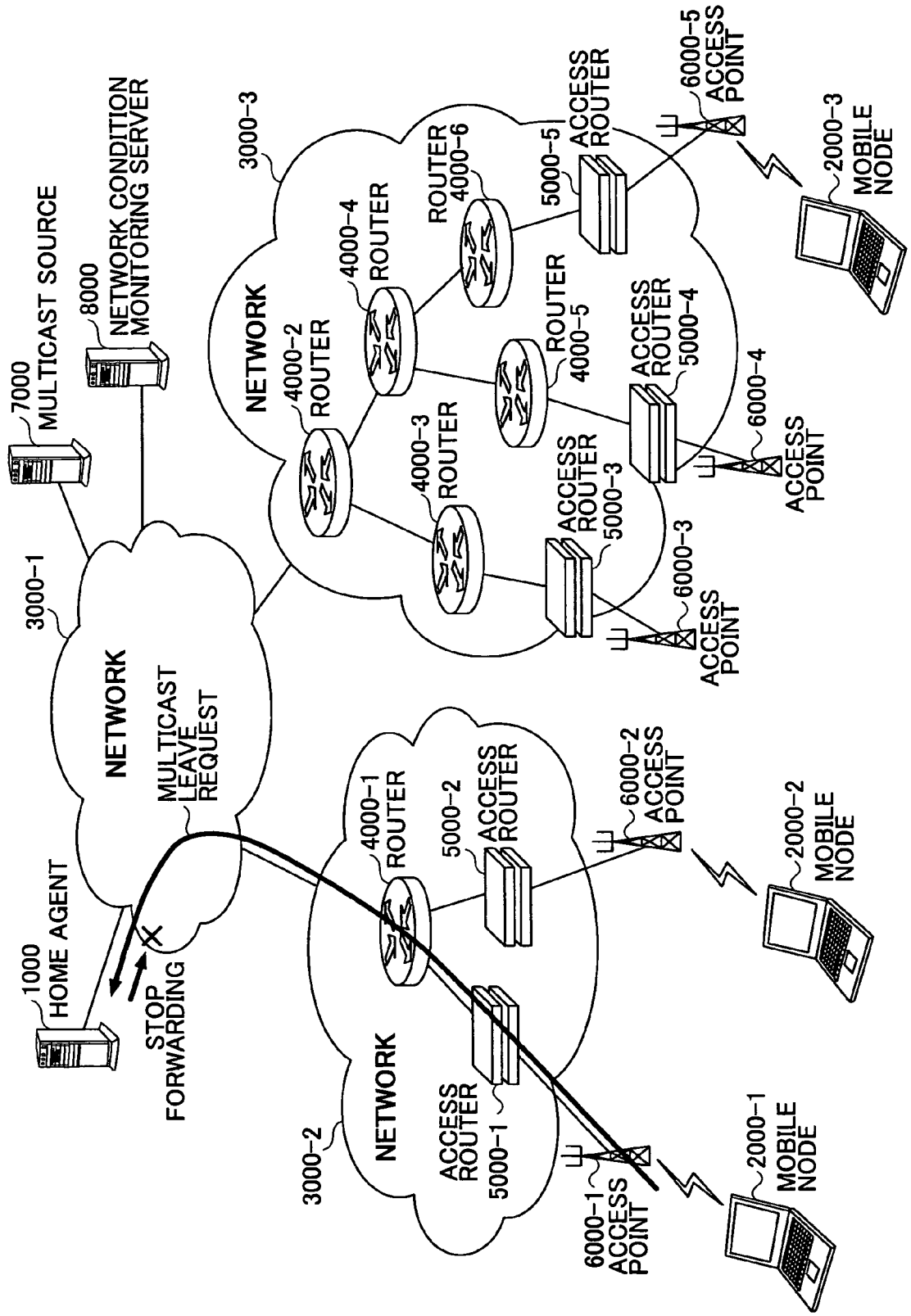
FIG. 45 is a diagram of the network system for illustrating the multicast leave request according to the present invention.

FIG. 45 is a diagram of the network system for illustrating the multicast leave request. FIG. 45 shows the situation where the mobile node 2000-1 transmits a multicast leave request message to the home agent 1000 via the access router 5000-1 located above the access point 6000-1.

Referring to FIG. 45, when the mobile node 2000-1 receives a multicast end request from its own application layer, the mobile node 2000-1 edits the multicast leave request message shown in FIG. 17, and transmits the multicast leave request message to its own home agent 1000 located on the network 3000-1 via the access router 5000-1 to which the mobile node 2000-1 is connected.

(Multicast Leave Request Reception)

The home agent 1000, receiving the multicast leave request message, determines the multicast session that the mobile node 2000-1 is requesting to leave from a multicast session address (a transmission destination address) and multicast session information in the message. Then, the home agent 1000 deletes the multicast session address shown in the multicast session information area of the message from the multicast session addresses of the session information data 1213 shown in FIG. 12.

[Forwarding Destination Change]

Figure 46:
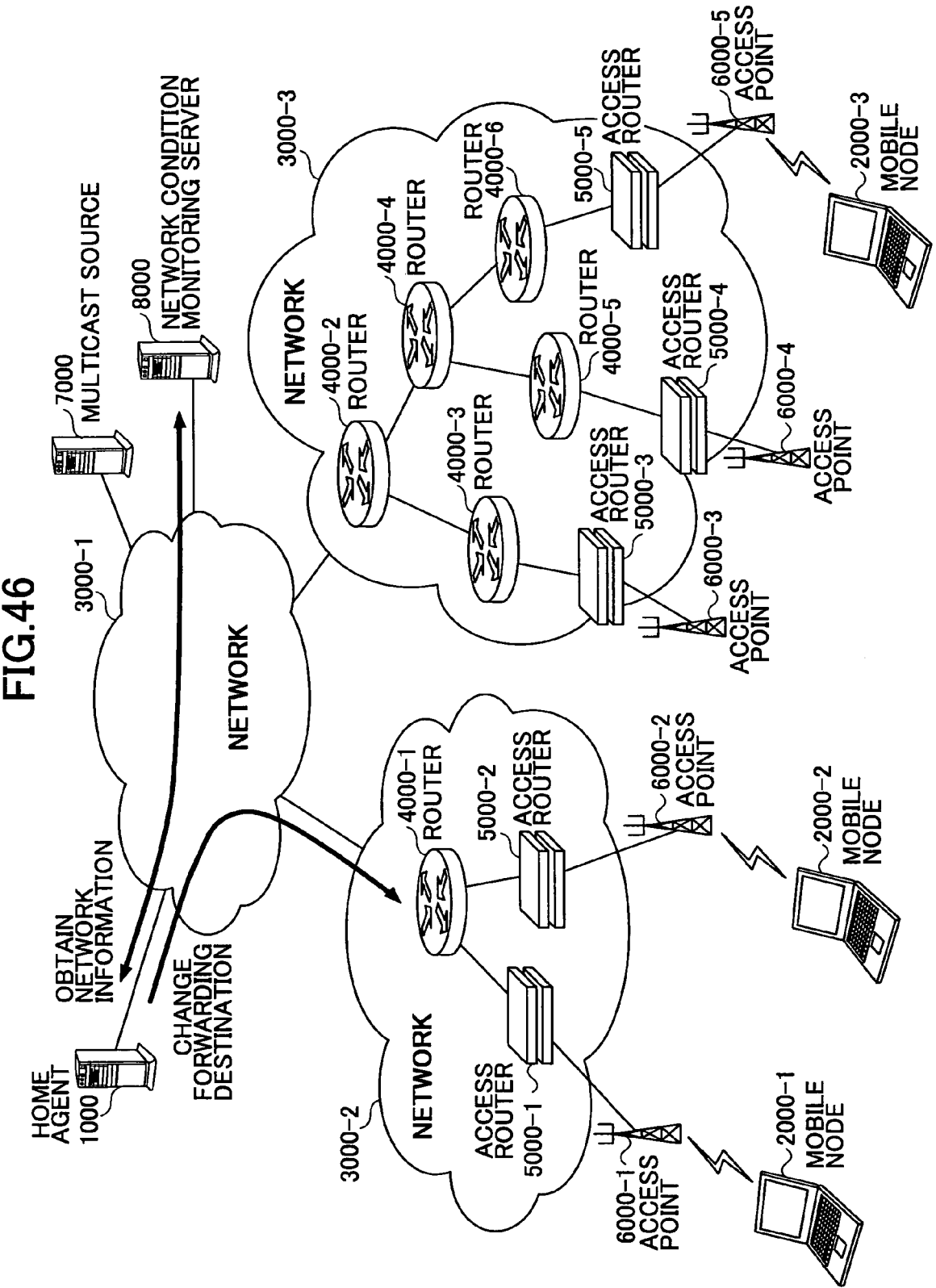
FIG. 46 is a diagram of the network system for illustrating a change of the forwarding destination according to the present invention.

FIG. 46 is a diagram of the network system for illustrating a change of the forwarding destination. FIG. 46 shows the situation where the home agent 1000 sets the router 4000-1 as a new multicast forwarding destination and forwards a multicast packet while the mobile node 2000-1 belongs to the access router 5000-1 located above the access point 6000-1 and the mobile node 2000-2 belongs to the access router 5000-2 located above the access point 6000-2.

Referring to FIG. 46, the home agent 1000 controls the forwarding destination of a multicast packet based on network information. In this embodiment, the case of changing the forwarding destination of a multicast packet based on network topology information is shown.

(Obtaining of Network Information)

The internal state of the core network 3000 is constantly monitored by the network condition monitoring server 8000. The home agent 1000 constantly accesses the network condition monitoring server 8000 for the internal state of the core network 3000, obtains the network information data shown in FIGS. 21 through 23, and manages the obtained network information data in the network information data 1230. The monitoring and management of the network condition can be realized with SNMP (Simple Network Management Protocol) or the like.

(Periodic Control of Forwarding Destination)

The home agent 1000, when a forwarding destination update timer provided in the tunnel control part 1211 expires, determines whether there are multiple tunneling destination points for a multicast session address of the session information data 1213. In the session information data 1213 shown in FIG. 12, 2000:a0::290:ccff:fe22:1d31 and 2000:b0::290:ccff:fe22:1212 are set as tunneling destination points for the multicast session address of FF2E::2.

Accordingly, in this case, the home agent 1000 refers to the network information data (tree information) shown in FIG. 21 using the two tunneling destination points 2000:a0::290:ccff:fe22:1d31 and 2000:b0::290:ccff:fe22:1212 as keys. The go-through address index is 1→2→3→6 for the tunneling destination point 2000:a0::290:ccff:fe22:1d31, while the go-through address index is 1→2→4→7 for the tunneling destination point 2000:b0::290:ccff:fe22:1212.

Accordingly, the home agent 1000 determines that the crosspoint is a location (address) indicated by the address index of 2, and determines from the network information data (address information) shown in FIG. 22 that a new tunneling destination point is 2000:30::290:ccff:fe22:5f5c. The forwarding destination update timer is reset when it expires.

[Distribution Stop due to Occurrence of Duplication]
(Preparation for Duplication Detection)

Figure 47:
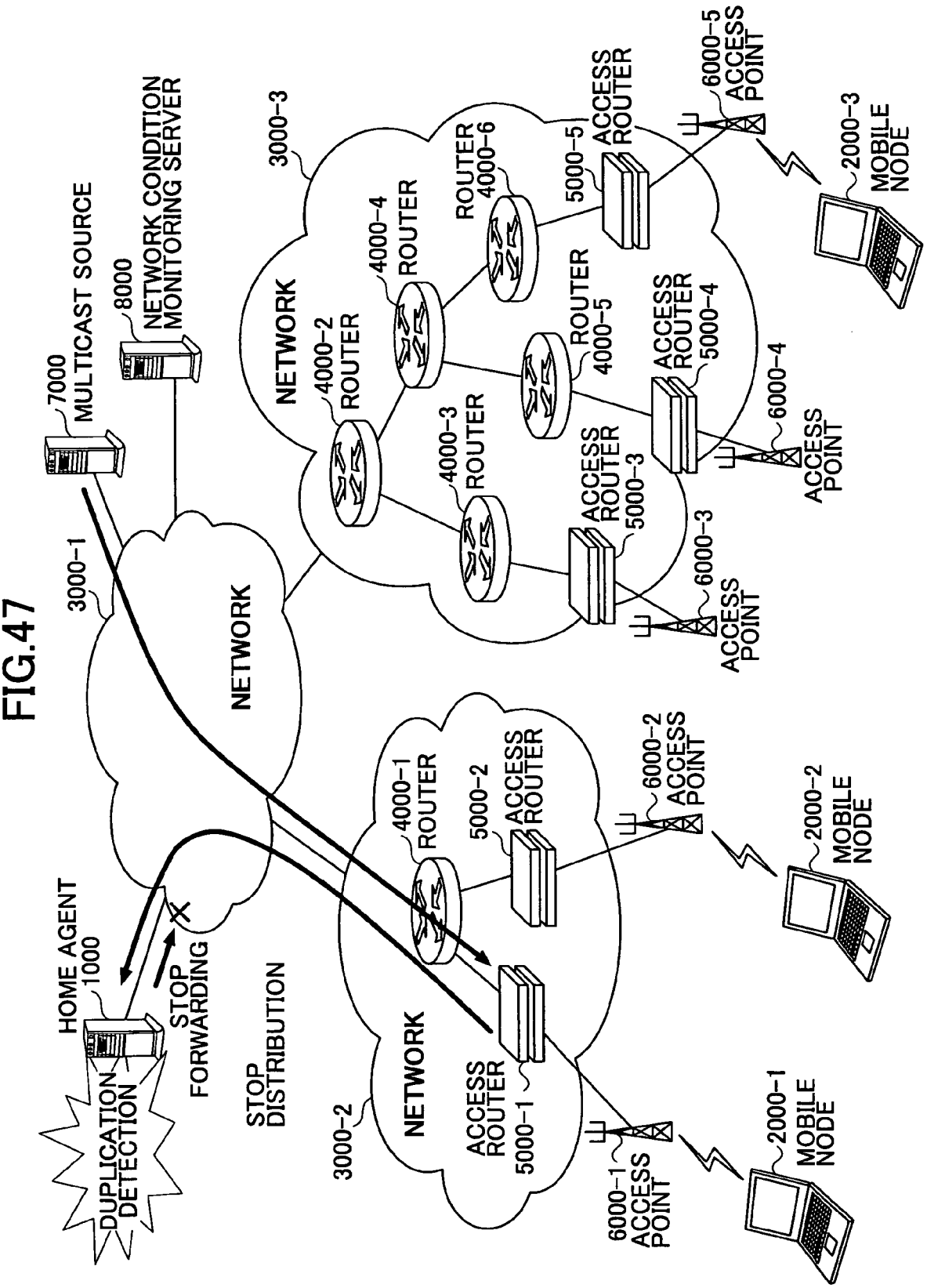
FIG. 47 is a diagram of the network system for illustrating a stop of distribution due to occurrence of duplication according to the present invention.

FIG. 47 is a diagram of the network system for illustrating a stop of distribution due to occurrence of duplication. FIG. 47 shows the situation where multicast packet duplication occurs at the access router 5000-1 while the mobile node 2000-1 belongs to the access router 5000-1 located above the access point 6000-1, so that the duplicate multicast packet is transmitted to the home agent 1000, which detects the duplication due to the forwarding of a multicast packet and stops forwarding the multicast packet.

Referring to FIG. 47, the home agent 1000 transmits the multicast join request shown in FIG. 13 to a multicast forwarding destination router, and requests distribution of a multicast packet.

(Occurrence of Duplication)

When a multicast packet forwarded by the home agent 1000 and a multicast packet flowing to a multicast forwarding destination router because of the formation of a multicast tree are determined to be duplicates at the multicast forwarding destination router, the multicast forwarding destination router forwards the duplicate multicast packet to the home agent 1000.

(Duplication Detection and Forwarding Stop)

As a result, the home agent 1000 determines in the forwarding control part 1130 that the forwarded multicast packet causes duplication at the forwarding destination router, and stops encapsulating and forwarding the multicast packet.

Thus, the home agent 1000 encapsulates a multicast packet and forwards it to an optimal router with respect to multiple mobile nodes belonging to the same multicast group, thereby making it possible to realize reduction in traffic while avoiding the loss or delay of the multicast packet resulting from the movement of a mobile node.

Further, when a mobile node receiving a multicast packet moves to another network, the home agent 1000 is notified of multicast join request information together with position registration, and the home agent 1000 can immediately start forwarding the multicast packet, thereby making it possible to avoid the loss or delay of the multicast packet resulting from the movement of the mobile node.

In place of the home agent 1000, an external agent having functions equivalent to those of the home agent 1000 may be provided. Also in this case, by encapsulating a multicast packet and forwarding it to an optimal router with respect to multiple mobile nodes belonging to the same multicast group, it is possible to realize reduction in traffic while avoiding the loss or delay of the multicast packet resulting from the movement of a mobile node.

The movement control part 1300 corresponds to a position registration part, the session control part 1210 corresponds to a session setup part, the forwarding control part 1130 corresponds to a forwarding part, the session control part 1210 corresponds to a forwarding destination change part, the forwarding control part 1130 corresponds to a forwarding stop part, and the movement control part 2300 corresponds to a position registration request part.

The present invention is not limited to the specifically disclosed embodiments, and variations and modifications may be made without departing from the scope of the present invention.

The present application is based on Japanese Priority Patent Application No. 2005-086511, filed on Mar. 24, 2005, the entire contents of which are hereby incorporated by reference.

What is claimed is:

1. A multicast communication method, comprising the steps of:
    (a) setting multicast join request information, an address of an access router to which a mobile node is connected, and a care-of address of the mobile node in a position registration request in the mobile node;
    (b) transmitting the position registration request from the mobile node to a network;
    (c) receiving the position registration request, performing position registration, and setting session information data, based on at least the address of the access router, for performing a multicast communication in a home agent connected to the network; and
    (d) encapsulating a multicast packet and forwarding the multicast packet to an optimal forwarding destination on the network to which the mobile node to join the multicast communication is connected based on the session information data in the home agent that has received the multicast packet from the network.

2. The multicast communication method as claimed in claim 1, wherein the home agent, after performing the position registration, receives a multicast join request from the mobile node and starts to forward the multicast packet.

3. The multicast communication method as claimed in claim 2, wherein the home agent receives a multicast leave request from the mobile node, and ends the forwarding of the multicast packet.

4. The multicast communication method as claimed in claim 1, wherein the optimal forwarding destination is changed in the home agent based on the session information data and network information data obtained by monitoring a state of the network.

5. A multicast communication method, comprising the steps of:
    (a) transmitting a position registration request including multicast join request information from a mobile node to a network;
    (b) receiving the position registration request, performing position registration, and setting session information data for performing a multicast communication in a home agent connected to the network; and
    (c) encapsulating a multicast packet and forwarding the multicast packet to an optimal forwarding destination on the network to which the mobile node to join the multicast communication is connected based on the session information data in the home agent that has received the multicast packet from the network,
    wherein the forwarding of the multicast packet is stopped in the home agent when the home agent is notified of occurrence of duplication of the multicast packet at the forwarding destination of the multicast packet.

6. The multicast communication method as claimed in claim 1, wherein the home agent is replaced by an external agent.

7. A home agent, comprising:
a position registration part configured to receive a position registration request including multicast join request information transmitted from a mobile node to a network, create position registration information data, and perform position registration;
a session setup part configured to set session information data for performing a multicast communication from the position registration request including the multicast join request information and the position registration information data; and
a forwarding part configured to encapsulate a multicast packet and forward the multicast packet to an optimal forwarding destination on the network to which the mobile node to join the multicast communication is connected based on the session information data,
wherein the position registration request further includes an address of an access router to which the mobile node is connected and a care-of address of the mobile node, and
wherein the session information data is based on at least the address of the access router.

8. The home agent as claimed in claim 7, further comprising:
a forwarding destination change part configured to change the optimal forwarding destination based on the session information data and network information data obtained by monitoring a state of the network.

9. A home agent, comprising:
a position registration part configured to receive a position registration request including multicast join request information transmitted from a mobile node to a network, create position registration information data, and perform position registration;
a session setup part configured to set session information data for performing a multicast communication from the position registration request including the multicast join request information and the position registration information data;
a forwarding part configured to encapsulate a multicast packet and forward the multicast packet to an optimal forwarding destination on the network to which the mobile node to join the multicast communication is connected based on the session information data; and
a forwarding stop part configured to stop forwarding the multicast packet when the home agent is notified of occurrence of duplication of the multicast packet at the forwarding destination of the multicast packet.

10. A home agent, comprising:
a position registration part configured to receive a position registration request including multicast join request information transmitted from a mobile node to a network, create position registration information data, and perform position registration;
a session setup part comfigured to set session information data for performing a multicast communication from the position registration request including the multicast join request information and the position registration information data; and
a forwarding part configured to encapsulate a multicast packet and forward the multicast packet to an optimal forwarding destination on the network to which the mobile node to join the multicast communication is connected based on the session information data,
wherein the position registration part sets an address of an access router to which the mobile node is connected as a candidate forwarding destination of the multicast communication, the address of the access router being set in the position registration request.

11. A home agent, comprising:
a position registration part configured to receive a position registration request including multicast join request information transmitted from a mobile node to a network, create position registration information data, and perform position registration;
a session setup part configured to set session information data for performing a multicast communication from the position registration request including the multicast join request information and the position registration information data; and
a forwarding part configured to encapsulate a multicast packet and forward the multicast packet to an optimal forwarding destination on the network to which the mobile node to join the multicast communication is connected based on the session information data,
wherein the position registration part sets an anycast address as a candidate forwarding destination of the multicast communication, the anycast address being generated from a care-of address of the position registration request.

* * * * *